US011930879B2

United States Patent
Franzino et al.

(10) Patent No.: US 11,930,879 B2
(45) Date of Patent: *Mar. 19, 2024

(54) HELMET ACCESSORY MOUNTING SYSTEM

(71) Applicant: Gentex Corporation, Simpson, PA (US)

(72) Inventors: Michael Lawrence Franzino, Bedford, NH (US); Stephen Bourque, Littleton, MA (US); Scott W. James, Epping, NH (US); Daniel Berry, Rochester, NH (US); Ross Fade Barber, Auburn, NH (US); Zoltan S. Brutler, Groton, MA (US)

(73) Assignee: GENTEX CORPORATION, Simpson, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,201

(22) Filed: Aug. 26, 2022

(65) Prior Publication Data

US 2022/0408869 A1    Dec. 29, 2022

Related U.S. Application Data

(63) Continuation of application No. 17/531,308, filed on Nov. 19, 2021, now Pat. No. 11,452,328, which is a
(Continued)

(51) Int. Cl.
*A42B 3/04* (2006.01)
*A42B 3/30* (2006.01)
*H02J 7/00* (2006.01)

(52) U.S. Cl.
CPC ............... *A42B 3/30* (2013.01); *A42B 3/042* (2013.01); *A42B 3/0433* (2013.01); *H02J 7/0044* (2013.01)

(58) Field of Classification Search
CPC .............. A41D 13/0005; A41D 13/002; A41D 31/065; A42B 3/0406; H02J 7/00034; H02J 7/00041; H02J 7/0044
See application file for complete search history.

(56) References Cited

U.S. PATENT DOCUMENTS 4,374,301 A    2/1983   Frieder, Jr.
6,493,137 B1   12/2002  Solinsky et al.
(Continued)

FOREIGN PATENT DOCUMENTS

WO    2020237189 A1    11/2020

OTHER PUBLICATIONS

International Search Report and Written Opinion dated Aug. 25, 2020 for International Patent Application No. PCT/US2020/034325, 9 pages.
(Continued)

*Primary Examiner* — Katherine M Moran
(74) *Attorney, Agent, or Firm* — Morgan, Lewis & Bockius LLP

(57) ABSTRACT

A helmet accessory mounting system includes a mounting device configured to couple to an outer surface of a side of a helmet. The mounting device includes a plurality of mounting locations configured to removeably couple to at least one accessory. A plurality of the plurality of mounting locations each includes an electrical node. A power supply is coupled to the mounting device. An electrical supply line electrically couples the power supply to each of the electrical nodes and the electrical supply line is contained at least partially within the mounting device.

31 Claims, 42 Drawing Sheets

Related U.S. Application Data continuation of application No. PCT/US2020/034325, filed on May 22, 2020.

(60) Provisional application No. 62/851,571, filed on May 22, 2019.

(56) References Cited

U.S. PATENT DOCUMENTS

| | | | |
|---|---|---|---|
| 6,560,029 B1 * | 5/2003 | Dobbie | G02B 23/125 2/6.1 |
| 7,616,774 B2 | 11/2009 | Auranen et al. | |
| 7,905,620 B2 | 3/2011 | Harris | |
| 8,908,389 B2 | 12/2014 | Teetzel et al. | |
| 8,984,665 B2 * | 3/2015 | Celona | A42B 3/04 2/6.2 |
| 9,101,175 B2 * | 8/2015 | Redpath | H05K 3/40 |
| 9,532,621 B2 | 1/2017 | Redpath et al. | |
| 9,787,587 B2 * | 10/2017 | Bishop | H04L 63/0272 |
| 11,452,328 B2 * | 9/2022 | Franzino | A42B 3/042 |
| 2005/0180129 A1 | 8/2005 | Harris | |
| 2008/0131106 A1 | 6/2008 | Bruce | |
| 2008/0263752 A1 | 10/2008 | Solinsky et al. | |
| 2010/0083413 A1 | 4/2010 | McGovern | |
| 2010/0299814 A1 | 12/2010 | Celona et al. | |
| 2011/0089894 A1 | 4/2011 | Soar | |
| 2011/0145981 A1 | 6/2011 | Teetzel et al. | |
| 2011/0173865 A1 | 7/2011 | Compton et al. | |
| 2011/0314594 A1 | 12/2011 | Rogers et al. | |
| 2013/0191967 A1 | 8/2013 | Harris | |
| 2013/0215281 A1 | 8/2013 | Hobby et al. | |
| 2014/0000013 A1 | 1/2014 | Redpath et al. | |
| 2014/0020159 A1 | 1/2014 | Teetzel et al. | |
| 2015/0157079 A1 | 6/2015 | Auranen et al. | |
| 2015/0323777 A1 | 11/2015 | Teetzel et al. | |
| 2016/0088891 A1 | 3/2016 | Walsh et al. | |
| 2018/0192727 A1 | 7/2018 | Chen | |
| 2019/0208854 A1 | 7/2019 | Teetzel et al. | |
| 2020/0077732 A1 | 3/2020 | O'Connell et al. | |
| 2021/0315314 A1 | 10/2021 | Teetzel et al. | |

OTHER PUBLICATIONS

International Search Report and Written Opinion dated Mar. 28, 2022 for corresponding application No. PCT/US2021/060726, 20 pages.

Morgan Advanced Materials, "LASA AC915 Smart Ballistic Helmet Product Data Sheet", www.morgandefencesystems.com, 2 pages.

Morgan Advanced Materials, "Morgan Advanced Materials Composites and Defence Systems, Helmets—Power and Data Integration", www.morgandefencesystems.com, Oct. 2, 2017, 13 pages.

* cited by examiner

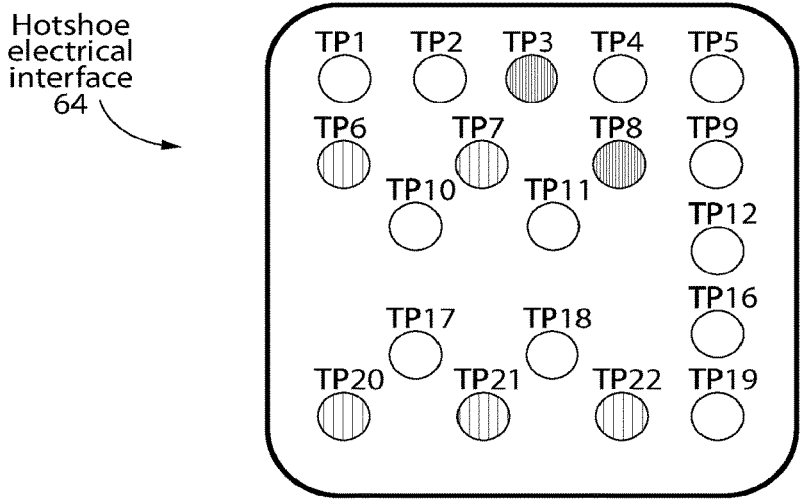

FIG. 32A

| Pin | Name | Direction (wrt battery pack) | Function |
|---|---|---|---|
| TP1 | VOPT | out | Supply for VAS [ +3V, +9V] |
| TP2 | VOPT | out | Supply for VAS [ +3V, +9V] |
| TP3 | nPACK_PRESENT | in | Signal that is driven low to indicate pack presense |
| TP4 | RAiLiNK_P | bidirectional | Inter-accessory data bus, + |
| TP5 | RAiLiNK_N | bidirectional | Inter-accessory data bus, - |
| TP6 | VSYS_RTN | - | 0V return for power and signals |
| TP7 | VSYS_RTN | - | 0V return for power and signals |
| TP8 | SELECT3V/n9V | in | Signal that selects 3V (open) or 9V (low) |
| TP9 | SBP_USART_RX | in | Battery pack serial port receiver |
| TP10 | SBP_IN_P | in | Battery pack high-speed data receiver, + |
| TP11 | SBP_OUT_P | out | Battery pack high-speed data transmitter, + |
| TP12 | SBP_USART_TX | out | Battery pack serial port transmitter |
| TP16 | VBUS | out | Supply for rail accessories, +12V |
| TP17 | SBP_IN_N | in | Battery pack high-speed data receiver, - |
| TP18 | SBP_OUT_N | out | Battery pack high-speed data transmitter, - |
| TP19 | VBUS | out | Supply for rail accessories, +12V |
| TP20 | VSYS_RTN | - | 0V return for power and signals |
| TP21 | VSYS_RTN | - | 0V return for power and signals |
| TP22 | VSYS_RTN | - | 0V return for power and signals |

FIG. 32B

HELMET ACCESSORY MOUNTING SYSTEM

CROSS-REFERENCE TO RELATED APPLICATIONS

This application is a continuation of U.S. patent application Ser. No. 17/531,308 filed Nov. 19, 2021, which is a continuation of International Patent Application No. PCT/US2020/034325 filed May 22, 2020, entitled "Helmet Accessory Mounting System", which claims the benefit of U.S. Provisional Patent Application No. 62/851,571 filed May 22, 2019, entitled "Accessory Mount for a Helmet", each of which is incorporated by reference herein in its entirety.

BACKGROUND

Helmets used for global defense forces, emergency responders, and industrial personnel operating in high performance environments, often require one or more accessories to be removeably coupled to the helmet shell. A modular configuration for attaching accessories to a helmet allows for a wide range of customizable functionality ranging from communication systems to face masks. Powered accessories, such as Night Vison Goggles (NVGs), lights, and communication headsets that attach to existing helmets, often include their own power supply. There may therefore be a redundancy of power supplies coupled to the helmet when multiple accessories are coupled to the helmet. This can add undesirable weight and/or size to the helmet making it cumbersome to use. The overall weight, weight distribution/balance, and size and configuration of a helmet can be critically important.

While the increase in the number of accessories and mounting positions has improved the functionality of helmet systems, managing, controlling, and communicating with disparate accessories has become increasingly challenging.

BRIEF SUMMARY OF THE INVENTION

In one embodiment, there is a helmet accessory mounting system that comprises a mounting device configured to couple to an outer surface of a side of a helmet, the mounting device includes a plurality of mounting locations configured to removeably couple to at least one accessory, a plurality of the plurality of mounting locations each includes an electrical node, a power supply coupled to the mounting device, and an electrical supply line electrically couples the power supply to each of the electrical nodes, the electrical supply line contained at least partially within the mounting device.

In some embodiments, the mounting device includes a recessed retaining groove configured to slidably, adjustably, and simultaneously receive a plurality of the at least one accessory thereon. In some embodiments, a top surface of the mounting device between a top edge of the mounting device and the retaining groove includes at least one mounting location. In some embodiments, the at least one mounting location on the top surface of the mounting device includes a Hall Effect sensor. In some embodiments, the at least one mounting location on the top surface of the mounting device includes a threaded recess configured to receive a fastener from the at least one accessory. In some embodiments, the recessed retaining groove comprises a flat inner surface and a pair of angled sidewalls opposed to the inner surface. In some embodiments, the recessed retaining groove is a first retaining groove, the mounting device includes a second retaining groove configured to receive at least one of the at least one accessory, the second retaining groove being at an oblique angle relative to the first retaining groove.

In some embodiments, the recessed retaining groove is configured to receive the at least one accessory in at least a first location and a second location along a length of the retaining groove, the at least one accessory is configured to be coupled to the electrical node to electrically connect the at least one accessory to the electrical supply line when the at least one accessory is in the first location and the accessory is configured to not be coupled to the electrical node and electrically disconnected from the electrical supply line when the accessory is in the second location.

In some embodiments, each electrical node includes a positive electrical contact, a negative electrical contact, a first data contact, and a second data contact that each has a contact surface exposed through an outer surface of the mounting device and configured to couple to corresponding pins from the at least one accessory. In some embodiments, the contact surfaces of the positive electrical contact, the negative electrical contact, the first data contact, and the second data contact are each flush with the outer surface of the mounting device.

In some embodiments, the helmet accessory mounting system further comprises a power source mount coupled to the mounting device, the power source mount has a concaved inner surface configured to correspond to a curvature of a rear surface of the helmet, the power source being removeably coupled to the power source mount. In some embodiments, the helmet accessory mounting system further comprises a data transmission line coupled between the power supply and the mounting device and configured to transfer data between one of the at least one accessory and another of the at least one accessory. In some embodiments, the power source mount is coupled to the mounting device by an adjustable fastener configured to move the mounting device relative to the power source mount to adjust the helmet accessory mounting system to a size of the helmet.

In some embodiments, the power source mount includes a hot shoe configured to electrically couple the power supply to the mounting device. In some embodiments, the mounting device includes a receiving socket at a front side of the mounting device configured to receive a cable, wherein the receiving socket is configured to establish at least one of an electric connection or data connection between the power supply and an accessory mounted on a front portion of the helmet.

In some embodiments, the mounting device is a first mounting device configured to couple to the outer surface of a first side of the helmet, the plurality of mounting locations is a first plurality of mounting locations, each electrical node is a first electrical node, the helmet accessory mounting system further comprises a second mounting device configured to couple to the outer surface of a second side of the helmet opposite the first side and includes a second plurality of mounting locations for removeably coupling to the at least one accessory, each of the second plurality of mounting locations includes a second electrical node, and a second electrical supply line electrically coupling the power supply to each of the second electrical nodes and contained at least partially within the second mounting device.

In some embodiments, the helmet accessory mounting system further comprises a sensor configured to sense a condition associated with the accessory being coupled to the mounting device. In some embodiments, the helmet accessory mounting system further comprises a switch in the electrical supply line, wherein the switch is closed when the sensor senses the condition associated with the accessory being coupled to the mounting device. In some embodiments, an accessory presence sensor is configured to sense a magnetic field associated with the accessory.

In some embodiments, the power supply comprises a first series-connected battery set that includes at least one battery cell connectable in series electrical communication, a second series-connected battery set that includes at least one battery cell connectable in series electrical communication, the second series-connected battery set connected in parallel electrical communication with the first series-connected battery set, and a first modular battery circuit in series electrical communication with the first series-connected battery set and a second modular battery circuit in series electrical communication with the second series-connected battery set, the first modular battery circuit and the second modular battery circuit being configured to prevent battery cell balancing.

In some embodiments, the first modular battery circuit includes battery control circuitry connected to the first series-connected battery set at a battery interconnection node, the battery control circuitry connected to ground at a ground interconnection node, the battery control circuitry configured to prevent current from flowing from a positive terminal to a negative terminal through the battery cells of the first series-connected battery set, the battery control circuitry including a transistor in series electrical communication with first series-connected battery set, and a voltage drop detector circuit configured to detect a voltage drop from the battery interconnection node to the ground interconnection node while the battery control circuitry is preventing current from flowing from a positive terminal to a negative terminal through the battery cells and turn off the transistor of the battery control circuitry to prevent current from flowing through the transistor of the battery control circuitry.

In some embodiments, the helmet accessory mounting system further comprises for each electrical node, an enable circuit in electrical communication with the respective electrical node, the enable circuit is configured to sense an attachment of an accessory at an electrical node, and output an enable signal in response to determining that an accessory is connected to a respective electrical node, and a current limiting circuit in electrical communication with the enable circuit and the power supply, the current limiting circuit is configured to receive the enable signal from the enable circuit to enable the current limiting circuit, receive electrical power from the power supply, and in response to receiving the enable signal, limit an amount of electrical current in the electrical power provided by the power supply to the respective accessory to mitigate or prevent damage to the respective accessory, the power supply or the mounting device. In some embodiments, the amount of electrical current is limited to less than a predetermined threshold.

In some embodiments, the current limiting circuit including a temperature detection circuit configured to, while the current limiting circuit is enabled, detect an internal temperature of components of the current limiting circuit, and in response to detecting that the internal temperature of the components of the current limiting circuit exceeds a threshold, disabling the current limiting circuit to prevent the respective accessory from receiving electrical power from the power supply, and in response to detecting that the internal temperature of the components of the current limiting circuit falls below a threshold, re-enabling the current limiting circuit to allow the respective accessory to receive electrical power from the power supply.

In some embodiments, the at least one accessory has one of at least two separate voltage requirements, the helmet accessory mounting system further comprises a power switching circuit configured to receive a power signal from the power supply, and select and transmit a low voltage or a high voltage to the at least one accessory based on an operating voltage signal received from the at least one accessory indicating a voltage requirement of the at least one accessory.

In some embodiments, the power switching circuit includes a regulator circuit configured to supply the low voltage at a constant voltage to the at least one accessory and a voltage decay simulation circuit configured to, while the regulator circuit is transmitting the low voltage at a constant voltage, generate an adjustment voltage inversely proportional to the power signal from the power supply such that the adjustment voltage increases as a voltage of the power signal decreases, subtracting the adjustment voltage from the low voltage to create an adjusted low voltage that is transmitted to the at least one accessory. In some embodiments, the adjusted low voltage varies as a function of an environmental temperature at the helmet.

In some embodiments, the power switching circuit includes a voltage drop reduction circuit configured to mitigate a difference in voltage between the power signal and the high voltage transmitted to the at least one accessory caused by one or more semiconductor components in an electrical communication path between the power signal and the high voltage transmitted to the at least one accessory. In some embodiments, the hot shoe of the power source mount includes a plurality of contacts including a plurality of power supply contacts configured to transfer power from the power source to the at least one accessory and a plurality of data contacts configured to transfer data between a controller at the power source and a controller at the at least one accessory.

In some embodiments, a total number of the plurality of contacts is at least 19 contacts positioned within a maximum area of about 0.35 inches. In some embodiments, at least some of the plurality of data contacts are high-speed data contacts, wherein the high speed data contacts are spaced apart from each other by at least 0.210 inches. In some embodiments, a diameter of the plurality of contacts is about at least 0.072 inches. In some embodiments, a minimum distance between any of the high-speed data contacts and any other contacts of the plurality of contacts is at least 0.148 inches.

In some embodiments, the helmet accessory mounting system further comprises a helmet controller, and a data line coupling at least one of the electrical nodes to the helmet controller, wherein the helmet controller is configured to exchange first accessory data with a first accessory connected at one of the electrical nodes, via the data line, using one of a plurality of bandwidth-specific communication protocols selected based on bandwidth capability characteristics of the first accessory. In some embodiments, the helmet controller is configured to receive the first accessory data from the first accessory, for transmission to a second accessory, using a first bandwidth-specific communication protocol, determine bandwidth capability characteristics of the second accessory, in response to determining the bandwidth capability characteristics of the second accessory, select a second bandwidth-specific communication protocol based on the bandwidth capability characteristics of the second accessory, and transmit the first accessory data to the second accessory.

In some embodiments, the first accessory is configured to receive controller data from the helmet controller, using a first bandwidth-specific communication protocol, generate first accessory data based on the controller data, select a second bandwidth-specific communication protocol based on at least one of the bandwidth capability characteristics of the second accessory and bandwidth requirements of the first accessory data, and transmit first accessory data to the second accessory. In some embodiments, the plurality of bandwidth-specific communication protocols includes a low-bandwidth communication protocol and a high-bandwidth communication protocol.

In some embodiments, the helmet accessory mounting system further comprises a helmet controller in electrical communication with each of the electrical nodes, and a data line coupling each of the electrical nodes, wherein the helmet controller is configured to: periodically probe each of the electrical nodes to determine if a respective accessory is connected to the respective electrical node; and in response to determining that a respective accessory is connected to the respective electrical node: enable power at the electrical node, transmit a broadcast discover message to the respective accessory at the electrical node, receive product identification and device identification information validate the respective accessory using the product identification and device identification, assign a node identifier to the respective electrical node, transmit the node identifier to the respective accessory at the electrical node for the respective accessory to register the node identifier, and exchange accessory data with the respective accessory.

In some embodiments, the helmet accessory mounting system further comprises a data line coupling each of the electrical nodes, wherein the data line is configured to transmit first accessory data from a first accessory connected at one of the electrical nodes to a second accessory connected at another of the electrical nodes. In some embodiments, the first accessory data includes first accessory state data representative of the state of the first accessory, wherein the second accessory changes from operating in a first state to operating in a second state in response to receiving the first accessory state data from the first accessory.

In some embodiments, the helmet accessory mounting system further comprises: a helmet controller in electrical communication with the data line, the helmet controller configured to: receive the first accessory data from the first accessory, the first accessory data including first accessory state data; and in response to receiving the first accessory data, transmit an accessory control command to the second accessory to cause the second accessory to change from operating in the first state to operating in a second state.

In some embodiments, the first accessory generates the first accessory state data in response to a state change of the first accessory. In some embodiments, the state change of the first accessory is in response to a user command received at the first accessory. In some embodiments, the first accessory is a first strobe, the second accessory is a second strobe, the first accessory state data represents a strobe pulse rate, brightness and strobe duration rate of the first accessory, and the second accessory changing from operating in a first state to operating in a second state includes strobing the second accessory at the strobe pulse rate, brightness, and strobe duration rate of the first accessory. In some embodiments, the first accessory is a strobe light, the second accessory is a flashlight, the first accessory state data represents one of, the strobe light operating in a visible light mode and the strobe light operating in an infrared mode, and the second accessory changing from operating in a first state to operating in a second state includes one of the flashlight operating in a visible light mode and the flashlight operating in an infrared mode.

In some embodiments, the first accessory is a battery pack, the second accessory is night vision goggle, the first accessory state data represents a low battery state, and the second accessory changing from operating in the first state to operating in the second state includes changing from enabling a thermal camera and augmented reality at the night vision goggles to disabling the thermal camera and augmented reality at the night vision goggles. In some embodiments, the first accessory is battery pack, the second accessory is a flashlight, the first accessory state data represents low battery, and the second accessory changing from operating in the first state to operating in the second state includes operating in a high brightness setting to a dim setting. In some embodiments, the first accessory is a battery pack; the second accessory is a communications headset; the first accessory state data represents low battery; and the second accessory changing from operating in the first state to operating in the second state includes periodically outputting a low battery warning with a time remaining indication at the communications headset. In some embodiments, the first accessory is an end user device, the second accessory is a strobe light, the first accessory state data represents a strobe pulse rate, strobe duration rate, brightness, and color of the strobe light selected by an operator at the end user device, and the second accessory changing from operating in the first state to operating in the second state includes changing strobe pulse rate, strobe duration rate, brightness, and color settings of the strobe light.

In another embodiment, there is a helmet that has an outer surface, the outer surface has a first side and a second side opposed to the first side and a rear surface between the first side and second side, a power source, an accessory mounting assembly that comprises, a first mounting device that is coupled to the first side of the outer surface of the helmet and includes a plurality of first mounting locations for removeably coupling to at least one accessory of a plurality of accessories, a plurality of the plurality of first mounting locations each includes an electrical node, a second mounting device coupled to the second side of the outer surface of the helmet and includes a plurality of second mounting locations for removeably coupling to at least one accessory of the plurality of accessories, a plurality of the plurality of second mounting locations each includes an electrical node, and a power source mount coupled to the outer surface of the helmet, the power source mount has a concaved inner surface configured to correspond to a curvature of the rear surface of the outer surface of the helmet, the power source mount includes at least one mounting location, wherein the corresponding first mounting device and second mounting device are each adjustably coupled to the power source mount by an adjustable fastener, each of the adjustable fasteners configured to move the first mounting device and second mounting device relative to the power source mount to adjust the accessory mounting assembly to a size of the helmet, wherein the power source is removeably coupled to the at least one mounting location of the power source mount, wherein the power source is configured to provide power to each of the electrical nodes, wherein the power source includes a controller configured to exchange data with each of the electrical nodes, wherein a bottom edge of the first mounting device, second mounting device, and power source mount are each disposed on the outer surface of the helmet above a bottom edge of the helmet, wherein each electrical node includes a positive electrical contact, a negative electrical contact, a first data contact, and a second data contact each having a contact surface exposed through an outer surface of the corresponding first mounting device and second mounting device, each electrical node configured to couple to corresponding pins from the at least one accessory of the plurality of accessories.

In another embodiment, there is an accessory for mounting to a helmet that comprises a body housing electronics and that has a proximal end configured to releasably couple to a mount attached to the helmet, a spacing surface coupled to the proximal end, a plurality of pins extend through the spacing surface, each of the plurality of pins being spring biased relative to the body, the plurality of pins forming a T-shape, and an elastomeric seal that is disposed on the spacing surface and surrounds the plurality of pins.

In some embodiments, the accessory further comprises an accessory controller configured to, while the accessory is mounted to the helmet at a respective electrical node, receive a broadcast discover message from a helmet controller positioned at the helmet, in response to receiving the broadcast discover message, transmit product identification and device identification information indicative of the accessory, and after the helmet controller validates the respective accessory using the product identification and device identification and transmits a node identifier to the electrical node, exchange accessory data with the helmet controller.

In some embodiments, the plurality of pins includes two pins along a first imaginary reference line and two pins along a second imaginary reference line, the second line bisecting the first line. In some embodiments, the plurality of pins include at least one power pin configured to connect a power source mounted on the helmet to one or more electrical components at the accessory when the accessory is coupled to the mount attached to the helmet, wherein the plurality of pins include at least one data pin configured to connect a controller mounted on the helmet to the one or more electrical components at the accessory. In some embodiments, the accessory further comprises a magnet extending from the proximal end. In some embodiments, the body includes a light source. In some embodiments, the accessory further comprises an ear cup coupled to the body.

BRIEF DESCRIPTION OF THE SEVERAL VIEWS OF THE DRAWINGS

The foregoing summary as well as the following detailed description of embodiments of the helmet accessory mounting system will be better understood when read in conjunction with the appended drawings of exemplary embodiments. It should be understood, however, that the invention is not limited to the precise arrangements and instrumentalities shown. For example, although not expressly stated herein, features of one or more various disclosed embodiments may be incorporated into other of the disclosed embodiments.

In the drawings:

FIGS. 32A-C is a schematic representation and pinout table of an electrical interface of a hotshoe in accordance with an exemplary embodiment of the present invention;

DETAILED DESCRIPTION OF THE EXEMPLARY EMBODIMENTS OF THE INVENTION

Figure 1A:
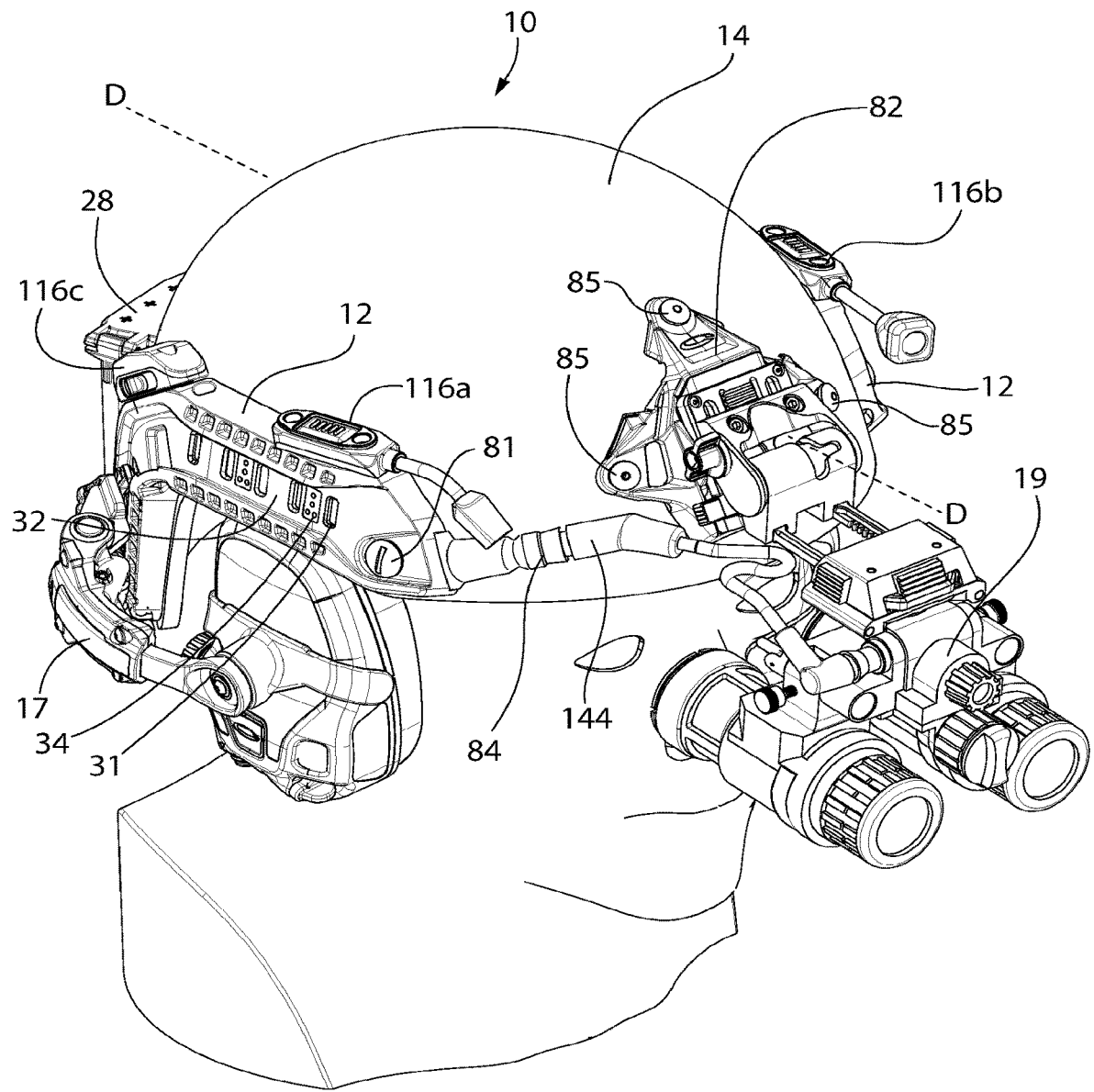
FIG. 1A is a front perspective view of an exemplary embodiment of a helmet and accessory mount system with a communication mount arm at the rear of a rail and accessories attached thereto in accordance with an exemplary embodiment of the present invention.

Existing helmet systems have stand-alone accessories each having their own power source and do not communicate with other accessories or helmet systems. The helmet accessory mounting system described herein provides power to one or more accessories from a single or reduced number of power sources. The helmet accessory mounting system described herein also provides a data connection between two or more accessories mounted on a single helmet and/or between two or more accessories, each mounted on a different helmet.

Referring to the drawings in detail, wherein like reference numerals indicate like elements throughout, there is shown in FIGS. 1-22C, an accessory mounting system, generally designated 10, and accessories associated therewith, in accordance with an exemplary embodiment of the present invention.

Referring to FIG. 1A, a helmet accessory mounting system 10 may include a mounting device configured to couple a plurality of accessories to a helmet 14. Helmet 14 may be any type of head protection helmet known in the art, for example, those used for sporting, industrial safety, police, or military purposes. In certain embodiments, helmet 14 is a standard infantry ballistic helmet. In some embodiments, helmet 14 is an advanced combat helmet (ACH), an enhanced combat helmet (ECH), a modular integrated communications helmet (MICH), a tactical ballistic helmet (TBH), a lightweight marine helmet, police general duty helmet, a personnel armor system for ground troops (PASGT), a high cut tactical helmet such as the FAST SF helmet, or an aircrew helmet, such as an HGU-56/P rotary wing helmet or an HGU-55/P fixed wing helmet. In some embodiments, helmet 14 is a type I, II, and class E, G, or C hard hat.

The mounting device may be comprised of one or more mounting features (e.g. one or more rails 12, power source mount 60, shroud 82) and may be collectively referred to as a mounting device, mounting assembly, accessory mounting assembly or a mounting system. The mounting device may include one or more nodes (e.g. track nodes 34, top nodes 110) configured to couple accessories to the helmet accessory mounting system 10. The helmet accessory mounting system 10 may include a centralized power unit (e.g. power supply 28) which is extended along a cable network (e.g. electrical connector 26, cable 124) around the helmet 14. The centralized power unit may be a "smart" power source configured to simultaneously and selectively provide power to one or more accessories (e.g. top accessories 116) coupled to the one or more nodes of the helmet accessory mounting system 10. A centralized power unit may provide for an improved weight distribution as compared to existing systems in which each accessory is connected to its own power supply. The centralized power unit may be configured to use a single type of battery (e.g. AA, AAA, CR123, rechargeable batteries), or a fuel cell, in order to power a plurality of different accessories as opposed to the mix of battery types required in existing systems. The centralized power unit may include a centralized processor or controller (e.g. controller 134) configured to control power management to one or more accessories independent of one another.

The helmet accessory mounting system 10 may be configured such that the helmet 14 is kept clear of any exposed cables and wires used to electrically couple accessories to the helmet 14. In one embodiment, the helmet accessory mounting system 10 does not have any components that extend over or attach to the crest of the helmet 14 to help prevent an operator who is wearing the helmet 14 from colliding with environmental features and to help reduce snag hazards. In one embodiment, the helmet accessory mounting system 10 does not require any bungees, straps or hook and loop fasteners to couple the mounting device to the helmet 14.

In some embodiments, the helmet 14 and helmet accessory mounting system 10 are integrally formed. In some embodiments, the helmet accessory mounting system 10 may be adjustably sized to be retrofit onto an existing helmet 14. In some embodiments, the helmet accessory mounting system 10 may be detachably coupled to the helmet 14 by fasteners. In some embodiments, the helmet accessory mounting system 10 may be configured to be coupled to a helmet 14 without any fasteners extending through the helmet 14. In some embodiments, the helmet accessory mounting system 10 couples to the helmet through a helmet cover.

Figure 2:
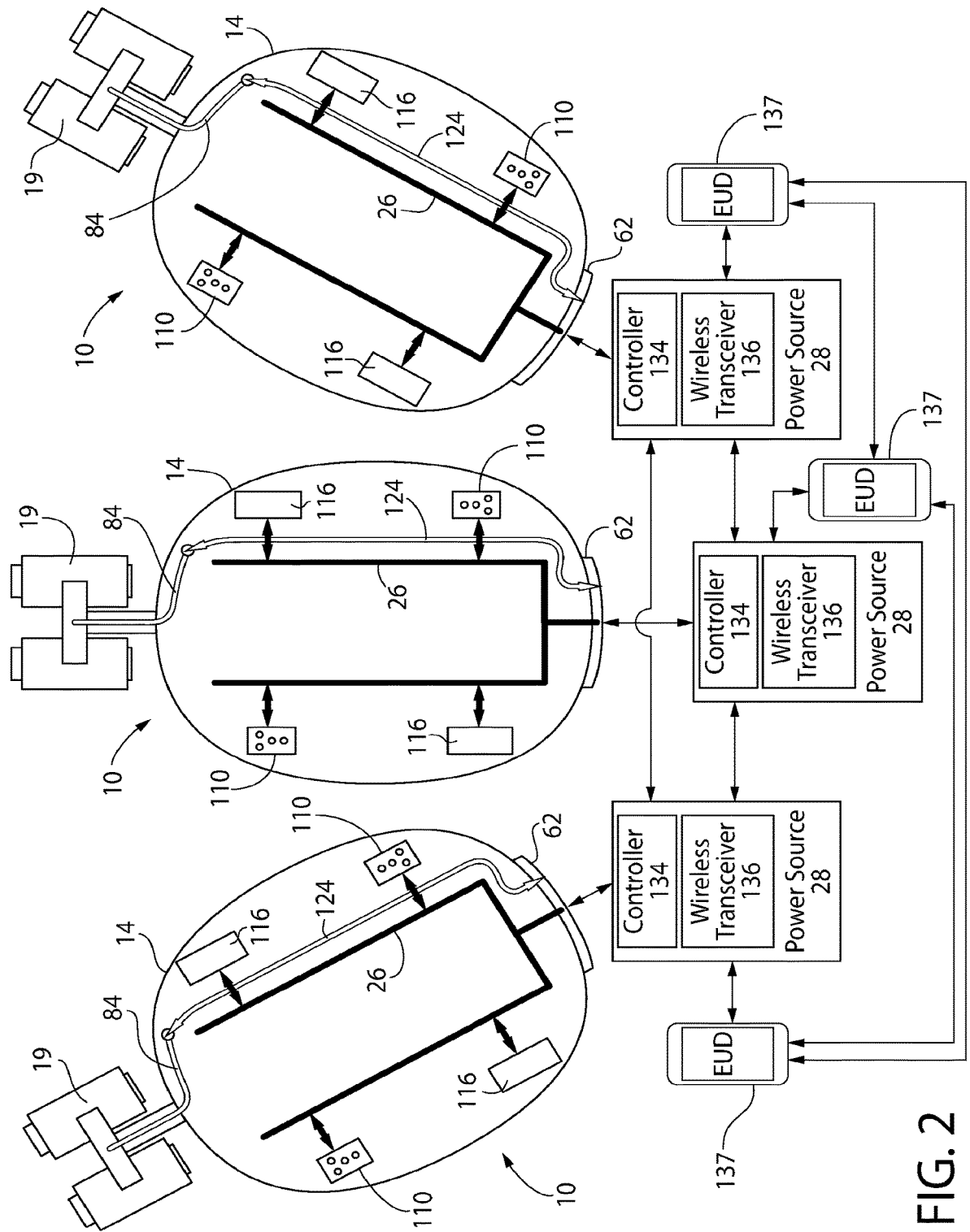
FIG. 2 is a system diagram of a helmet accessory mounting system in accordance with an exemplary embodiment of the present invention schematically illustrating the intra-helmet communication as well as communication with other helmet mounting systems.

FIG. 2 is a schematic illustrating intra-helmet communication as well as communication with other helmet accessory mounting systems as shown and described herein. The cable network of helmet accessory mounting system 10 as discussed further below may provide intra-helmet communication between accessories coupled to the helmet accessory mounting system 10. The centralized power unit may include a wireless communication device (e.g. wireless transceiver 136) such that the helmet accessory mounting system 10 can communicate with one or more other helmet accessory mounting systems 10. The helmet accessory mounting system 10 may be configured to communicate with additional devices (e.g., end user devices 137 ("EUD"), external radios, USB hubs) in order to facilitate communication between one or more helmets 14. In some embodiments, the helmet accessory mounting system 10 may include an integrated global positioning system ("GPS"). The GPS may be integrated into the power source 28. In some embodiments, the GPS is integrated into at least one of rails 12, shroud 82, or an accessory coupled to the helmet accessory mounting system 10, as described below. In some embodiments, the helmet accessory mounting system 10 may be configured to communicate with a GPS system of an EUD 137.

Referring to FIGS. 1A-5, the helmet accessory mounting system 10 may include one or more mounting devices (e.g. rail 12) configured to couple to a helmet 14. The helmet accessory mounting system 10 may include a centralized power unit (e.g. power source 28) having a plurality of electrical and data lines extended along a plurality of nodes (e.g. track nodes 34 and top nodes 110). The helmet accessory mounting system 10 may include a first rail 12 coupled to a first side of the helmet 14. The helmet accessory mounting system 10 may include a second rail 12 coupled to a second side of the helmet 14 opposed from the first side. The helmet accessory mounting system 10 may include a mounting device (e.g. power source mount 60) configured to couple to a power supply (e.g. power source 28). The power source mount 60 may be coupled to a rear side of the helmet 14. The helmet accessory mounting system 10 may include a mounting device (e.g. shroud 82) coupled to a front side of the helmet 14. The rails 12 may each include a recessed retaining groove (e.g. track 18) configured to couple accessories (e.g. track accessories 16, or communication mount 17) to helmet 14. The rails 12 may each include at least one mounting surface (e.g. top nodes 110 shown in FIG. 5) on a top surface 13 of rail 12, configured to couple accessories (e.g. top accessories 116) to helmet 14. In an alternative embodiment, an accessory, such as any of the accessories mentioned above, may include a universal node interface configured to be coupled to either the track 18 or a top surface 13 of rail 12.

The helmet accessory mounting system 10, as described herein, may include wired (e.g. USB hub) or wireless communication capabilities (e.g. wireless transceiver 136) to allow at least one accessory attached to the helmet accessory mounting system 10 to communicate with accessories attached to another accessory mount, attached to a different helmet or to allow the helmet accessory mounting system 10 to communicate with an end user device 137. The helmet accessory mounting system 10 may be in wired or wireless communication with a plurality of accessory mounts coupled to one or more additional helmet systems. For example, a first accessory mount coupled to a first helmet may include a first accessory (e.g. a first strobe light) which is in wireless communication with a second accessory (e.g. a second strobe light) attached to a second accessory mount coupled to a second helmet.

The rails 12 may be adjustably coupled to power source mount 60, as discussed in greater detail below, in order to fit to differently sized and shaped helmets. The power source mount 60 may be configured to provide at least one of an electrical and/or data connection between the rails 12 and power source 28 when the power source 28 is coupled to the power source mount 60. The power source mount 60 may be configured to provide at least one of an electrical and/or data connection between the shroud 82 and power source 28 when the power source 28 is coupled to power source mount 60. The rails 12 may include a plurality of mounting features (track nodes 34, top nodes 110) spaced at various positions around helmet 14. The plurality of mounting features may be spaced along the track 18 and top surface 13 configured to couple accessories to the rail 12. The rail 12 may be configured to selectively provide power from the power source 28 to an accessory coupled to a mounting location of the plurality of mounting locations. The plurality of mounting locations may include track nodes 34, positioned along track 18. The plurality of mounting locations may additionally include top nodes 110 positioned along the top surface 13 of rail 12.

Still referring to FIGS. 1A-5, the outer surface 32 of rail 12 may be shaped to form a recessed groove (e.g. track 18). The track 18 may comprise a flat outwardly facing surface outer and a pair of angled sidewalls opposed to the flat outwardly facing surface. The rail 12 may be configured to simultaneously couple to a plurality of accessories (e.g. track accessories 16, top accessories 116, communication mount 17). The track accessories 16 (FIGS. 11 and 13), and communication mount 17 may be configured to couple to the rail 12 in any of a plurality of positions along the length of the track 18. The top accessories 116a-c may be configured to couple to rail 12 in a plurality of positions along the top surface 13 of rail 12. The shroud 82 may be configured to couple an accessory (e.g. shroud accessory 19) to the helmet 14. The accessories depicted in FIGS. 1A-1C include lights 116a-b, strobe lights 116c, a communication mount 17, and a shroud accessory 19; however, additional accessories could also be attached to the helmet accessory mounting system 10. For example, a camera, a map light, a laser threat sensor, a biometrics sensor, a flashlight, a head tracking system, a global positioning system, memory storage, a digital compass, a chemical and biological sensor for detecting hazardous chemical and/or biological agents, a microphone and/or a heads up display may also be attached to the helmet accessory mounting system 10. Multiple top accessories 116a-c are shown in FIGS. 1A-1C, however any one of top accessories 116a-c may be generally referred to as top accessory 116 in the following description. Similarly, track accessories 16a-b (FIGS. 11 and 13) may be coupled to track 18 and generally be referred to as track accessories 16.

Referring to FIGS. 3-6, 9-10 and 17, in one embodiment, the rail 12 may include a track 18 configured to receive at least one track accessory 16 or communication mount 17. The rail 12 may be configured to receive at least one top accessory 116. The rail 12 may receive a plurality of accessories (e.g. top accessories 116, track accessories 16, communication mount 17) simultaneously in a plurality of positions. For example, the track 18 may receive at least one track accessory 16 in a first position along track 18 while simultaneously receiving communication mount 17 in a second position along track 18 and while simultaneously receiving a top accessory 116 in a position along the top surface 13 of the rail 12. The helmet accessory mounting system 10 may be configured to provide data communication between accessories that are simultaneously coupled to the rail 12, as discussed in more detail below.

Figure 3:
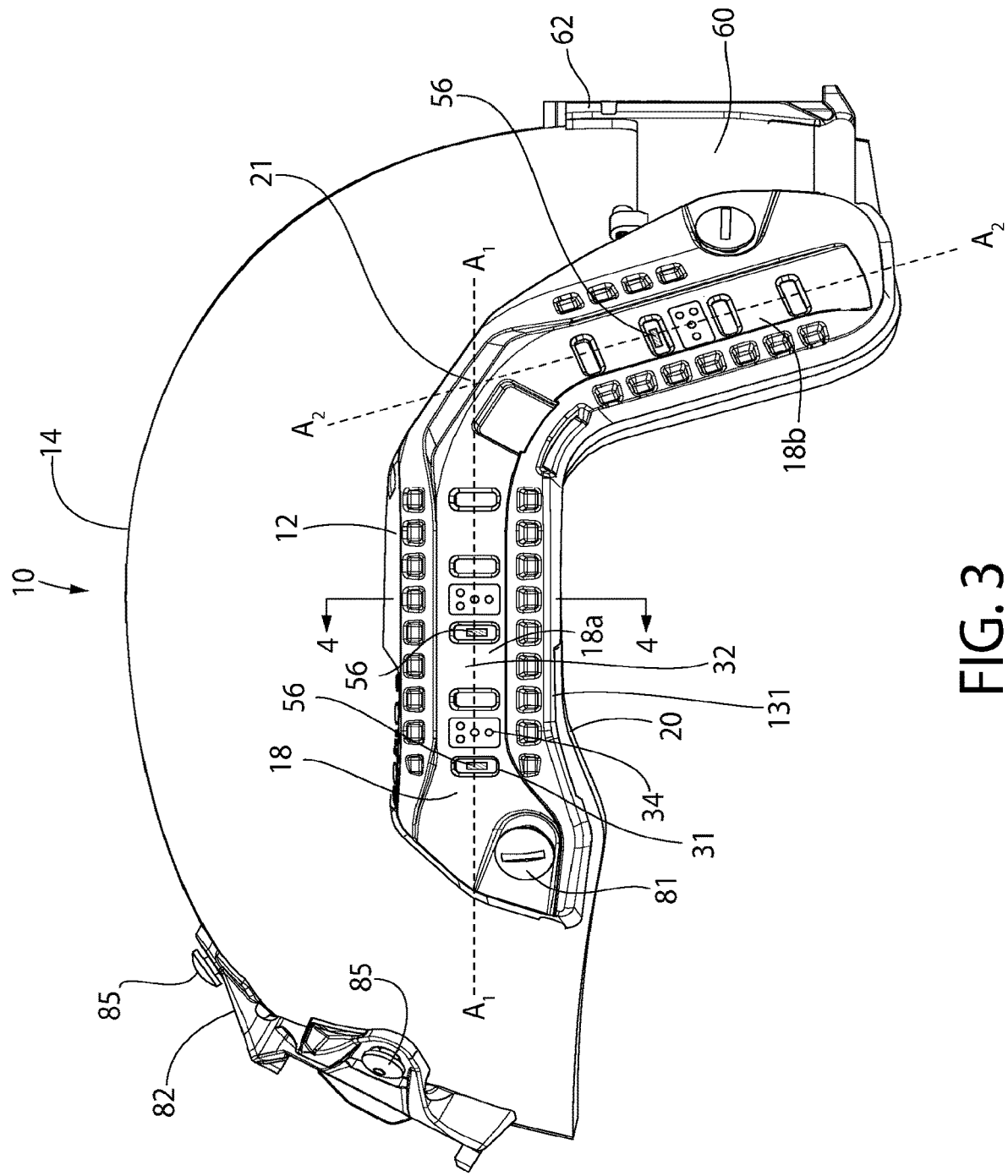
FIG. 3 is a left-side elevational view of the helmet accessory mounting system of FIG. 1A shown with the accessories removed, the right-side being substantially a mirror image.
Figure 4:
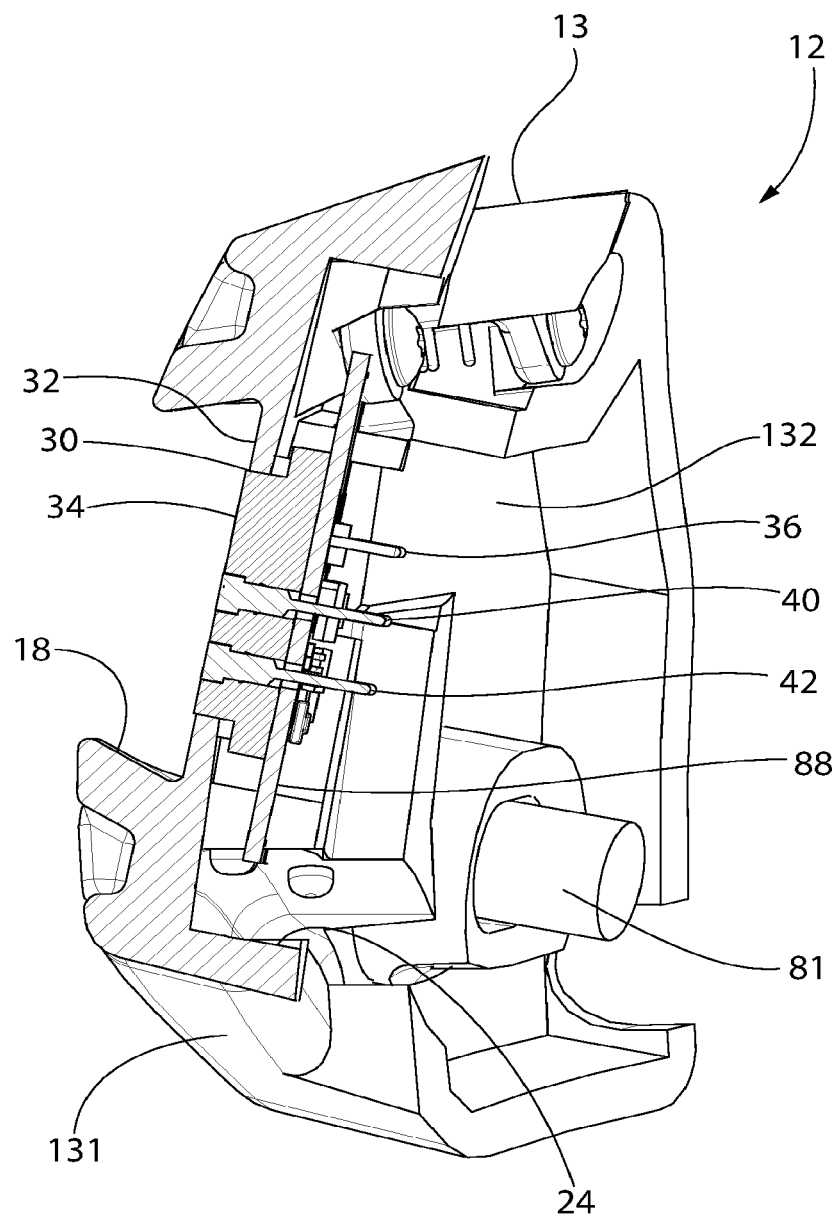
FIG. 4 is a cross sectional view of the rail of FIG. 1A taken along a plane defined by line 4-4 in FIG. 3.

Referring to FIG. 3-4, the track 18 may have a dovetail cross-sectional shape (FIG. 4) when viewed transverse or perpendicular to the length of the track, such as along a plane defined by line 4-4 (FIG. 3). The rail 12 may include a first track 18a and a second track 18b. The second track 18b may be at an oblique angle relative to the first track 18a. The first track 18a may be spaced from the second track 18b. For example, a space such as buckle attachment 21 may extend between the first track 18a and the second track 18b. In other embodiments, the first track 18a and second track 18b are coupled to form a continuous track along the length of the rail 12. Each of the first track 18a and second track 18b may be configured to receive an accessory connector of a corresponding accessory, as discussed in detail below. Each of the first track 18a and second track 18b may have a dovetail cross-sectional shape, as described above. The first track 18a may extend along a first axis $A_1$ and the second track 18b may extend along a second axis $A_2$. The first axis $A_1$ may be transverse to the second axis $A_2$. A major length of the first track 18a may extend along the first axis $A_1$. A major length of the second track 18b may extend along the second axis $A_2$. The track accessory 16 and communication mount 17 may couple to the rail 12 in any of a plurality of positions along either of the first track 18a or the second track 18b. The helmet 14 may include a bottom edge or rim 20 and the track 18 may be spaced from the rim 20. A bottom edge 131 of rail 12 may be spaced from rim 20. A track 18 that is spaced from the rim 20 may increase user comfort by allowing accessories to couple to the rail without wrapping around the rim 20 which could cause the accessories to contact a user's head or reduce the protection capabilities of the helmet 14. The rail 12 may be coupled to the helmet 14 using existing bolt holes 83 (FIG. 21) in the helmet 14 allowing for solid attachment to the helmet 14 without the need for creating additional holes in the helmet 14. In some embodiments, the helmet accessory mounting system 10 may be bolt-less such that it is configured to attach to a helmet without any bolt holes. One type of rail contemplated for use with the present invention is described in U.S. Pat. No. 7,908,667, the disclosure of which is hereby incorporated by reference herein.

Referring to FIGS. 4-5, 9, 16, and 21, the rail 12 may include one or more rail openings 30 (FIG. 21) extending through the outer surface 32 of the rail 12. In some embodiments, the rail openings 30 extend completely through the rail 12. A track node 34 may be positioned in a rail opening 30. The track node 34 may be configured to provide at least one of an electrical contact and a data contact between a connector (e.g. electrical connector 26) and a track accessory 16 (FIGS. 11-14B). The helmet accessory mounting system 10 may include a first track node 34 at a front of the rail 12. The helmet accessory mounting system 10 may include a second track node 34 at a rear of the rail 12. The helmet accessory mounting system 10 may include a third node 34 in between the front of the rail 12 and the rear of the rail 12. The helmet accessory mounting system 10 may include a first track node 34 in the first track 18a and a second track node 34 in the second track 18b (FIG. 3). In some embodiments, each rail 12 includes three track nodes.

The rail 12 may include one or more rail depressions 31 in an outer surface 32 of the rail 12. In some embodiments, the rail depressions 31 extend from the outer surface 32 toward an inner surface, but not through, the rail 12. In other embodiments, the rail depressions 31 extend completely through the rail 12. At least one of the rail depressions 31 on either side of a corresponding track node 34 may include a sensor 56. The rail depression 31 may be configured to receive a portion of the track accessory 16 to fix the position of the track accessory 16 relative to the rail 12, as explained in greater detail below.

Figure 5:
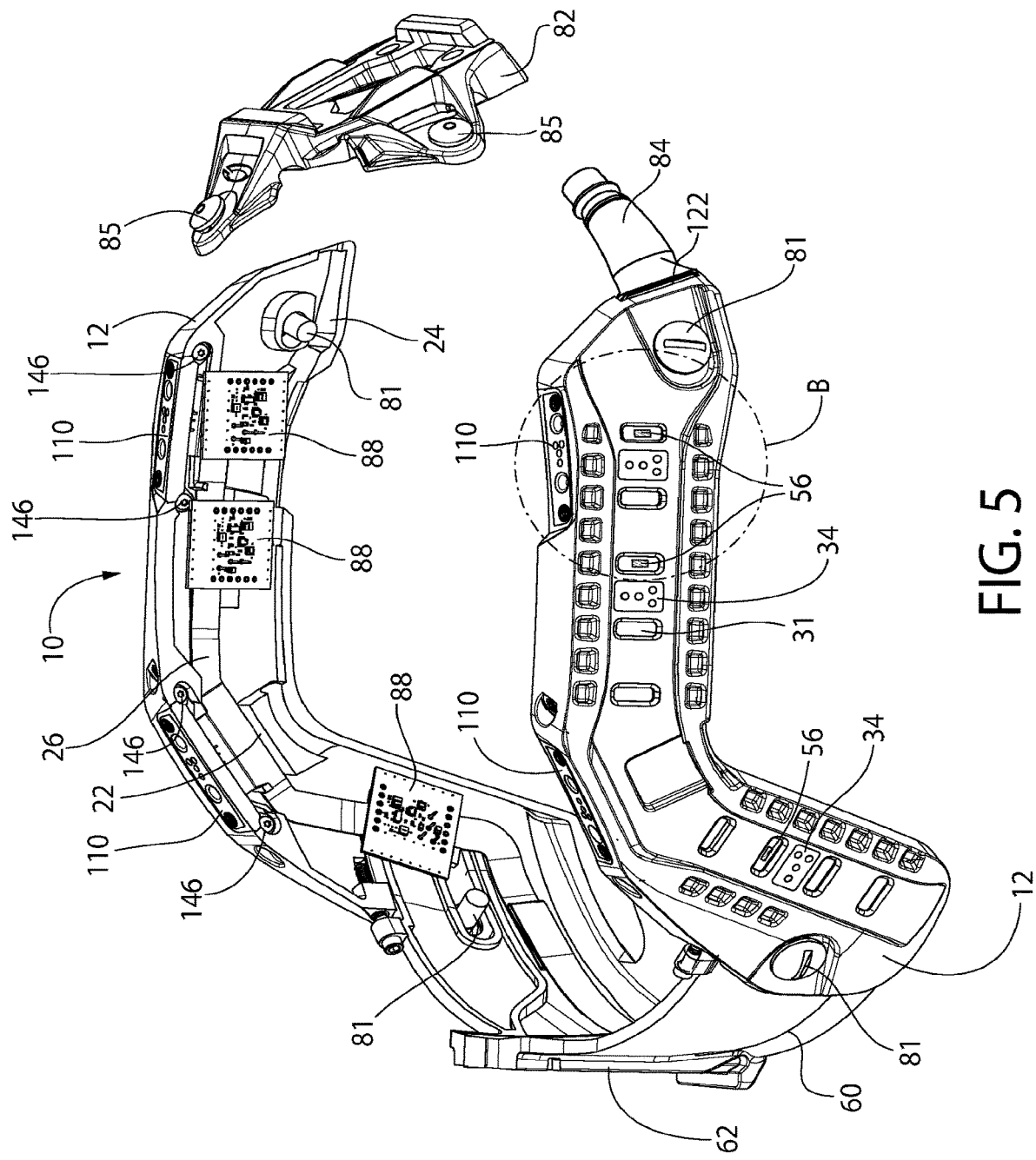
FIG. 5 is right-side perspective view of the accessory mount of FIG. 1A.
Figure 21:
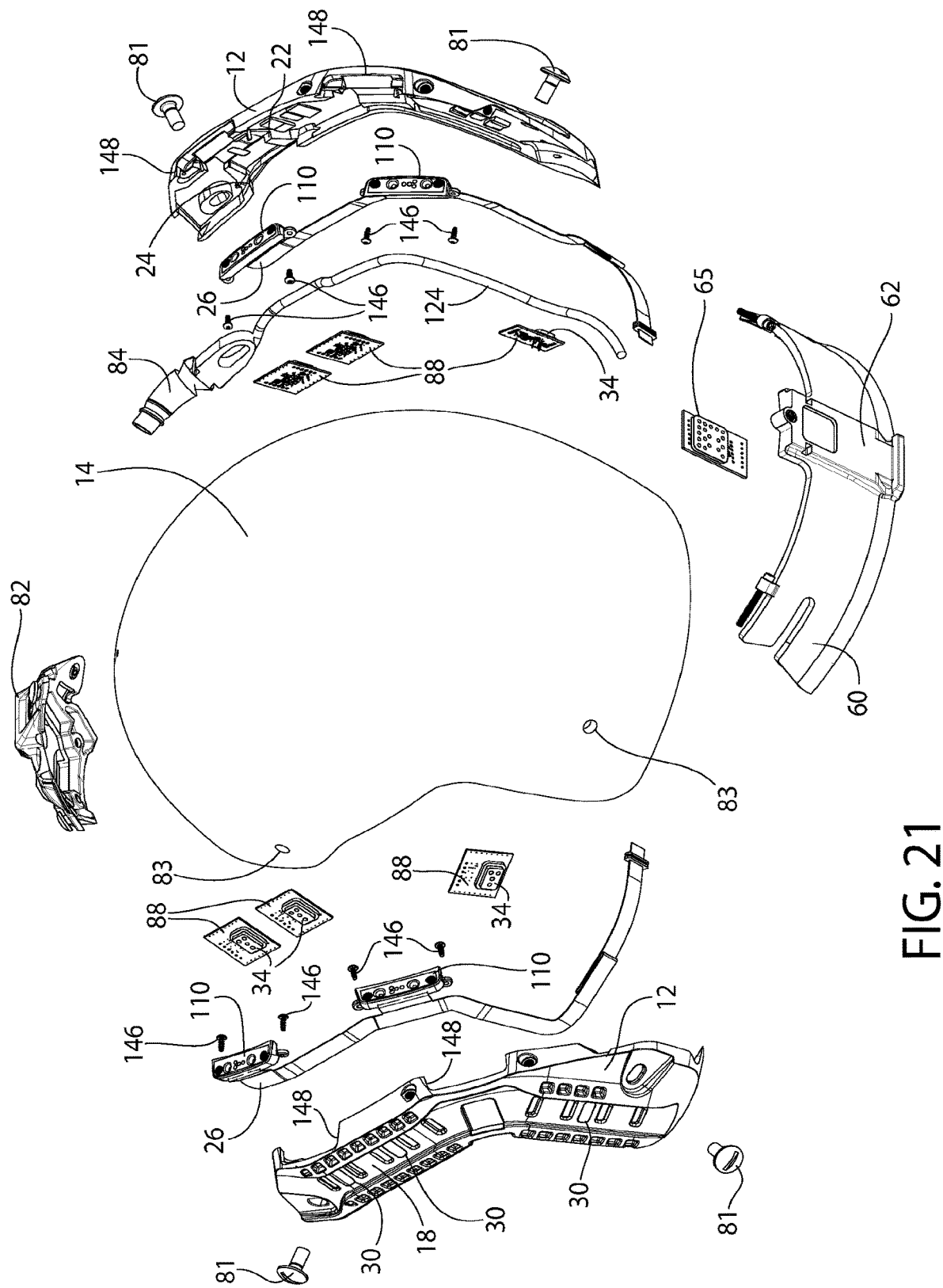
FIG. 21 is an exploded, rear perspective view of the accessory mount of FIG. 1A and the helmet.

Referring to FIG. 21, the rail 12 may include one or more top openings 148 extending through the top surface 13 of the rail 12. In some embodiments, the top opening 148 extends completely through the rail 12. A top node 110 may be positioned in a top opening 148. The top nodes 110 may be detachably coupled to the rail 12 by fasteners 146. Each top node 110 may include protrusions 140 on opposing sides of the top node 110. The protrusions 140 may include an opening sized to allow a threaded portion of fastener 146 to pass through. The rail 12 may include threaded receiving areas (not shown) proximal to the top opening 148 configured to receive fasteners 146. The fasteners 146 may pass through the openings in protrusions 140 and threadably couple to the rail 12 to couple the top nodes 110 to rail 12. The top node 110 may be configured to provide at least one of an electrical contact and a data contact between a connector (e.g. electrical connector 26) and a top accessory 116. The helmet accessory mounting system 10 may include a first top node 110 at a front of the rail 12. The rail 12 may include a second top node 110 between the rear and front of the rail 12. The second top node 110 may be positioned at the bend of the rail 12 (FIG. 5). In some embodiments, each rail 12 includes two top nodes 110.

Referring to FIGS. 16-20, it may be desirable to provide a mounting surface (e.g. power source mount 60) configured to couple a centralized power source (e.g. power source 28) to helmet 14. The power source 28 may be a battery pack. The power source 28 may provide power to any accessories 16 coupled to the rails 12. The power source 28 may provide hardwired or wireless data transfer between the power source 28 and any accessories (e.g. track accessories 16, top accessories 116, communication mount 17) coupled to the rail 12 or any devices (shroud accessory 19) coupled to a shroud 82. The power source 28 may act as a data hub and route communications between different accessories coupled to the helmet accessory mounting system 10 or between the accessories and external devices (e.g. EUD 137). The power source 28 may establish at least three paths of communication: 1) between a shroud accessory 19 and accessories coupled to the rails 12 (e.g. track accessories 16, top accessories 116, communication mount 17); 2) between a first accessory coupled to a rail 12 and a second accessory coupled to a rail 12; and 3) between any of the above mentioned accessories and an external device or system (e.g. EUD 137, another helmet accessory mounting system 10). In some embodiments, the power source 28 may include a wireless transceiver 136 to allow communication between accessories and external devices wirelessly. In another embodiment, the power source 28 may include a receiving port (e.g. USB port) adapted couple the helmet accessory mounting system 10 to an external device via a hardwired connection.

The power source 28 may include circuitry (FIG. 28) that permits groups (e.g., pairs) of series-connected batteries to be connected in parallel. The power source mount 60 may have a concaved inner surface configured to correspond to a curvature of a rear surface of the helmet 14. The rail 12 may be coupled to the helmet 14 using existing bolt holes 83 for a chinstrap (not shown) of the helmet 14. The power source mount 60 may also be coupled to the helmet using the existing bolt holes for the chinstrap of the helmet. The power source mount 60 may include a recess 80 configured to receive a fastener 81 (e.g., a bolt) to fix the power source mount 60 to the helmet 14. The recess 80 may be elongated to allow adjustability of the effective length of the power source mount 60 such that the power source coupling can be utilized with different sized helmets 14 having different distances between the rails 12.

Figure 19:
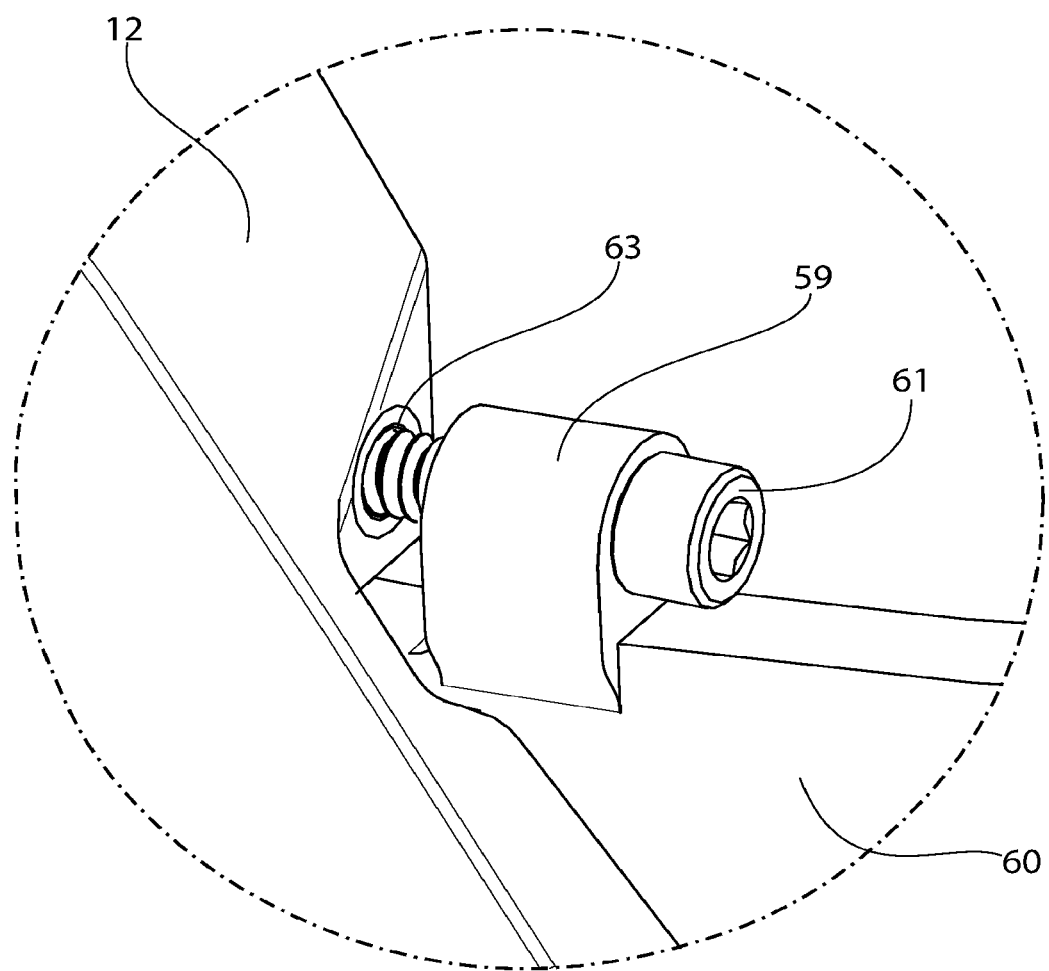
FIG. 19 is an enlarged view of the adjustment member of the power source mount shown within area D of FIG. 17.

The power source mount 60 may be coupled to the mounting device 10 by an adjustable fastener (e.g. adjustment member 61) configured to move the mounting device 10 relative to the power source mount 60 to adjust the mounting device 10 to a size of the helmet 14. The power source mount 60 may be configured to couple to rails 12 on at least one side of helmet 14. The power source mount 60, when coupled to rails 12 on both sides of the helmet 14, may be configured to adjust the spacing between rails 12 such that the rails 12 and power source mount 60 may can be tightly attached to helmets of different sizes. The power source mount 60 may include a size adjustment mechanism (e.g. adjustment members 61, and mounting boss 59) to allow for tensioning and position adjustment of the rail 12 relative to the power source mount 60 such that the rail 16 and power source mount 60 may fit on multiple sizes of helmets. Opposing ends of the power source mount 60 may each include a mounting boss 59. Each mounting boss 59 may include an opening configured to receive at least a portion of a corresponding adjustment member 61. In one embodiment, the opening in the mounting boss 59 is threaded. In another embodiment, the opening in the mounting boss 59 is smooth. Adjustment members 61 may have a head and a threaded portion. The head of the adjustment member 61 may be sized such that it cannot pass through the opening in the mounting boss 59. The threaded portion of the adjustment member 61 may be sized such that it may pass through the opening in the mounting boss 59 and into a corresponding adjustment channel 63 of a corresponding rail 12 (FIG. 19). The adjustment channel 63 may be a threaded hole. The adjustment channel 63 may include a threaded opening and/or a nut configured to receive a portion of the threaded portion of the adjustment member 61. When coupled to the mounting boss 59 and adjustment channel 63, the adjustment member 61 may be rotated to cause the corresponding rail 12 to be moved relative to the mounting boss 59. For example, rotating the adjustment member 61 in a first direction may threadably interact with the adjustment channel 63 causing the rail 12 to be moved towards the mounting boss 59. Alternatively, rotating the adjustment member 61 in a second direction, opposite the first direction, may threadably interact with the adjustment channel 63 causing the rail 12 to be moved away from the mounting boss 59.

Still referring to FIGS. 16-20, in one embodiment, the power source 28 may be detachably coupled to a power source mount 60. The power source mount 60 may be electrically coupled to the electrical connector 26 in the rail 12. The power source mount 60 may include a channel or groove to receive the electrical connector 26. The power source mount 60 may include a hot shoe 62 configured to couple to the power source 28. The hot shoe 62 may physically and electrically couple the power source 28 to the power source mount 60. Coupling the power source 28 to the hot shoe 62 may fix the position of the power source 28 relative to the hot shoe 62 while simultaneously electrically coupling the power source 28 to the hot shoe 62. The hot shoe 62 may be designed to couple to any of a plurality of power sources having differing size, shape, or voltages.

The hot shoe 62 may include an electrical interface 64. The electrical interface 64 may include one or more contacts or pins configured to receive corresponding contacts (e.g. contacts 92) on power source 28 as discussed below. At least one of the electrical interface 64 contacts may be a high-speed data contact. The one or more contacts on the electrical interface 64 may be positioned with an area of about 0.35 square inches. The electrical interface 64 may couple the data transfer line and the electrical transfer line of the electrical connector 26 to the power source 28. The hot shoe 62 may include a printed circuit board 65. The hot shoe 62 may be configured to limit the current from the power source 28 to track accessories 16 and top accessories 116 coupled to the rail 12 or a device coupled to a shroud. The hot shoe 62 may protect the power source 28 from a short circuit in the rail 12, track accessories 16, top accessories 116 or any devices coupled to the shroud 82. The hot shoe 62 or the track node 34 may be configured to step down the voltage supplied by the power source 28 to the voltage required by the track accessory 16 or top accessory 116. In some embodiments, the hot shoe 62 allows a relatively high distributed voltage to flow through the electrical connector 26 and at least one of the track node 34, the electrical connector 26, and the track accessory 16 steps down the voltage as necessary such that multiple accessories with different voltage requirements can be attached to the rail 12 simultaneously.

Figure 20:
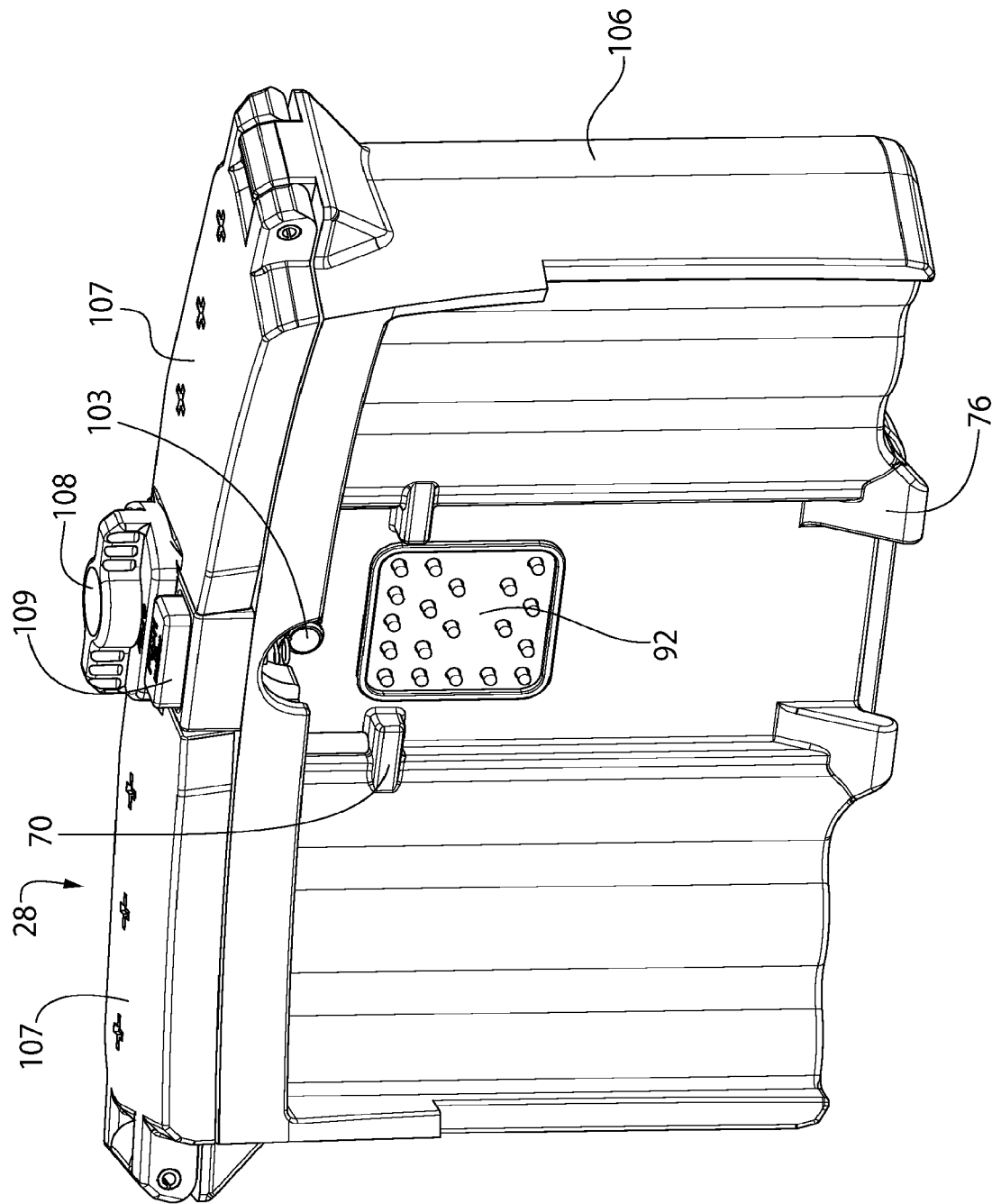
FIG. 20 is a front perspective view of the power source of FIG. 1A.

Still referring to FIGS. 16-20, the hot shoe 62 of power source mount 60 may include a first bracket 66. The first bracket 66 may include a first recess 68. The first recess 68 may be configured to receive a first protrusion 70 on the power source 28 (FIG. 20). In one embodiment, the first bracket 66 may define a threaded opening 104 (FIG. 18) configured to receive at least a portion of fastener 103 (FIG. 20) of power source 28. The hot shoe 62 may include a second bracket 72. The second bracket 72 may include a second recess 74. The second recess 74 may be configured to receive a second protrusion 76 on the power source 28. A major length of the first recess 68 may extend along an axis that is generally perpendicular to a rear surface (not shown) of the hot shoe 62. A major length of the second recess 74 may extend along an axis that is angled (e.g., downwardly and inwardly) relative to a rear surface of the hot shoe 62. The second bracket 72 may include a lip 73 that extends outwardly along an axis that is generally perpendicular to the rear surface of hot shoe 62. The power source 28 may translate relative to the hot shoe 62 (e.g., downwardly and inwardly) until the second protrusion 76 is seated within the second recess 74 and a portion of a bottom surface of the power source 28 rests on the lip 73. The power source 28 may then be rotated (e.g., about an axis parallel to the rear surface of the hot shoe 62) such that the first protrusion 70 moves into the first recess 68. The first protrusion 70 may move horizontally or nearly horizontally into the first recess 68. The offset orientation of the first protrusion 70 and the second protrusion 76 may help prevent accidental dislodgement of the power source 28 when it is coupled to the hot shoe 62. The hot shoe 62 may include two first recesses 68 on diametrically opposed sides of the hot shoe 62. The hot shoe 62 may include two second recesses 74 on diametrically opposed sides of the hot shoe 62.

Once the power source 28 is coupled to the hot shoe 62, fastener 103 of the power source 28 may be aligned with threaded opening 104 of hot shoe 62. The fastener 103 may be coupled to a first knob 105 such that a user can rotate the first knob 105 to threadably couple or decouple fastener 103 to threaded opening 104. When the fastener 103 is threadably coupled to threaded opening 104, the power source 28 may be locked to the hot shoe 62. The power source 28 may include contacts (e.g. contacts 92) configured to couple to contacts 64 of hot shoe 62 thereby providing at least one of a power connection and/or data connection to accessories coupled to the helmet accessory mounting system 10.

Figure 16:
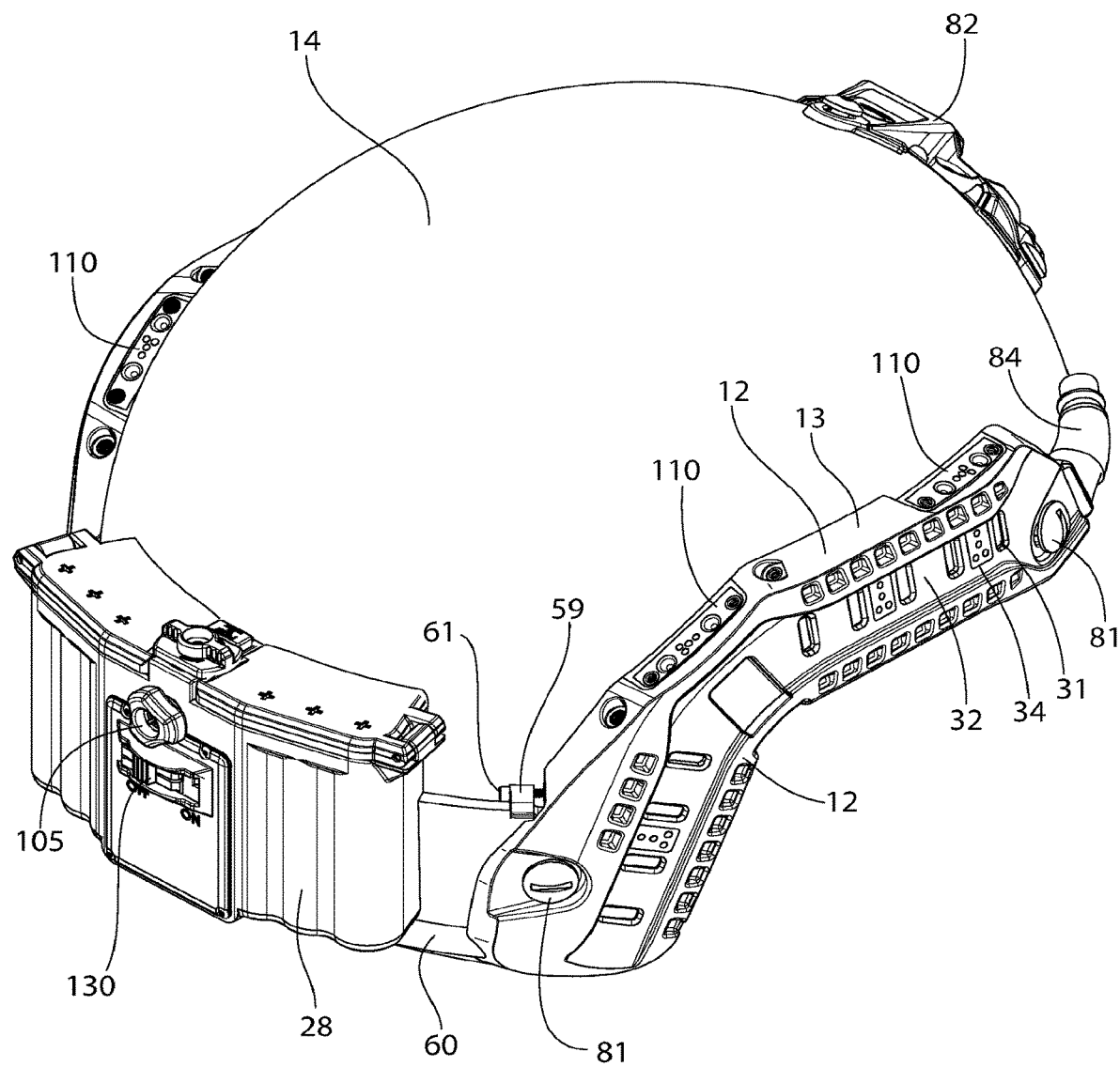
FIG. 16 is a rear, perspective view of the accessory mount of FIG. 1A shown coupled to the helmet, with a power source attached and without additional accessories.
Figure 17:
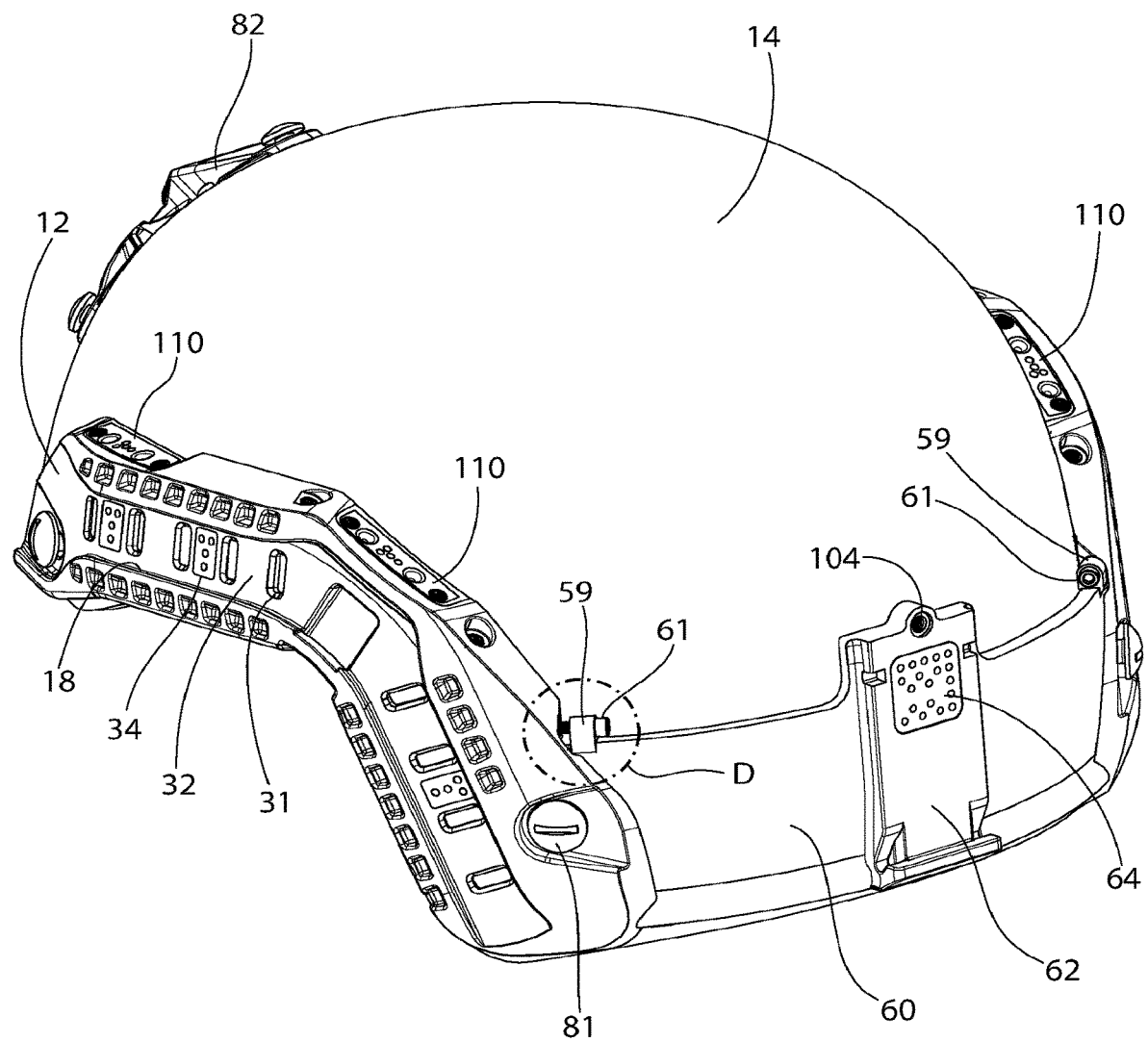
FIG. 17 is a rear perspective view of the accessory mount of FIG. 1A shown with the power source removed.

Still referring to FIGS. 16 and 20, the power source 28 may include a battery housing 106 for receiving batteries and various electrical and control components associated with the power source 28, as described below. The battery housing 106 may include a battery door 107 rotatably coupled to the battery housing 106. The batteries received in the battery housing 106 may be rechargeable batteries. The power source 28 may also include a battery door latch 108 for holding the battery doors 107 closed. The battery door latch 108 may be rotatable such that it can move between a first orientation, as shown in FIG. 20, where the battery doors 107 are held closed, and a second orientation, not shown, where the battery doors 107 can be opened. The battery door latch 108 may be a knob. The battery door latch 108 may be mechanically coupled to a button 109 that when depressed allows for rotation of the battery door latch 108. The battery door latch 108 and button 109 may be manually operated by an operator. The battery door latch 108 may be limited in the amount it can be rotated to allow for simple operation of the battery door latch 108 between a locked and unlocked orientation (e.g. between the first and second orientation). The battery door latch 108 may be limited to be rotated about ±90 degrees. The battery door latch 108 may be configured to remove any debris away during rotation between orientations to prevent any trapped material from limiting rotation of the battery door latch 108.

The button 109 may provide a level of safety by requiring an operator to depress the button 109 from an extended position to a depressed position before being able to rotate the battery door latch 108 into an unlocked orientation. The battery door latch 108 may be configured to retain the button 109 in the depressed orientation when the battery door latch 108 is in an unlocked orientation. For example, when the battery door latch 108 is in the unlocked position, a portion of the battery door latch 108 may cover the button 109 such that the button cannot return to the extended position. The button 109 may be spring loaded such that when the battery door latch 108 is rotated into the locked orientation the button 109 may return from a depressed position to an extended position to allow for simple operation of locking the battery doors 107. The button 109 may include drain holes, not shown, beneath the button to allow for fluids and debris trapped within the button to be automatically removed.

The battery housing 106 may include at least one spring, not shown, such that when batteries are loaded into the battery housing 106 and the battery doors 107 are closed the spring is depressed and the batteries are spring-loaded. Spring loading the batteries within battery housing 106 may cause the battery doors 107 to open automatically at least partially when the battery door latch 108 is rotated into the unlocked orientation. Accessories, (e.g. top accessories 116, track accessories 16, shroud accessory 19, communication mount 17) may still draw a level of power from power source 28 even when the accessories are not in use. Therefore, it may be desirable to provide a toggle such that the power source 28 may be toggled between providing or not providing power to the helmet accessory mounting system 10 and any accessories attached thereto. The power source 28 may include a switch 130 (FIG. 16) configured to toggle the power source 28 between an "On" and "Off" state such that the power source 28 may be toggled to provide or not provide power to the helmet accessory mounting system 10. In the "On" state, the power source 28 is electrically coupled to the rails 12, shroud 82, and any accessories attached thereto, as described above. In the "Off" state, the power source 28 is electrically decoupled from the rails 12, shroud 82, and any accessories attached thereto such that none of the accessories, rails 12, and shroud 82 are able to draw power from power source 28. Alternatively, the power source 28 may be mounted on a different surface, such as a user's clothing or accessories such as a belt or backpack, and electrically coupled to the mounting device. In some embodiments, the power source 28 may include a charging port or receptacle configured to receive a charging cord or plug to charge at least one of a rechargeable battery housed within the battery housing 106.

Figure 23A:
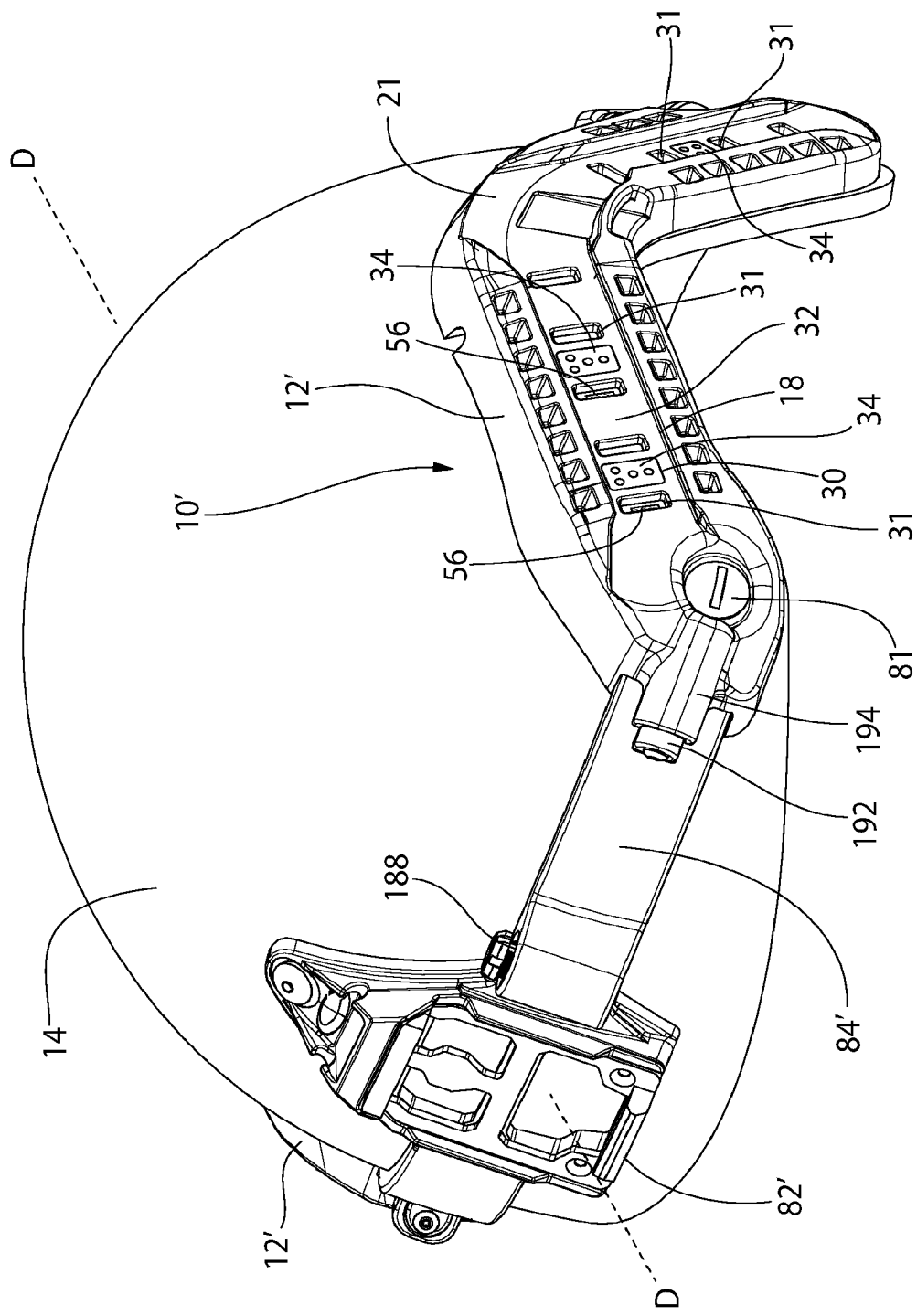
FIG. 23A is a front, perspective view of helmet accessory mounting system in accordance with another exemplary embodiment of the present invention.
Figure 23B:
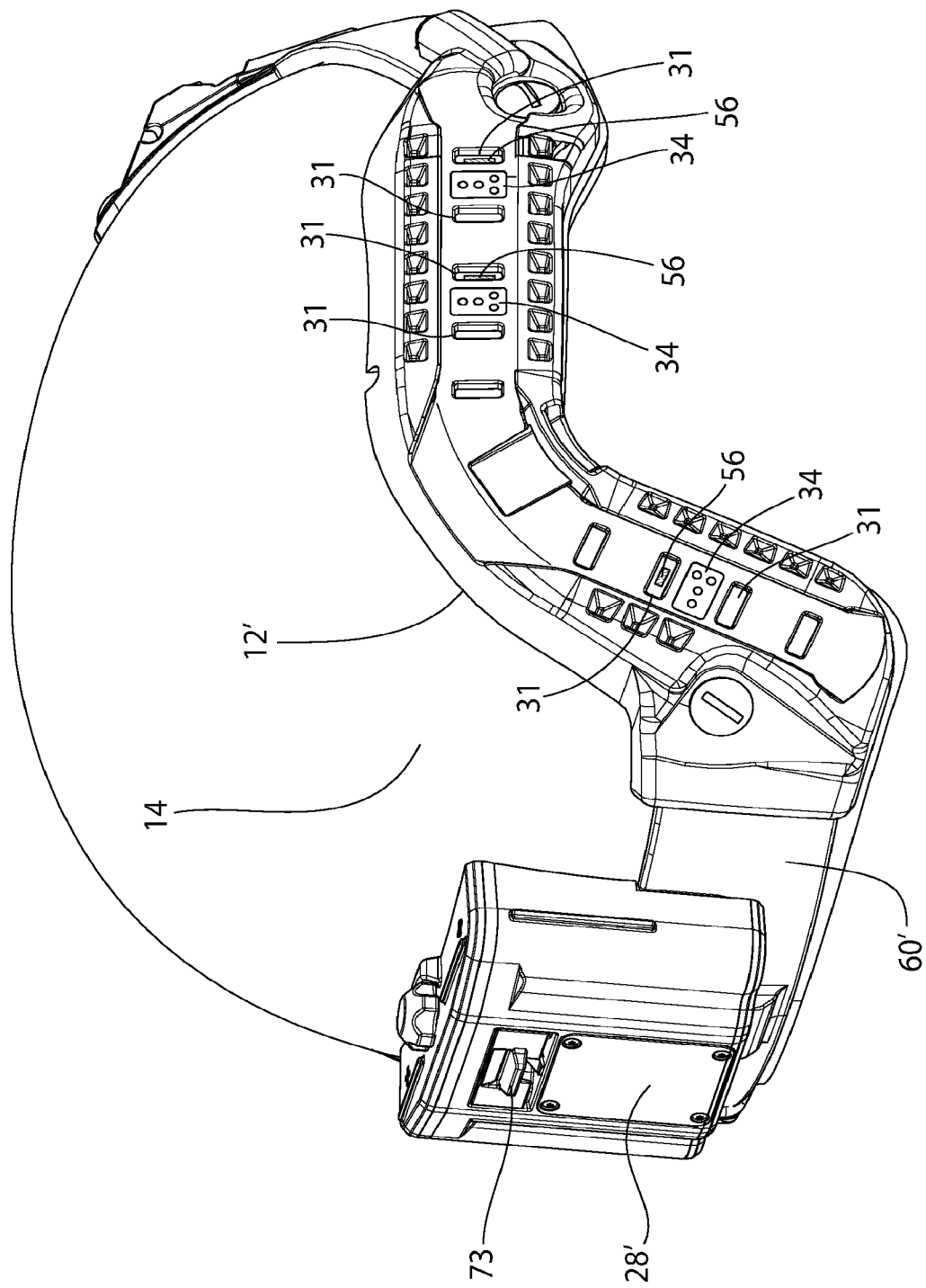
FIG. 23B is a right-side, rear, perspective view of the helmet accessory mounting system of FIG. 23A.
Figure 23C:
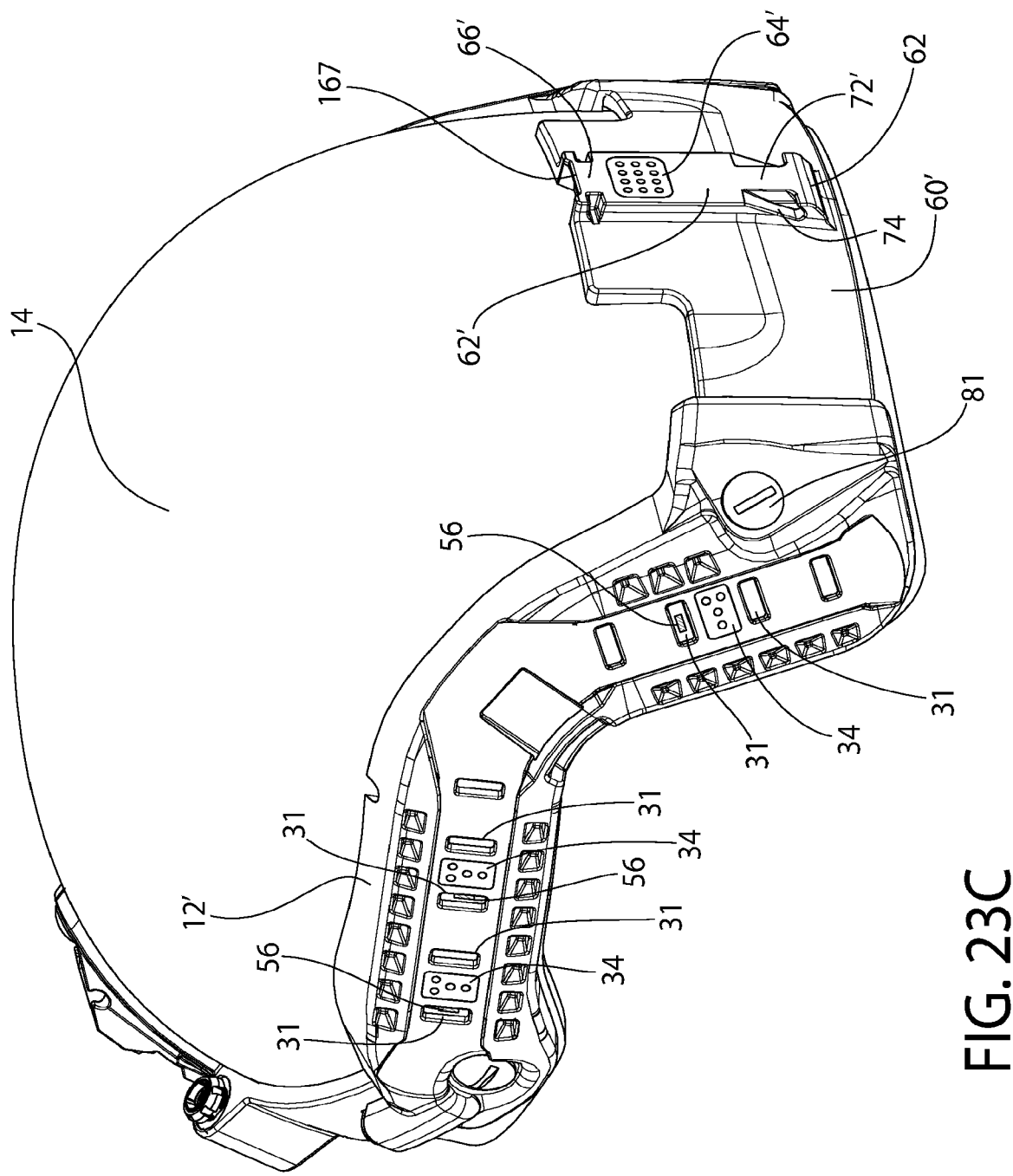
FIG. 23C is a left-side, rear, perspective view of the helmet accessory mounting system of FIG. 23A with the power source removed.
Figure 24:
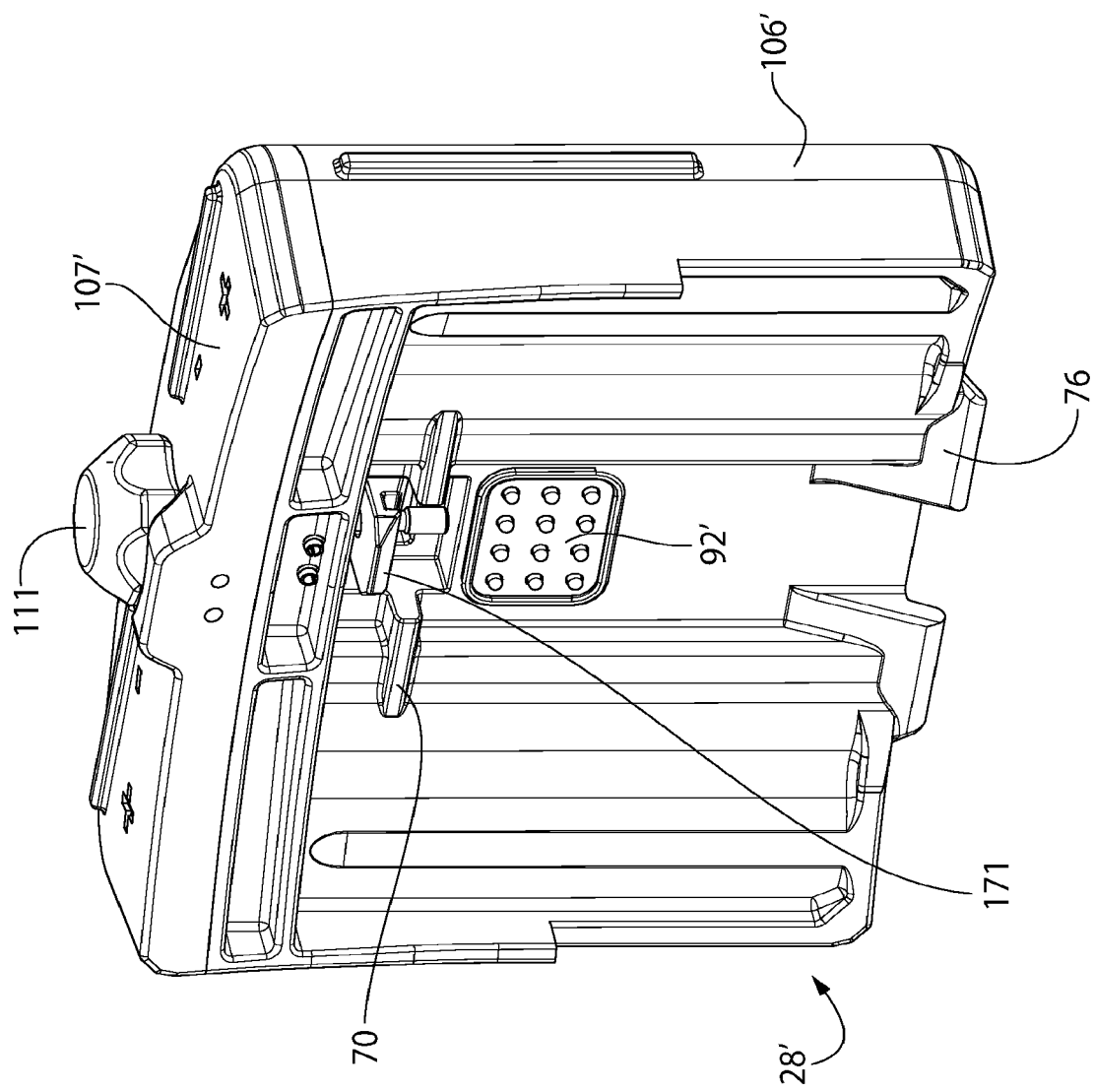
FIG. 24 is a front perspective view of the power source of FIG. 23B.

Referring to FIGS. 23A-24, another exemplary embodiment of a helmet accessory mounting system 10' is shown. The helmet accessory mounting system 10' may be similar to the helmet accessory mounting system 10, as described above except as shown and described below. The rails 12' may be generally the same as rails 12 as described above, except that they may not include any top nodes 110. The rails 12' may include at least one groove (not shown) for receiving electrical connector 26. The rails 12' may couple to a power source mount 60' such that electrical connector 26 and a power source 28' are electrically coupled. The power source mount 60' may be similar to the power source mount 60 shown in FIG. 18 except that it may not include the adjustment mechanism shown in FIG. 19. Additionally, the power source mount 60' may have electrical interface 64' that functions generally the same as electrical interface 64, except that electrical interface 64' may have a different contact layout. The power source mount 60' may also include a hot shoe 62' configured to couple to a power source 28'.

Figure 18:
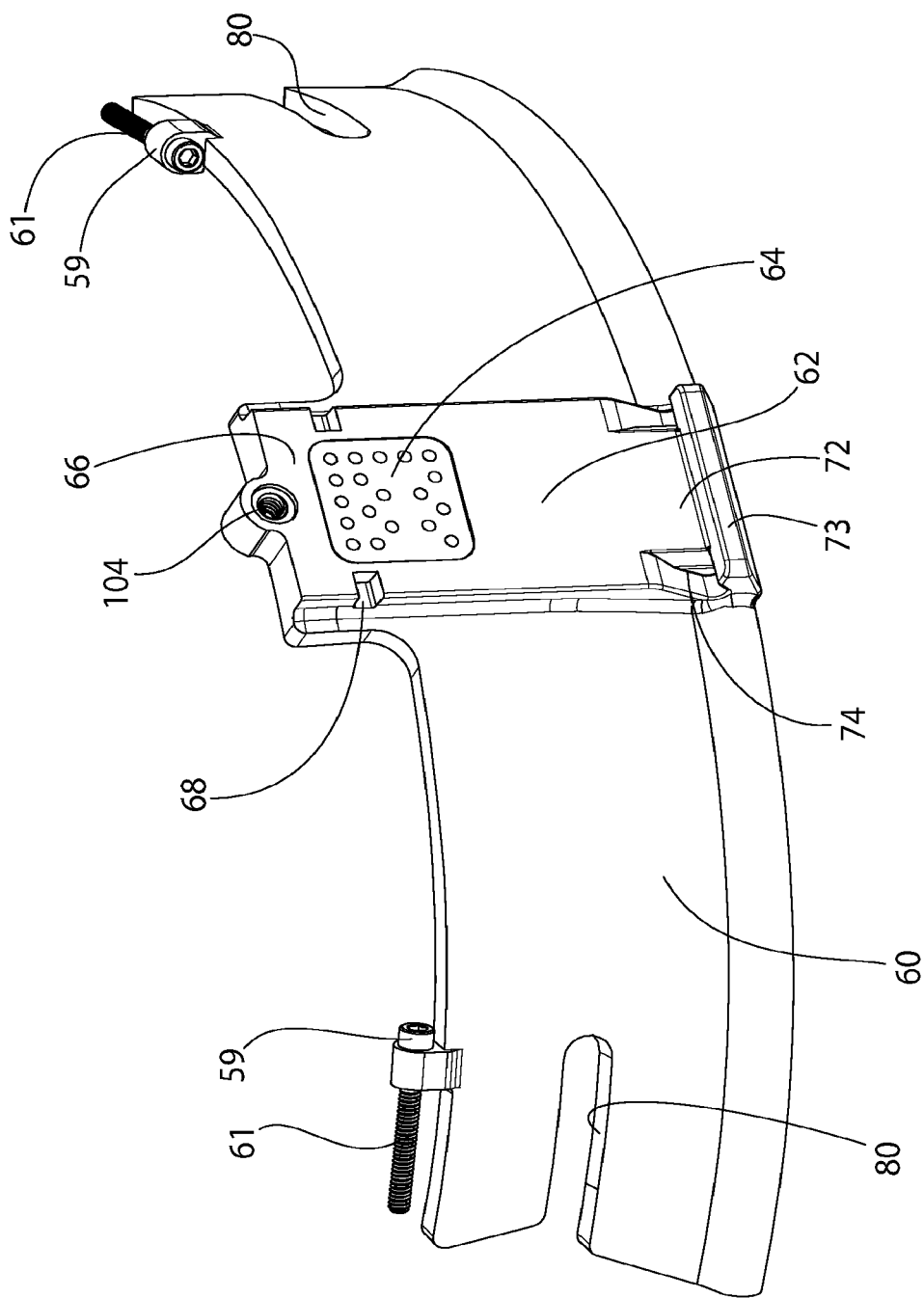
FIG. 18 is a rear, perspective view of the power source mount of FIG. 1A.

Still referring to FIGS. 23A-24, the hot shoe 62' and power source 28' may include different attachment features than the power source 28 and hot shoe 62 shown in FIGS. 18 and 20. The hot shoe 62' may include a first bracket 66' which defines a receiver 167 (FIG. 23C) configured to receive at least a portion of a latch 171 on a power source 28' (FIG. 24). The latch 171 may be deflected as the power source 28' is coupled to the hot shoe 62'. The latch 171 may engage with the receiver 167 when the power source 28' is coupled to the hot shoe 62' such that the power source 28' is locked onto the hot shoe 62'. The power source 28' may include a toggle 175 configured to be engaged by a user to move the latch 171 from an engaging position to a release position such that the power source 28' may be decoupled from hot shoe 62'. The hot shoe 62' may include a second bracket 72' that is similar to second bracket 72 except that bracket 72' may not include lip 73. The power source 28' may include a battery housing 106' and battery door 107'. The battery housing 106' may function generally the same as battery housing 106, except that it may have a generally smaller width than battery housing 106. The battery door 107' may be one piece and may be removeably coupled to battery housing 106 by knob 111.

Referring to FIGS. 1A-1C and 9, an exemplary embodiment of a shroud (e.g. shroud 82) and shroud connector (shroud connector 84) are shown. The shroud 82 may include openings to allow fasteners (e.g. shroud fasteners 85) to pass through the shroud 82. The shroud 82 may be coupled to a front of the helmet 14 by shroud fasteners 85 that extend through at least a portion of the shroud and front surface of the helmet 14. The shroud fasteners 85 may extend through an outer surface of helmet 14 to an inner surface of helmet 14. The shroud 82 may be configured to couple to a device (e.g., night vision goggle, heads up display, or camera). The shroud 82 may be configured to couple to a shroud accessory 19. The shroud 82 may carry augmented reality data or video interface from a system (e.g., a thermal mounted weapon system) to a night vision goggle or heads up display.

The helmet accessory mounting system 10 may provide a system for attaching accessories to a helmet and providing power to the accessories (e.g. track accessories 16, top accessories 116, communication mount 17, shroud accessory 19) without any exposed cables. The rail 12 may include grooves or tracks along the inner surface 132 configured to receive cables (e.g. electrical connector 26, cable 124) which provide power to the accessories. The rail 12 may be manufactured from an electrically insulating material. In some embodiments, the rail 12 is manufactured from filled or unfilled nylon, polymer and composite materials, carbon fiber, glass-filled nylon, or three-dimensional printed materials. The rail 12 may be skeletonized such that zip ties can be coupled to the rail. In some embodiments, a skeletonized rail includes more openings on different surfaces of the rail to provide additional spaces where a connector (e.g., a zip tie) can be coupled to the rail. The rail 12 may be configured such that electronic components (e.g. connectors 26, cable 124) are exposed on the inner surface 132 of rail 12 and closed off by the outer surface 32 for assembly purposes.

Referring to FIGS. 4-5, 9, 16 and 21, the helmet accessory mounting system 10 may include an electrical supply line (e.g. electrical connector 26) which is electrically coupled to a power supply (e.g. power source 28). The electrical connector 26 may also provide a data communication path between the power source 28 and accessories (e.g. track accessories 16, top accessories 116, and communication mount 17) to allow data to be transferred between the accessories and power source 28. The electrical connector 26 may also provide a path for commands or controls sent from the power source 28 to corresponding accessories in order to cause the corresponding accessory to perform some action. The electrical connector 26 may be at least partially contained within the rail 12. The electrical connector 26 may electrically couple the power source 28 to a plurality of nodes (e.g. track nodes 34, top nodes 110) which are spaced at various positions around the helmet 14. The electrical connector 26 may be configured to be electrically connected to a track accessory 16 and a power source 28. The electrical connector 26 may be configured to be electrically connected to a top accessory 116 and power source 28. The electrical connector 26 may be a ribbon cable, a coaxial cable, a twisted pair cable, a connection circuit, a flex PCB, a conduit for electricity and data, or one or more wires.

The power source 28 may be a battery or battery pack. The power source 28 may provide power to the electrical connector 26. The power source 28 may receive power from a body worn device (not shown but could be e.g., a battery) and transfer the power to the electrical connector 26. The electrical connector 26 may be positioned below or behind an outer surface 32 of the rail 12. The electrical connector 26 may be positioned between an outer surface of the helmet 14 and an inner surface 132 of the rail 12. The inner surface 132 of the rail 12 may include a first groove 22 or recess to receive the electrical connector 26. The electrical connector 26 may extend the length of the rail 12. The electrical connector 26 may be positioned under the track 18. The electrical connector 26 may include one or more power supply lines. The electrical connector 26 may function as a data transmission line and include one or more data lines. The power source 28 may send or receive data to or from a top accessory 116, communication mount 17, or track accessory 16 through the electrical connector 26. The power source 28 may send or receive data from a track accessory 16, top accessory 116, or communication mount 17 without providing power to the same accessory.

The data line in the electrical connector 26 may allow accessories (e.g. track accessories 16, top accessories 116, and communication mount 17) to communicate with one another. For example, a track accessory 16 coupled to a first track node 34 which is coupled to electrical connector 26 may transfer data to a track accessory 16 and/or a top accessory 116 (FIG. 8) coupled to a different node which is also coupled to the electrical connector 26. The track node 34 may be electrically coupled to the electrical connector 26. The track node 34 may include a circuit board 88. The circuit board 88 may be a flexible printed circuit board (PCB). The track node 34 may be configured to regulate voltage (e.g., step down relatively high distributed voltage from the power source 28). The helmet accessory mounting system 10 may include a plurality of nodes 34. One or more nodes 34 may be coupled to the rail 12.

Still referring to FIGS. 4-5, 9, 16 and 21, the helmet accessory mounting system 10 may include a cable 124 at least partially within at least one rail 12. The cable 124 may be configured to be electrically connected to a shroud accessory 19 and power source 28. The shroud accessory 19 shown in FIGS. 1A-2 is a pair of night vision goggles ("NVG"), however additional accessories (e.g. visors, face shields) may be coupled to shroud 82 or shroud connector 84. The cable 124 may be a ribbon cable, a coaxial cable, a twisted pair cable, or one or more wires. The power source 28 may provide power to the cable 124. The power source 28 may receive power from a body worn device, as described above, and transfer the power to the cable 124. The cable 124 may be positioned below or behind an outer surface 32 of the rail 12. The cable 124 may be positioned between an outer surface of the helmet 14 and an inner surface 132 of the rail 12. The inner surface 132 of the rail 12 may include a second groove 24 or recess to receive the cable 124. The cable 124 may extend the length of the rail 12. The cable 124 may be positioned under the track 18. The cable 124 may include one or more power supply lines. The cable 124 may include one or more data lines. The power source 28 may send or receive data from the shroud accessory 19 through the cable 124. The power source 28 may send or receive data from the shroud accessory 19 without providing power to the shroud accessory 19. In some embodiments, the shroud accessory 19 may receive at least one of a power and data connection from electrical connector 26.

Figure 9:
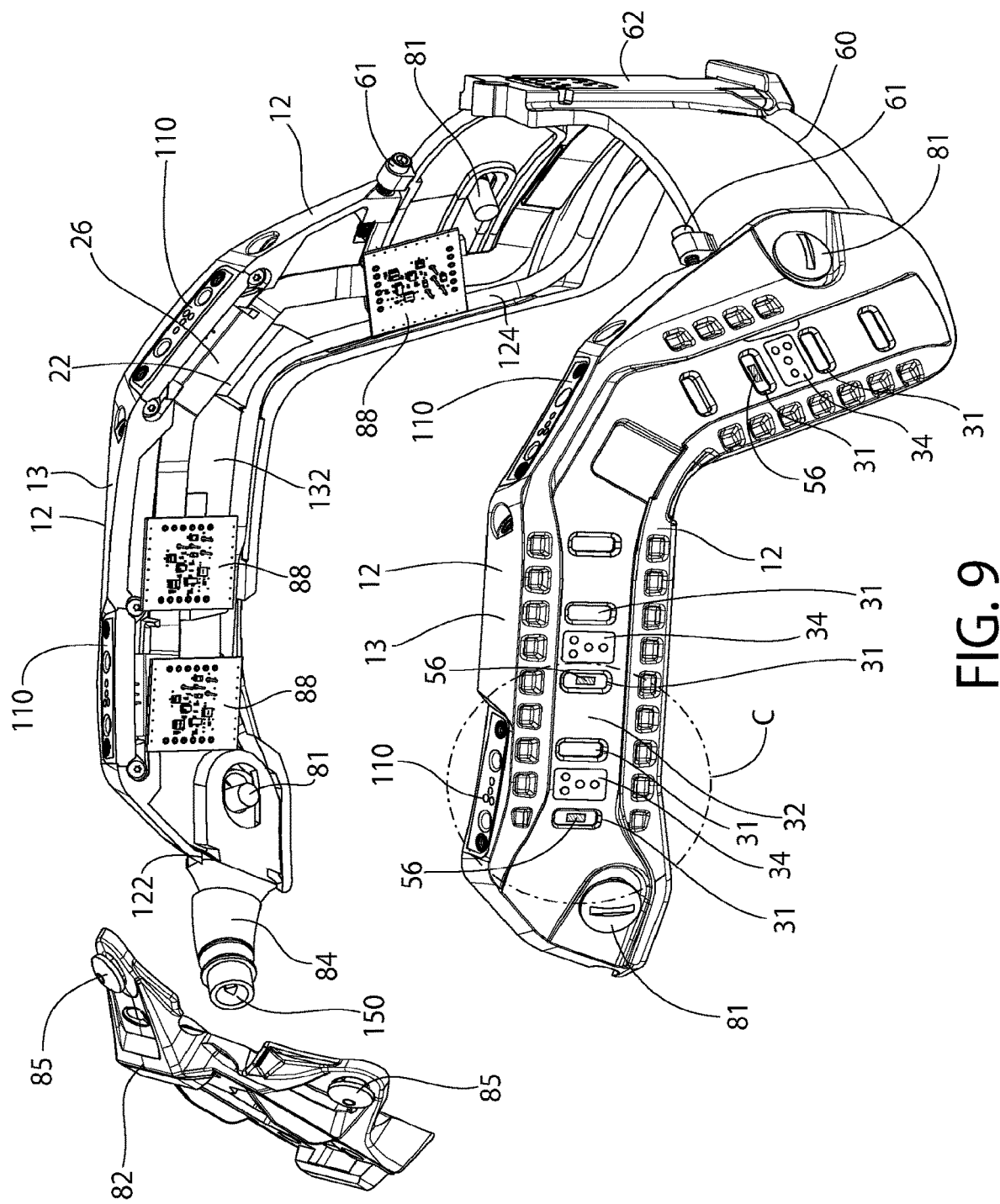
FIG. 9 is a left-side perspective view of the helmet accessory mounting system of FIG. 1A.

Still referring to FIGS. 4-5, 9, 16, and 21, the cable 124 may be coupled to a shroud connector 84 configured to receive an interim cable 144 from a shroud accessory 19. In an exemplary embodiment of the present invention, shroud connector 84 may allow power and data to be transferred from a power source (power source 28, or power source 28') to an accessory (e.g. shroud accessory 19) coupled to shroud 82. The shroud connector 84 may be detachably coupled to a receiving area 122 in rail 12 (FIG. 9). The shroud connector 84 may be integrally formed with cable 124. The shroud connector 84 may include an opening configured to receive a fastener 81 used to couple a corresponding rail 12 to helmet 14. In FIG. 9, the receiving area 122 is on the left mounted rail 12; however the right mounted rail 12 may also include a receiving area 122. The receiving area 122 may provide improved stability for shroud connector 84 when the shroud connector 84 is coupled to the rail 12. Cable 124 may extend along rail 12 and connect to power source 28 such that data and power can be transferred between power source 28 and shroud connector 84.

Figure 1B:
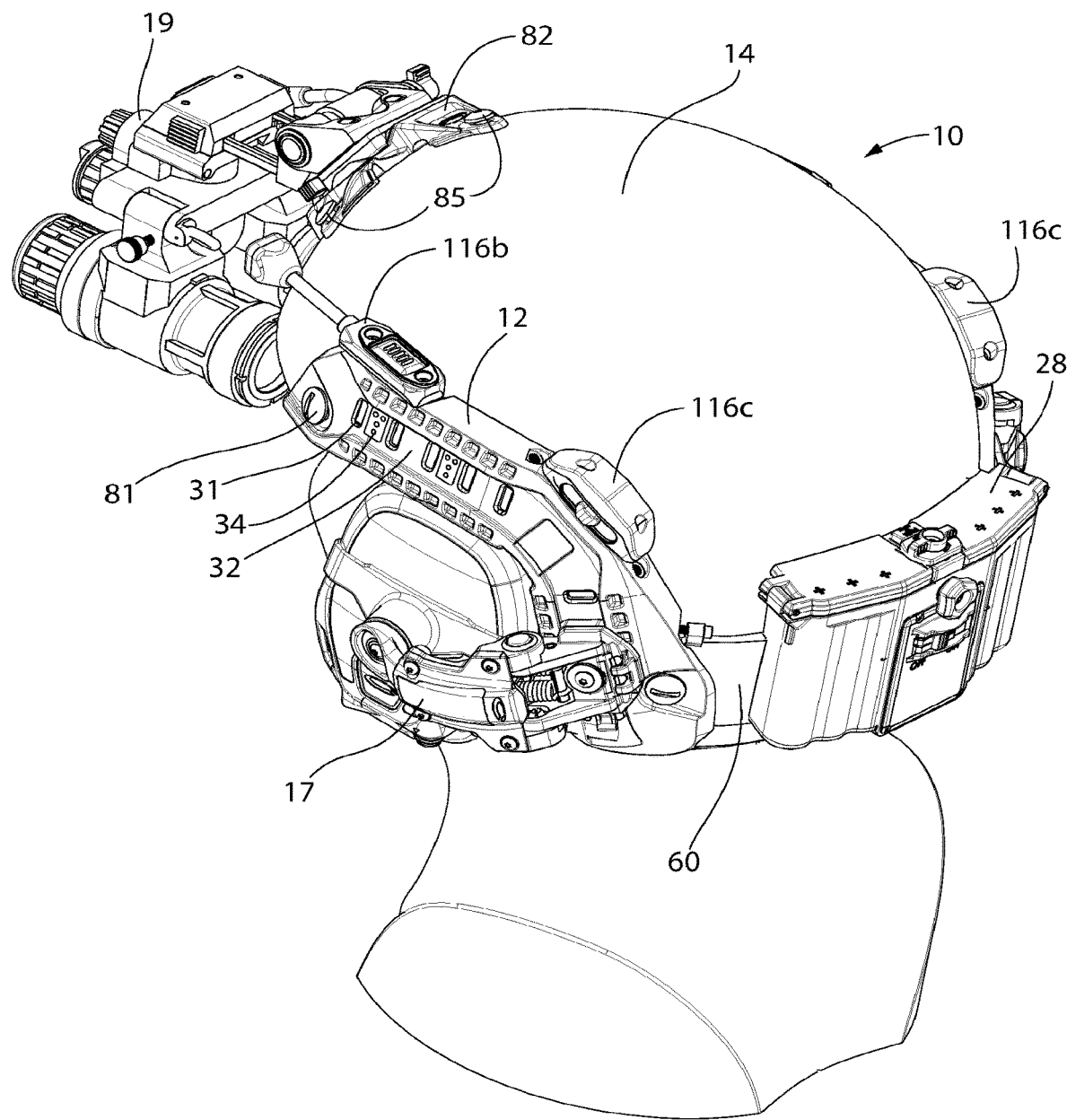
FIG. 1B is a rear perspective view of the helmet and accessory mount system of FIG. 1A.
Figure 1C:
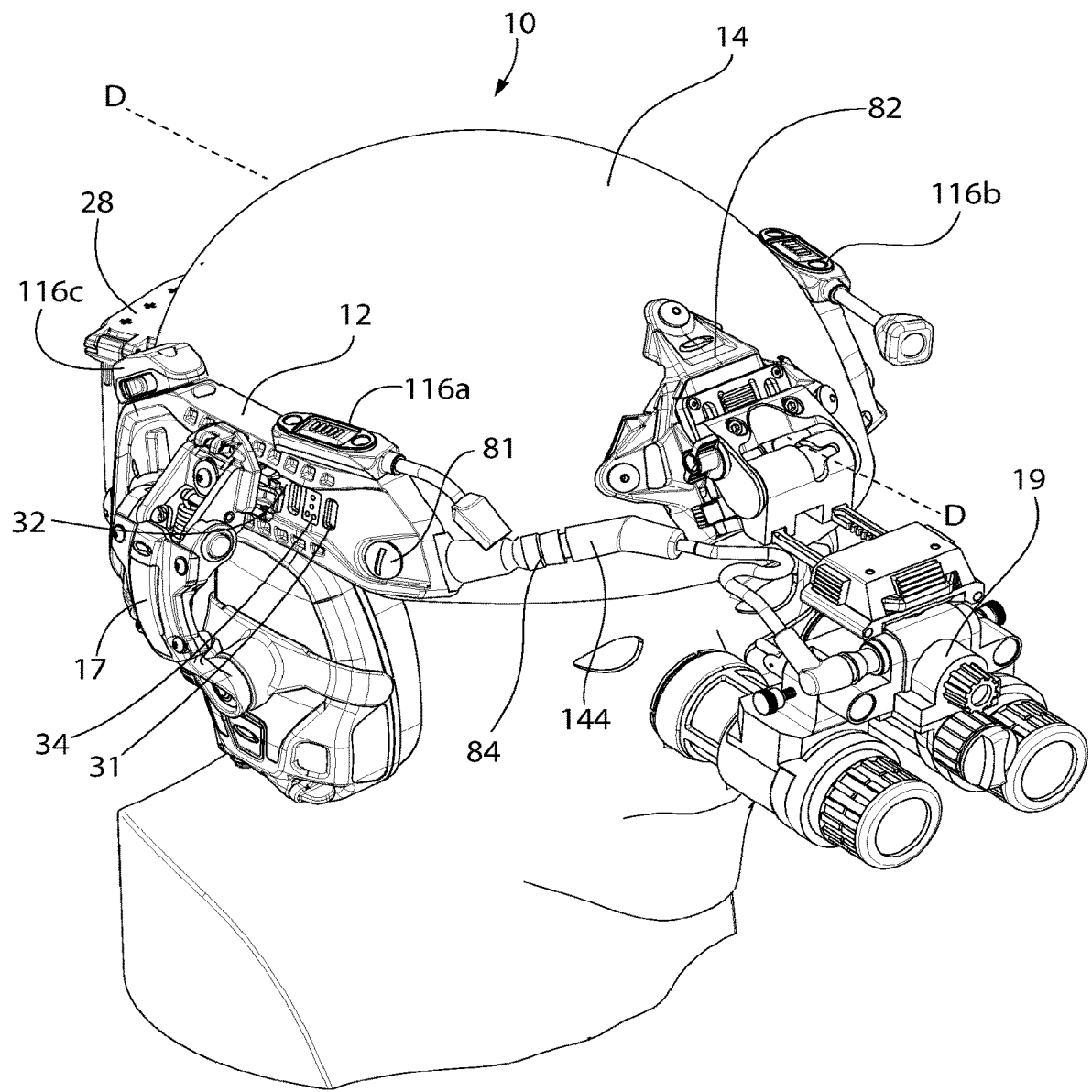
FIG. 1C is a front perspective view of the helmet and accessory mount system of FIG. 1A shown with the communication mount arm mounted to the center contact of the rail.

The shroud connector 84 may extend from a corresponding rail, along a front portion of helmet 14 and couple to an accessory coupled to the shroud 82. In one embodiment, the shroud connector 84 may be an overmold that is held in place via the receiving area 122 of rail 12 (FIG. 1A). The shroud connector 84 may be generally rigid and define a channel for wires or cables (e.g. cable 124) to pass through. The shroud connector 84 may be pliable such that a user may bend or flex the shroud connector 84 into various orientations. The shroud connector 84 may be shaped to encircle a portion of the front of the helmet 14. The shroud connector 84 may have an integrated power and data receptacle 150 to allow for connection of an interim cable 144 from shroud accessory 19 to an accessory coupled to shroud 82. The type of interim cable 144 shown in FIGS. 1A-1C is dependent upon the type of shroud accessory 19. Some types of interim cable 144 may include: a coaxial cable, a USB cable, a circular connector, a USB-C cable, a visual augmentation system (VAS) cable, or a push-pull connector such as a connector produced by Fischer Connector™.

In another embodiment, not shown, the shroud connector 84 may include a cover that protects and holds the overmolded receptacle 150 in place relative the shroud 82. The cover may be configured to allow a shroud fastener 85 to pass through the cover and shroud 82 such that the cover is held in place relative the shroud 82.

Figure 6:
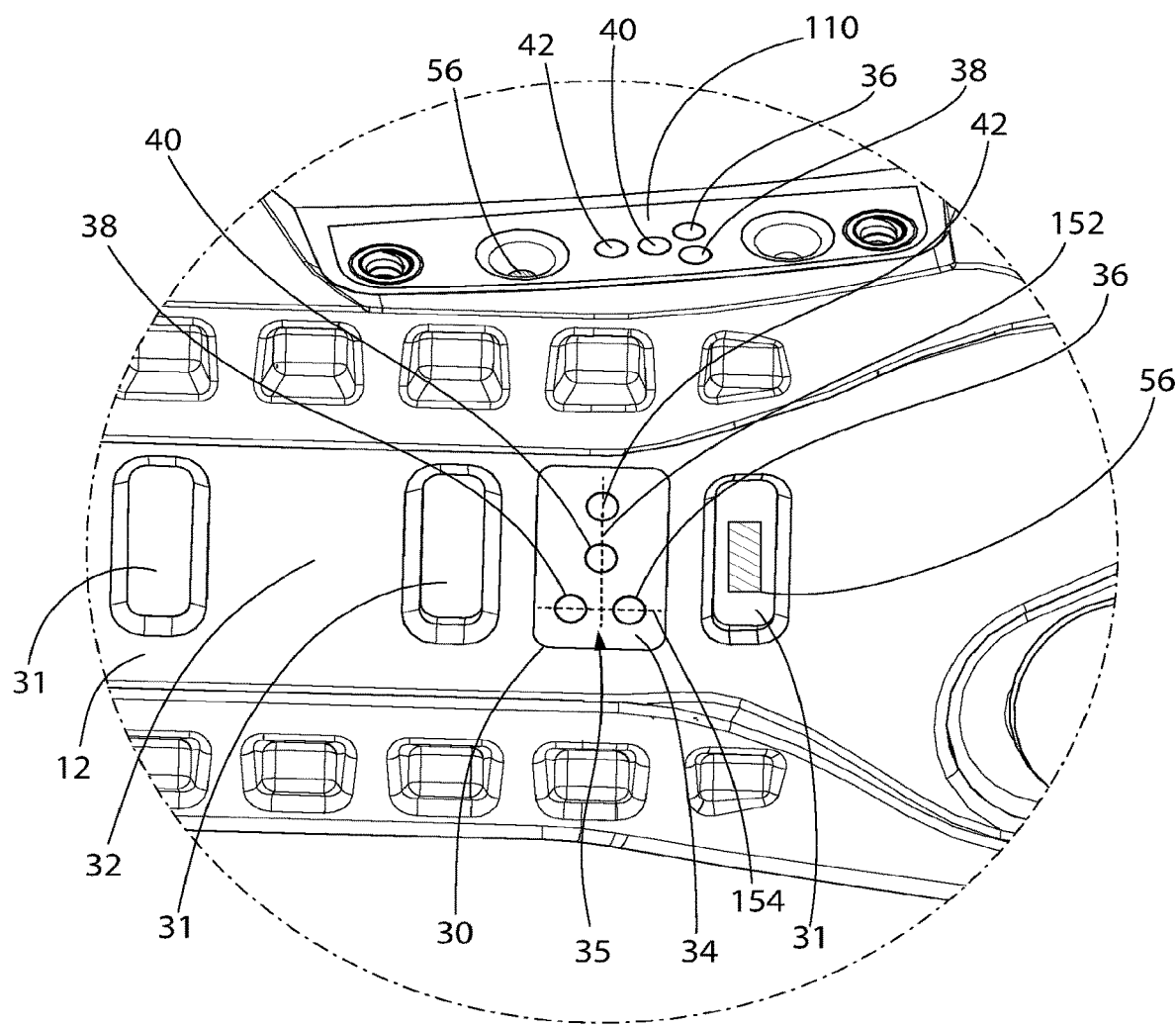
FIG. 6 is an enlarged view of area B of FIG. 5.
Figure 10:
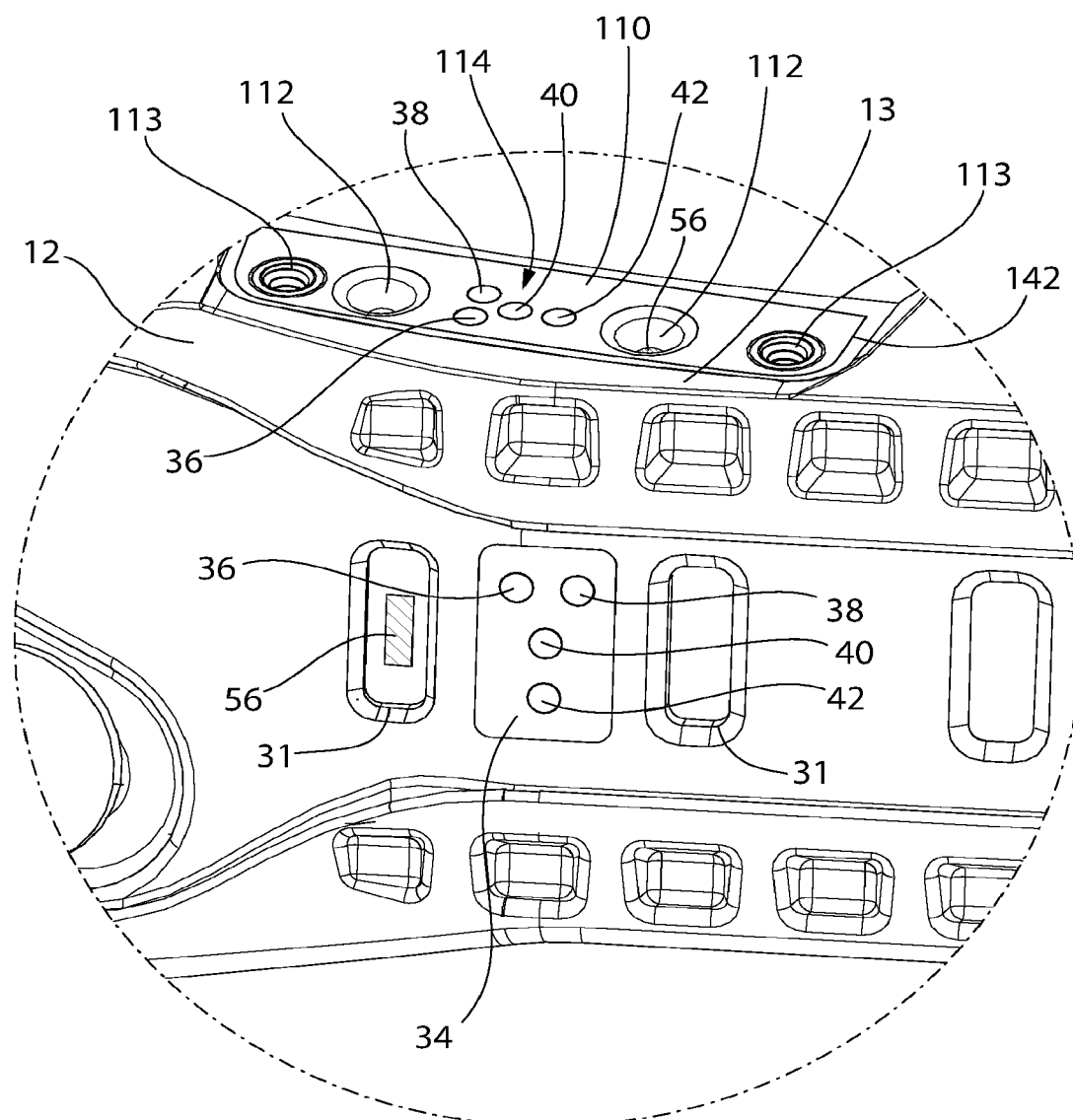
FIG. 10 is an enlarged view of area C of FIG. 9.
Figure 22A:
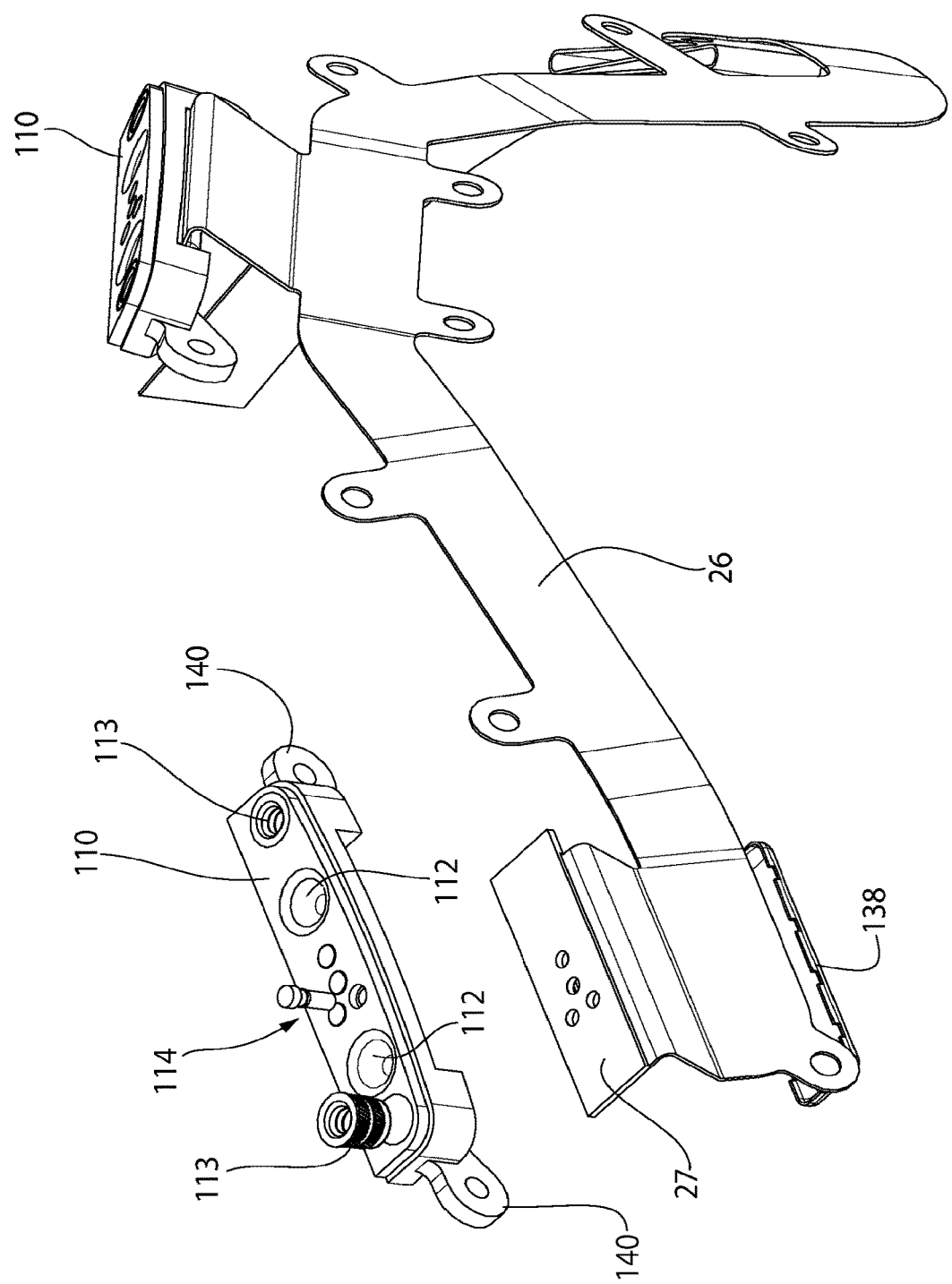
FIG. 22A is a partial exploded perspective view of a power, data, and control connector and an accessory node of the helmet accessory mounting system of FIG. 1A.
Figure 22B:
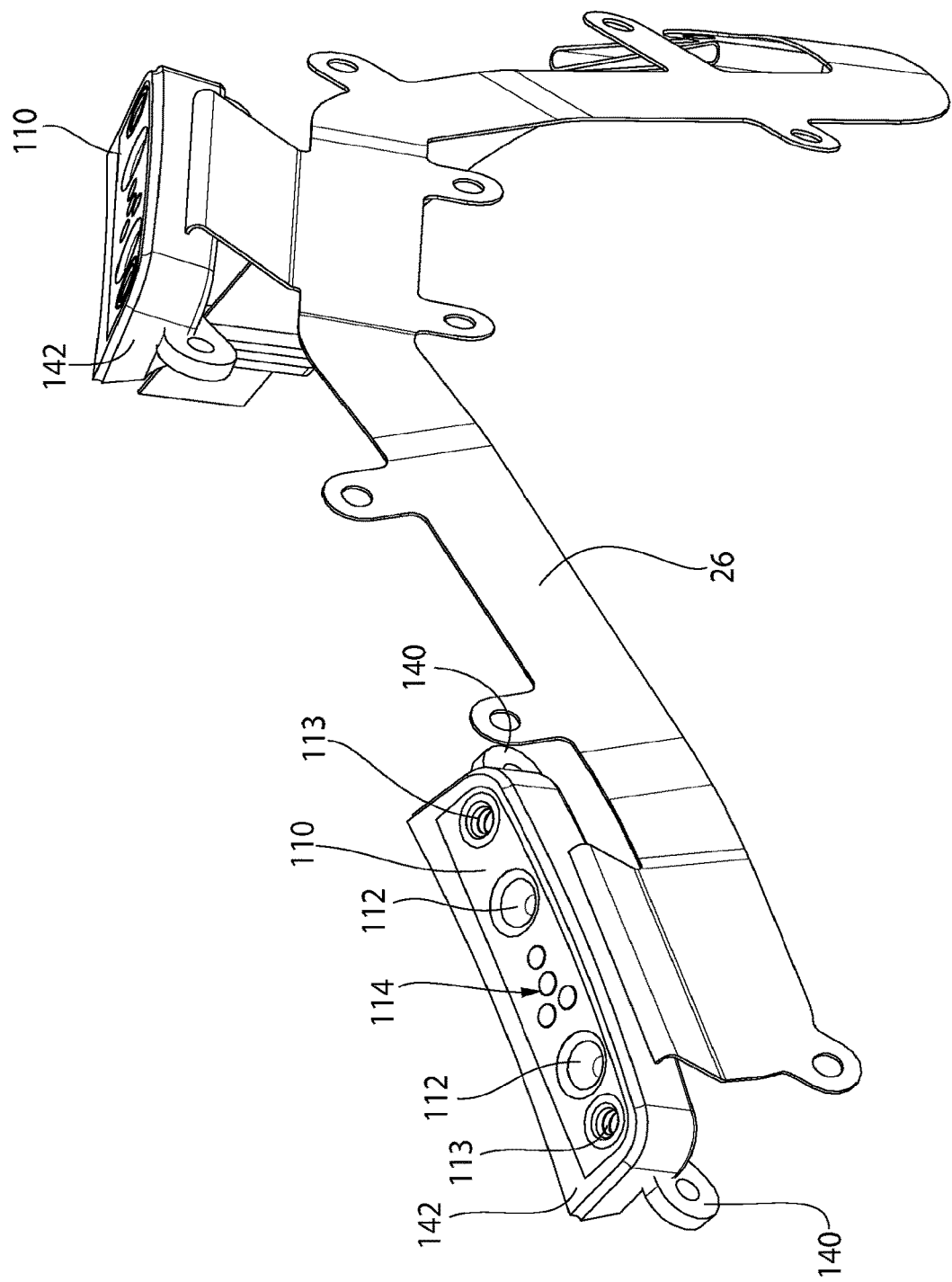
FIG. 22B is a perspective view of the powered connector and accessory node of FIG. 22A with an overmold connected to the accessory node.
Figure 22C:
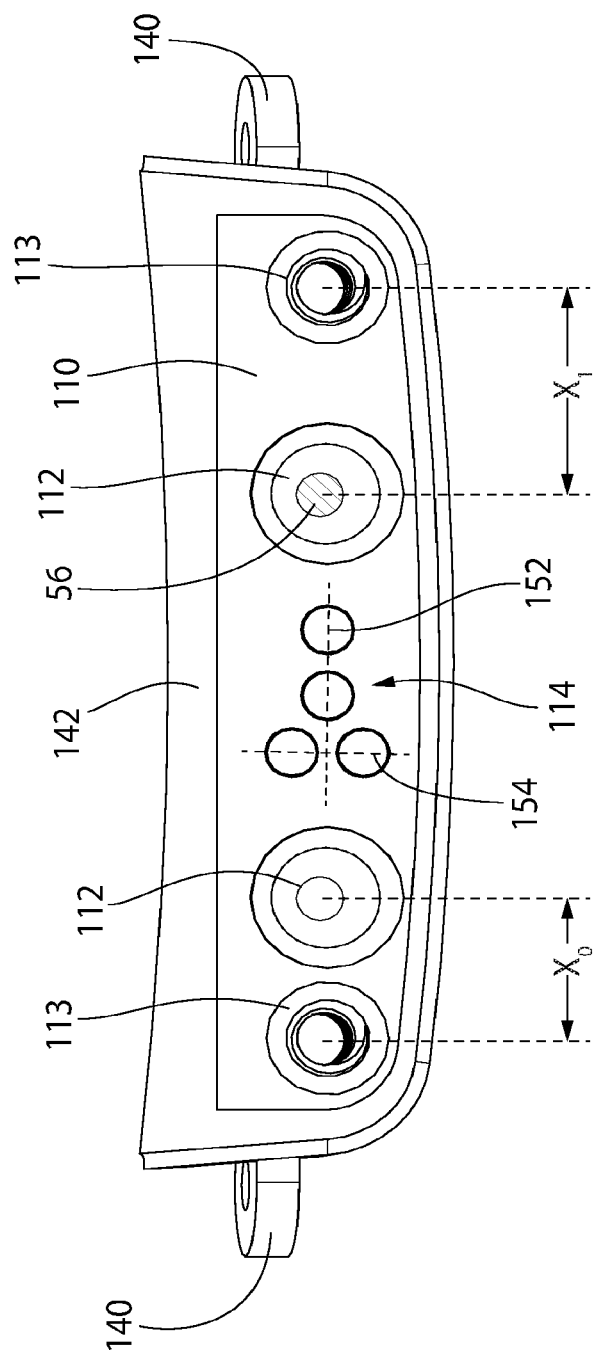
FIG. 22C is a top plan view of the accessory node and overmold of FIG. 22B.

Referring to FIGS. 6, 10, and 22C, the track node 34, top node 110 or electrical connector 26 may include a switch in the electrical transfer line and/or in the data transfer line such that no voltage potentials are present on externally exposed track node contacts 35 and top node contacts 114. The track node contacts 35 and top node contacts 114 may have a contact surface that is exposed through an outer surface of the rail 12. The switch may allow power or data to flow through the track node contacts 35 and top node contacts 114 only when the switch is closed. The switch may be closed when a track accessory 16 or top accessory 116 is coupled to a corresponding track node contact 34 or top node contact 114 on the rail 12. The switch may prevent current flow between the node contacts 35 and top node contacts 114 even if the node contacts 35 or top node contacts 114 are shorted by an external object (e.g., metal, mud, water, or debris). The power source 28 may only be activated when the switch is closed. A power source 28 that is only activated at selected times may reduce power consumption and reduce wear or corrosion of the system. In some embodiments, the nodes (e.g. track nodes 34, top nodes 110) are selectively powered. In some embodiments, a rail system (e.g. rails 12, sensor 56, circuit boards 88, electrical connector 26) and/or power source 28 may include a switch configured to permit each of the nodes to independently and selectively receive power. In some embodiments, a controller associated with power source 28 permits the nodes to be selectively powered by the power source 28. In some embodiments, the power source 28 and/or rail system are configured to selectively provide power to track nodes 34 and/or top nodes 110 when a corresponding sensor 56 detects the presence of a magnet 119, as discussed below. A power source 28 and/or rail system that is configured to selectively provide power to individual nodes may also reduce power consumption and reduce wear or corrosion of the helmet accessory mounting system 10.

Still referring to FIGS. 6, 10 and 22C, the helmet accessory mounting system 10 may include one or more sensors 56 configured to detect the presence of, or a condition associated with the presence of, accessories coupled to the helmet accessory mounting system 10. The sensor 56 may be configured to sense the presence of a magnet 119 embedded in the tooth 58, or alignment feature 118 (FIGS. 7, 11, and 13) on a track accessory 16, top accessory 116, or communication mount 17. The sensor 56 may be configured to sense when the track accessory 16 and/or top accessory 116 is physically coupled to the rail 12. The sensor 56 may be configured to sense when the track accessory 16, top accessory 116, and/or communication mount 17 is electrically connected to the track node 34. The sensor 56 may be configured to sense a condition (e.g., a magnetic field, temperature) associated with the track accessory 16, top accessory 116, and/or communication mount 17. The sensor 56 may activate the switch when the sensor senses the presence, or condition of the presence, of the track accessory 16, top accessory 116, and/or communication mount 17. In some embodiments, the sensor 56 activates a switch in the data transfer line and the track accessory 16, top accessory 116, and/or communication mount 17 is a smart accessory that sends a signal requesting power from the power source 28. The power source 28 may be configured to not provide power to a corresponding node (e.g. track node 34, top node 110) when a magnet 119 is not sensed by a corresponding sensor 56, as discussed below. In some embodiments, the sensor 56 is a Hall Effect sensor. In other embodiments, the sensor 56 is a reed switch, optical sensor (e.g., an infrared sensor), RFID sensor, or a contact switch.

Some accessories may include internal magnetic switches configured to detect the presence of additional magnets (not shown) which magnet 119 may interfere with. Therefore, it may be desirable to embed magnets 119 of different strengths into the different accessories as described above such that they do not interfere with any internal magnetic switches. The helmet accessory mounting system 10 may include controllers associated with the power source 28 or nodes configured to respond to different magnetic field strengths. The power source 28, track nodes 34, and/or top nodes 110 may be adjustably configured to respond to the different strengths of magnetic fields detected by sensors 56, which are spaced along the rails as discussed above. The power source 28 and/or nodes, may be configured to detect different magnetic field strengths at two or more sensors 56 coupled to the helmet accessory mounting system 10. For example, the power source 28 and/or the nodes, may be configured to respond to a first range of magnetic field strengths detected by a sensor 56 positioned in a top node 110 at the front of rail 12. Additionally, the power source 28 and/or the nodes, may be configured to respond to a second range of magnetic field strengths, which is different from the first range of magnetic field strengths, by a sensor 56 positioned along a rear end of track 18.

Referring to FIG. 6, the track node 34 may include one or more pins or contacts (e.g. track node contacts 35). The track node contacts 35 may be positioned along at least one imaginary reference line. The track node contacts 35 may include at least two contacts (e.g. first data contact 40, and second data contact 42) placed along an imaginary first line 152. The track node contacts 35 may additionally include at least two contacts (e.g. first electrical contact 36, and second electrical contact 38) placed along an imaginary second line 154. The imaginary second line 154 may bisect the imaginary first line 152. The node contacts 35 may be arranged in a generally T-shaped pattern. The node contacts 35 may include a first electrical contact 36 (e.g., a positive electrical contact) and a second electrical contact 38 (e.g., a negative electrical contact). The first electrical contact 36 and the second electrical contact 38 may be configured to receive or engage an electrical connector (e.g., a pogo pin) on the track accessory 16. The electrical connector 26 may include an electrical transfer line configured to electrically connect the power source 28 to the first electrical contact 36 and the second electrical contact 38. The node contacts 35 may include a first data contact 40. The node contacts 35 may include a second data contact 42. The electrical connector 26 may include a data transfer line configured to transfer data from the track accessory 16 to at least one of another accessory, a processor, and a smart power source. The data transfer line may be a twisted pair cable or a coaxial cable.

Still referring to FIG. 6, at least one of the node contacts 35 may be exposed through the outer surface 32 of the rail 12. In some embodiments, an outer surface of at least one of the node contacts 35 is substantially flush with the outer surface 32 of the rail 12. The node contacts 35, and corresponding accessory contacts, may be a planar surface. In one embodiment, the planar surface of the node contacts 35 extends further from the outer surface 32. In another embodiment, the planar surface of the node contact 35 is flush with the outer surface 32. In another embodiment, the planar surface of the node contact 35 is recessed relative to the outer surface 32. In other embodiments, an outer surface of at least one of the node contacts 35 is recessed from the outer surface 32 of the rail 12 such that the track accessory 16 is plugged into the rail opening 30. The outer surface of the track node 34 and the node contacts 35 may form a waterproof seal with the outer surface 32 of the rail 12. The track node 34 may be coupled to rail 12 via adhesive or weld to seal any gaps between the track node 34 and the rail 12 in the rail opening 30. The node contacts 35 of track node 34 may be spaced apart from each other by between about 0.1 inches and about 0.140 inches. The node contacts 35 may be spaced apart from each other by about 0.100 inches, 0.110 inches, 0.120 inches, 0.130 inches, or about 01.40 inches.

Referring to FIGS. 9-10, and 22C the helmet accessory mounting system 10 may include a plurality of top nodes 110 as described above. The top nodes 110 may include one or more pins or contacts (e.g. top node contacts 114). The top node contacts 114 may include at least two contacts (e.g. first data contact 40, and second data contact 42) placed along an imaginary first line 152. The node contacts 114 may additionally include at least two contacts (e.g. first electrical contact 36, and second electrical contact 38) placed along an imaginary second line 154. The imaginary second line 154 may bisect the imaginary first line 152. At least one top node may include a threaded recess (e.g. threaded recess 113) configured to receive a fastener from an accessory (e.g. top accessory 116). The top nodes 110 may be configured to provide at least one of an electrical contact and a data contact between the electrical connector 26 and a top accessory 116 coupled to top node 110. Each rail 12 may include at least one top node 110 positioned along a top surface 13 of the rail 12. Each top node 110 may include top node contacts 114, alignment receivers 112, and threaded receivers 113. The top node contacts 114 may function substantially the same as the node contacts 35 of track nodes 34 as discussed above with reference to FIG. 6. Top node contacts 114 may have a T-shaped arrangement similar to the arrangement of track node contacts 35. The spacing between the top node contacts 114 may be smaller than the spacing between track node contacts 35. The spacing between the top node contacts 114 may be about 0.1 inches. Alignment receivers 112 and threaded receivers 113 may be recessed within top node 110 and configured to receive a corresponding alignment feature of a top accessory 116 as discussed below. Alignment receivers 112 and threaded receivers 113 may be fixed relative the top node contacts 114. At least one alignment receiver 112 may include a sensor 56. The sensor 56 may be a Hall Effect sensor.

Referring to FIGS. 22A-22C, the electrical connector 26 may include a plurality of plates 27 configured to couple the top nodes 110 to the electrical connector 26. The plate 27 may allow at least one of a power and data connection between electrical connector 26 and a top node 110 as discussed below. The top nodes 110 may have a bottom surface (not shown) configured to receive plate 27. The bottom surface of top nodes 110 may be configured to couple to a shield 138. The shield 138 may be snap-fit to the bottom surface of top node 110. The plate 27 may be positioned between the bottom surface of top node 110 and the shield 138 when the shield is coupled to top node 110 such that the plate 27 is held in place relative the top node 110. The top nodes 110 may include an overmold 142 coupled to the top node 110. The overmold 142 may be sized to fit within top opening 148 in rail 12. The overmold 142 may be configured to provide mechanical retention of top node 110 when the top node 110 is coupled to rail 12. The overmold 142 may be configured to provide environmental protection and/or sealing for the top node 110 to protect the top node 110 from environmental hazards (e.g. water or other liquids).

Referring to FIG. 22C, the top node 110 may include two sets of receiving features 112 and threaded features 113 on either side of top node contacts 114. The receiving features 112 and corresponding threaded features 113 may be spaced apart by a first distance ($x_0$) or by a second distance ($x_1$). In one embodiment, the distances $x_0$ and $x_1$ are not equal. By providing spacing between receiving features 112 and 113 that are not equal on both sides of the top node contacts 114, a user is prevented from attaching an accessory (e.g. a top accessory 116) in the wrong orientation.

Referring to FIGS. 7 and 11-14B, some accessories (e.g. track accessories 16, top accessories 116, communication mount 17) may include accessory connectors (e.g. first accessory connector 44, or second accessory connector 47) configured to couple the track accessories to track 18 of rail 12. The accessory connectors may include a cross-sectional shape complementary to the cross-sectional shape of the rail 12. In some embodiments, the track accessory 16 may be snap fit into engagement with the rail 12. In other embodiments, the accessory connectors may be configured such that the track accessory 16 can move along a length of the rail 12 while the accessory connector is coupled to the rail 12. Each accessory connector may be received within the track 18 of the rail 12. Each accessory connector may include a rear face 48. The rear face 48 may be positioned adjacent an outer surface of the rail 12 when the accessory connector is coupled to the rail 12. The track accessory 16 may include one or more wings 50 engageable by a user to disengage the accessory connector from the rail 12. In some embodiments, the accessory connector and the track accessory 16 are a unitary construction. In other embodiments, the accessory connector is detachable from the track accessory 16. The accessory connector may be designed to couple to different accessories (e.g., a light, a camera, a strobe). The accessory connector may be disengaged from the rail 12 by grasping the wings 50 and pulling or applying a torsional force to the wing 50 away from the rail 12.

Referring to FIGS. 7, 11,13, and 15A-15B, accessories (e.g. top accessory 116, track accessory 16) may include one or more pins or contacts (e.g. electrical contacts 46, data contacts 54) configured to couple to corresponding node contacts (e.g. track node contacts 35, top node contacts 114).

The above-mentioned accessories may include at least one of accessory electrical contacts 46 and accessory data contacts 54. The data contacts 54 may be positioned along the first imaginary line 152. The electrical contacts 46 may be positioned along the second imaginary line 154. The second imaginary line 154 may bisect the imaginary first line 152. The electrical contacts 46 and data contacts 54 may be arranged in a generally T-shaped pattern. The above-mentioned contacts may be spaced about a spacing surface and an elastomeric seal may be disposed on the spacing surface, surrounding the contacts. The accessory data contacts 54 may electrically couple to the first data contact 40 and the second data contact 42 of the track node 34. The data contacts 54 may be pogo pins. In some embodiments, the accessories include accessory electrical contacts 46 and accessory data contacts 54. In other embodiments, track accessory 16, top accessory 116, and/or communication mount 17 include only one of accessory electrical contacts 46 and accessory data contacts 54. The accessory electrical contacts 46 and accessory data contacts 54 may form a pattern that allows a user to visually identify the accessory electrical contacts 46 from the accessory data contacts 54. In some embodiments, the accessory electrical contacts 46 and the accessory data contacts 54 form a T-shaped pattern. In some embodiments, the accessory data contacts 54 form the vertical portion of the T-shape and the accessory electrical contacts 46 form the horizontal portion of the T-shape. In other embodiments, the accessory data contacts 54 form the horizontal portion of the T-shape and the accessory electrical contacts 46 form the vertical portion of the T-shape. In some embodiments, the accessory contacts and corresponding node contacts may have a different shape than mentioned above, which is mirrored about a first axis and asymmetrical about a second axis (e.g. Y-shape, arrow shape).

Figure 7:
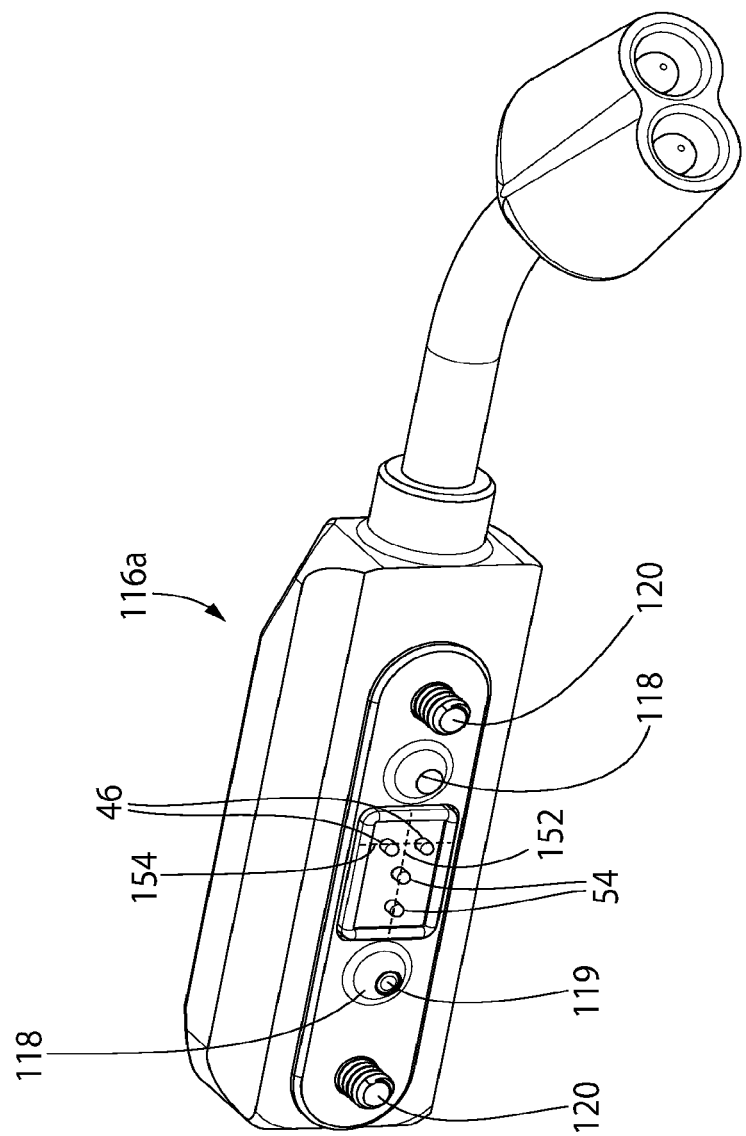
FIG. 7 is a bottom, perspective view of a top accessory in accordance with an exemplary embodiment of the present invention.
Figure 8:
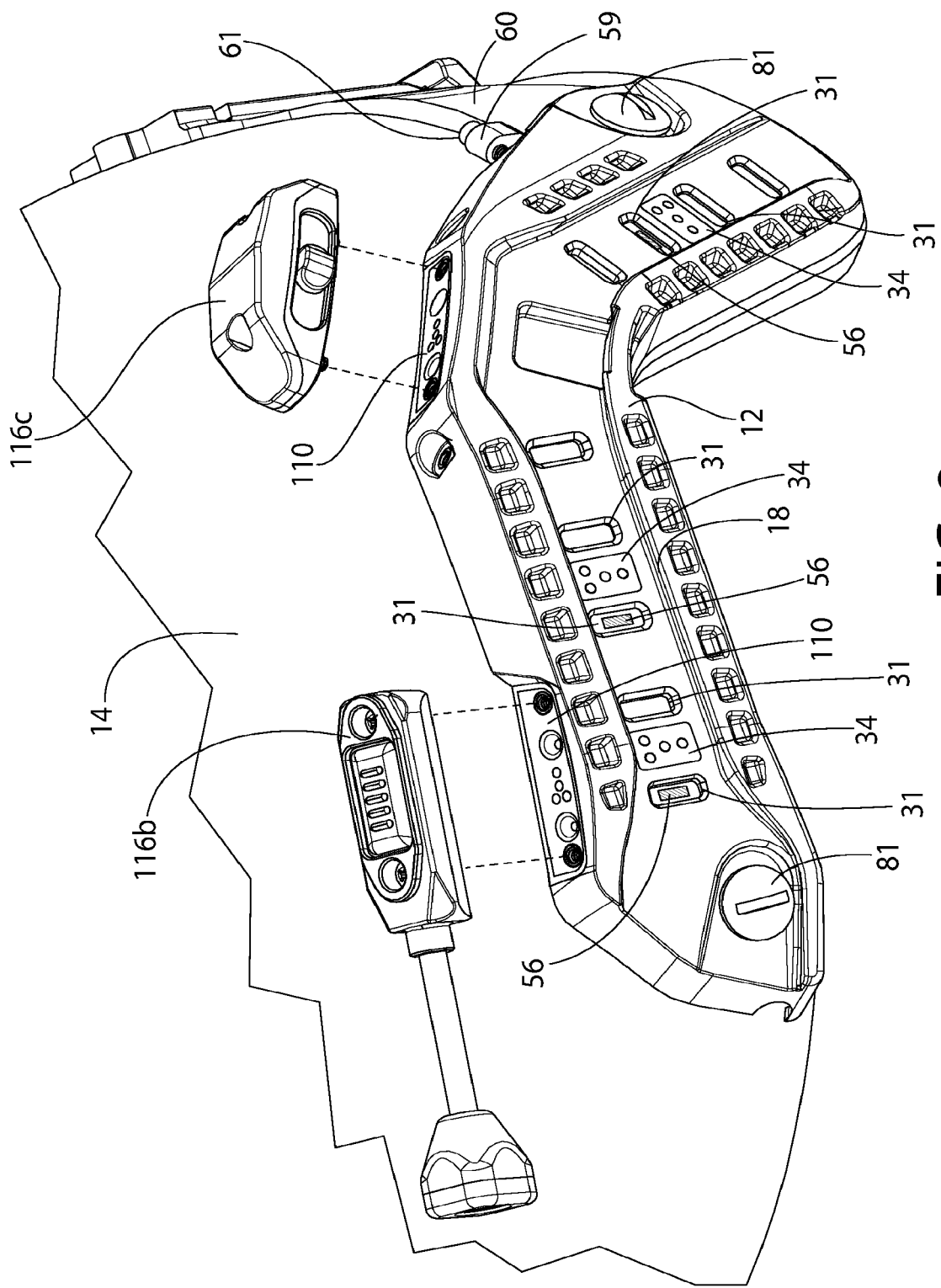
FIG. 8 is a left-side, partially exploded perspective view of the accessory mount shown in FIG. 1A.

Mounting features of top accessory 116*a* are shown in FIG. 7. Mounting features of top accessories 116*b-c* may include the same mounting features and, for the sake of brevity, are not shown. It will be understood that the following description of the mounting features of the top accessories 116 applies to top accessories 116*a-c*. Top accessories 116 may be configured to mechanically and electrically couple to corresponding top nodes 110 of rail 12. Top accessories 116 may include electrical contacts 46, data contacts 54, alignment protrusions 118 and fasteners 120 extending outwardly from a bottom surface of top accessory 116. The electrical contacts 46 and data contacts 54 may have an alignment that matches the alignment of top node contacts 114. Alignment protrusions 118 may be shaped and spaced from one another to match the shape and spacing of alignment receivers 112 of top node 110. At least one alignment protrusion 118 may include a magnet 119 configured to be detected by a sensor in the rail 12. Fasteners 120 may be configured to be received within threaded receivers 113 of top nodes 110. Fasteners 120 may be spaced to match the spacing of threaded receivers 113 of top node 110. Fasteners 120 may be at least partially threaded and include an engagement feature (not shown) to assist a user in rotating the fasteners 120. Top accessories 116 may be mechanically and electrically coupled to a corresponding top node 110 by aligning the fasteners 120 with threaded receivers 113 of top node 110 and screwing the fasteners 120 into the threaded receivers 113 until the alignment protrusions 118, electrical contacts 46, and data contacts 54 are fully received within corresponding receivers of top node 110. The top accessory 116 shown in FIG. 7 is a light, however additional accessories could also be attached to the helmet accessory mounting system 10.

Exemplary mounting features of track accessories 16*a-b* are shown in FIGS. 11-14B. Track accessories 16*a-b* may generally be referred to as track accessories 16. The track accessories 16 may be configured to be rotated or snap fit into the track 18 of the rail 12. The track accessories 16 may include an accessory connector (e.g. first accessory connector 44, second accessory connector 45) that may be sized and dimensioned to snap fit into the track 18. The accessory connectors (e.g. first accessory connector 44, second accessory connector 45) may include one or more protrusions 51. The protrusion 51 may be positioned at least partially within the rail depression 31 when the track accessory 16 is coupled to the rail 12. The protrusions 51 may at least partially fix the position of the track accessory 16 relative to the rail 12 when the protrusion 51 is within the rail depression 31. The accessory connectors may be manufactured from a resilient material (e.g., rubber, flexible composite material, or nylon) such that the accessory connector may elastically deform as the accessory connector disengages from the rail 12. The accessory connector may return to its original shape after the accessory connector is disengaged from the rail 12. The accessory connectors may also include a tooth 58 configured to be detected by a sensor 56 in the rail 12, as explained in greater detail below. The tooth 58, or a magnet holder, may protrude away from the rear face of the accessory connector 44. The tooth 58 may extend at least partially into the rail depression 31 when the track accessory 16 is coupled to the rail 12. The tooth 58 may at least partially fix the position of the track accessory 16 relative to the rail 12 when the tooth 58 is within the rail depression 31.

Figure 11:
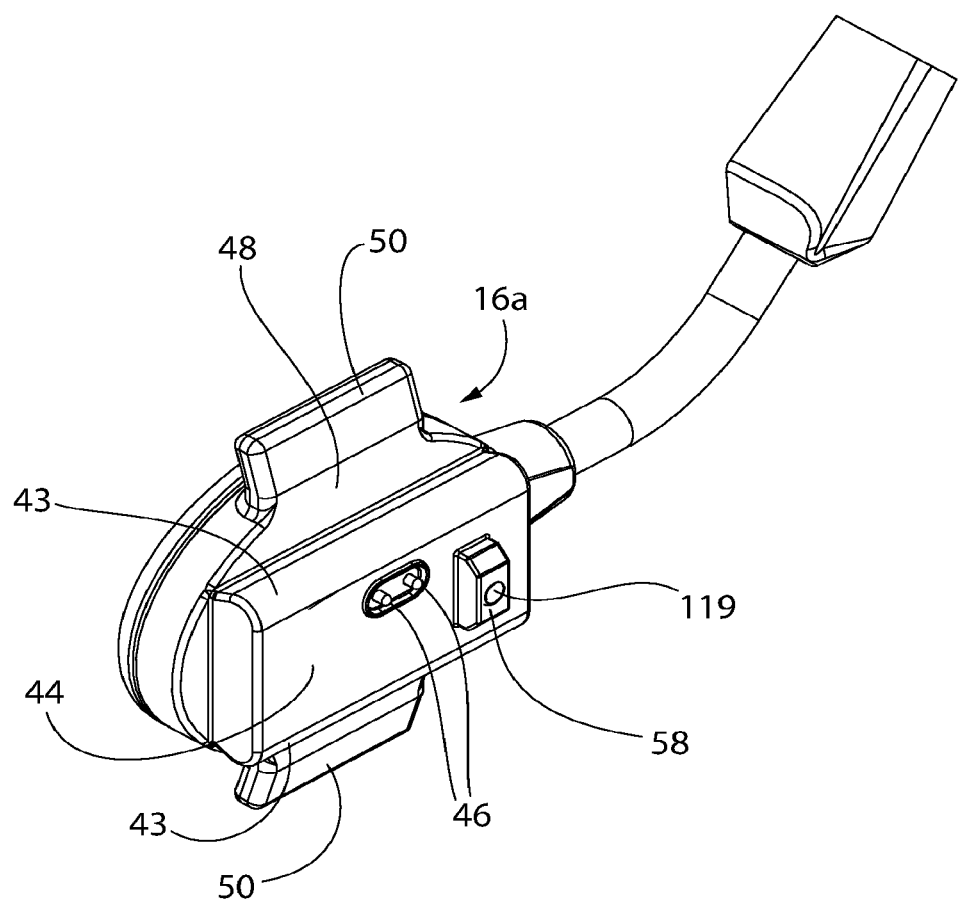
FIG. 11 is an interior side, perspective view of a track accessory in accordance with an exemplary embodiment of the present invention.
Figure 12A:
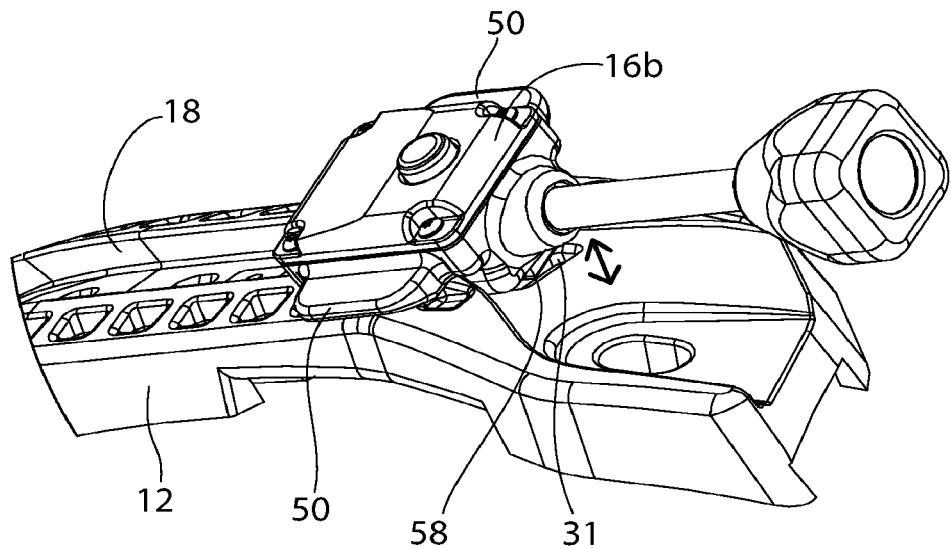
FIG. 12A is a side, perspective view of a track accessory shown being attached to the rail of FIG. 1A in a first attachment step.
Figure 12B:
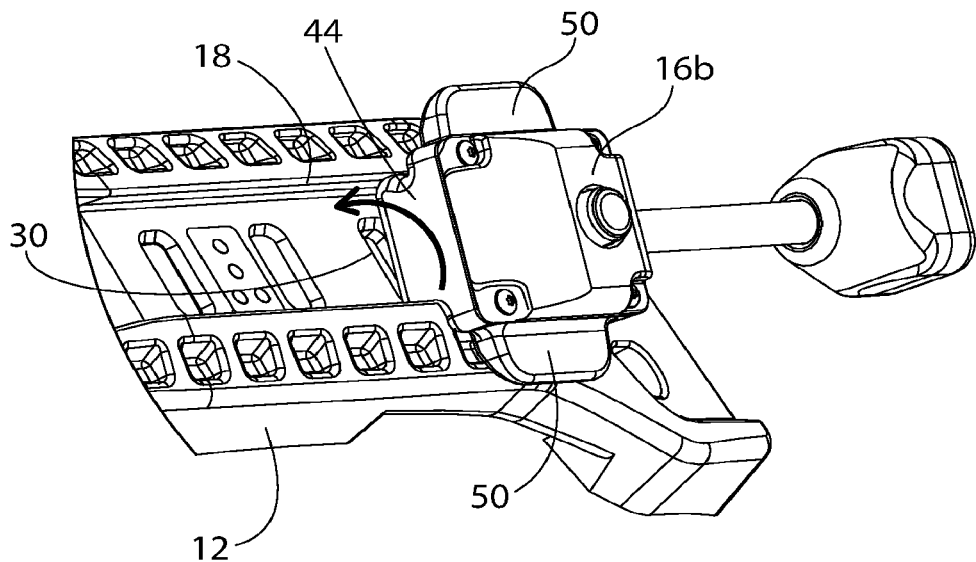
FIG. 12B is a side, perspective view of a track accessory shown being attached to the rail of FIG. 1A in a second attachment step.

Referring to FIGS. 11-12B, two exemplary track accessories 16*a*, and 16*b* are shown. Each track accessory 16*a-b* includes a first accessory connector. The first accessory connector 44 (FIG. 11) may be coupled to a track accessory 16*a* (FIG. 11) or track accessory 16*b* (FIG. 12A). The first accessory connector 44 may be coupled to a rear face 48 of the track accessory 16*a-b*. The first accessory connector 44 may include at least two ribs 43 opposite from one another. In some embodiments, ribs 43 may extend along the length of the first accessory connector 44. The ribs 43 may be configured to snap-fit into track 18 of rail 12. In one embodiment, accessory electrical contacts 46 and tooth 58 of track accessory 16*a-b* may be aligned with a corresponding track node 34 and rail opening 30 of rail 12. A first rib 43 may be inserted into track 18 and the track accessory 16*a-b* may be rotated (FIGS. 12A and 12B) into place such that the ribs 43 and first accessory connector 44 are both received within track 18 and tooth 58 is received within a corresponding rail depression 31. In some embodiments, once the first accessory connector 44 is received within track 18, the accessory may be snapped down to mechanically and electrically couple and lock the track accessory 16 to rail 12.

Figure 13:
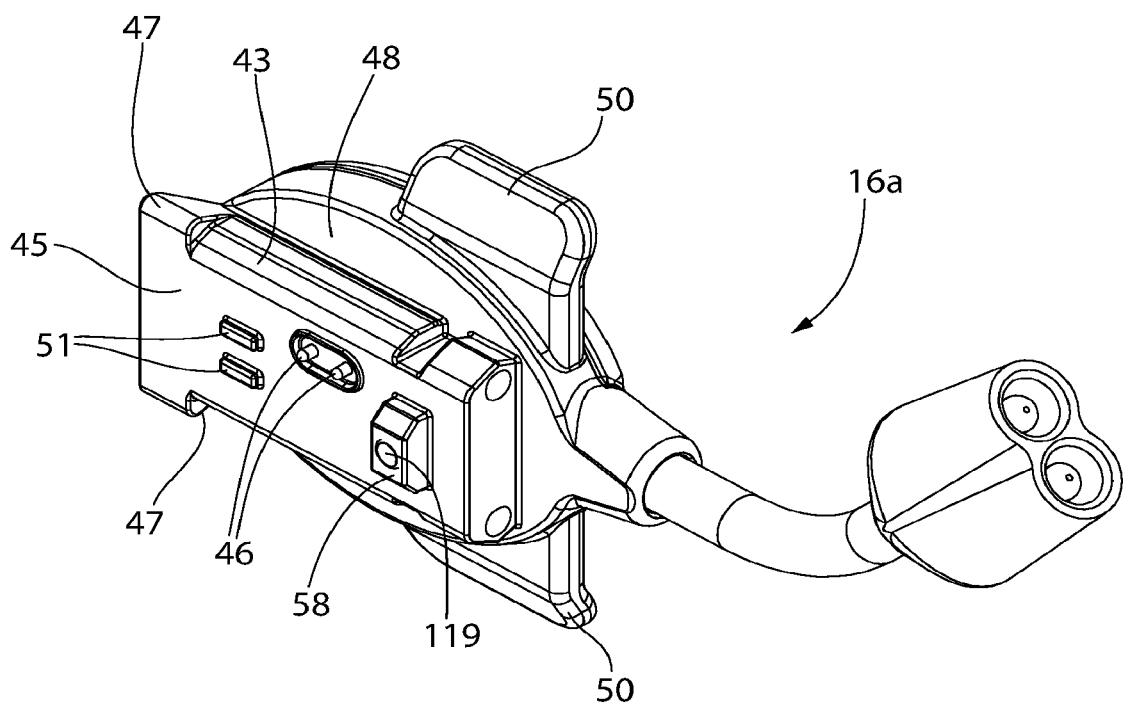
FIG. 13 is an interior side, perspective view of another track accessory in accordance with an exemplary embodiment of the present invention.
Figure 14A:
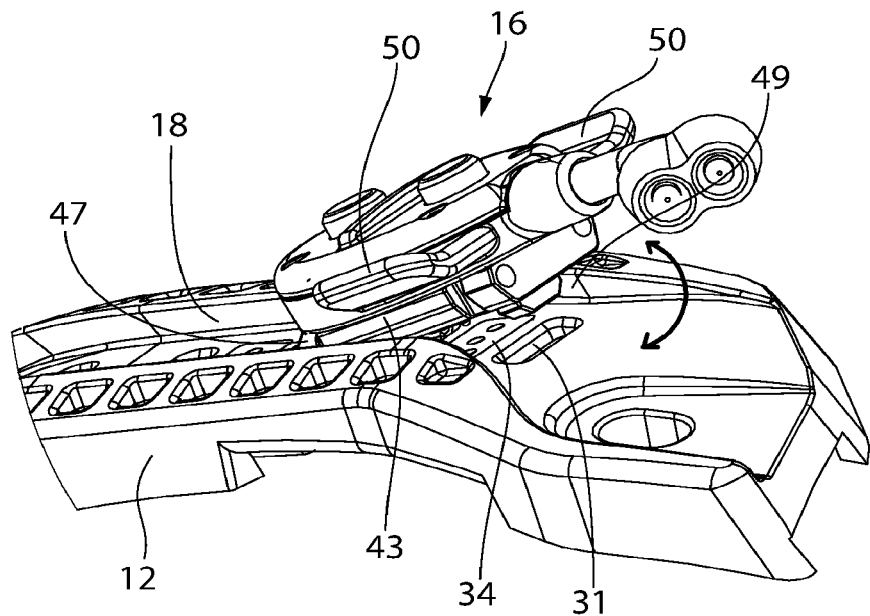
FIG. 14A is a side, perspective view of the track accessory of FIG. 13 shown being attached to the rail of FIG. 1A in a first attachment step.
Figure 14B:
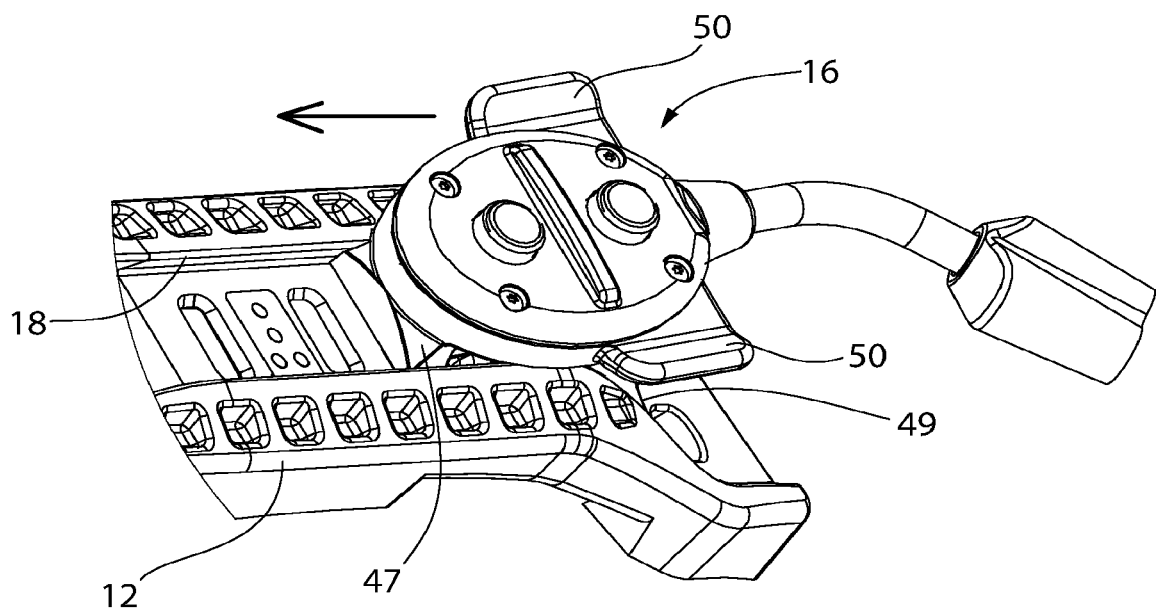
FIG. 14B is a side, perspective view of the track accessory of FIG. 13 shown being attached to the rail of FIG. 1A in a second attachment step.

Referring to FIGS. 13-14B, a second accessory connector 45 (FIG. 13) is coupled to a track accessory 16*b*. The second accessory connector 45 may be coupled to a rear face 48 of the track accessory 16*b*. The first accessory connector 45 may include at least two ribs 43 opposite from one another and two extended ribs 47 opposite from one another. The ribs 43 may extend partially along the length of the second accessory connector 45 and terminate where the extended ribs 47 begin. The extend ribs 47 may extend at least partially along the remainder of the length of the second accessory connector 45. The extended ribs 47 may be configured to be received at a terminal end 49 of track 18 and slide along a length of track 18. In one embodiment, extended ribs 47 may pass through terminal end 49 of track 18 and slide along a first portion of the length of track 18 until all mechanical and electrical features (e.g. protrusions 51, electrical connectors 46, and tooth 58) of the track accessory 16 are aligned with corresponding mating features (e.g. rail depression 31, and track node 34). The end of the track accessory 16 opposite the extended ribs 47 may be held at an angle relative the track 18 while sliding the extended ribs 47 along the length of the track 18 (FIG. 14A). Once the mechanical and electrical features are aligned, the track accessory 16 may be rotated such that the ribs 43 are at least partially received within track 18. Once the ribs 43 are received within track 18, the track accessory 16b may be snapped down into place such that it is mechanically and electrically coupled to the rail 12 and is locked in place. In some embodiments, the track accessory 16 may be removed from rail 12 by reversing the steps for mechanically and electrically coupling the track accessory 16 to rail 12.

In some embodiments, the track accessories 16a-b shown in FIGS. 11-14B may be removed from rail 12 by reversing the steps for mechanically and electrically coupling the corresponding track accessory 16 to rail 12. Each track accessory 16 may include wings 50 positioned on opposite sides of the track accessory 16 to assist in coupling and decoupling the track accessory 16 from rail 12. For example, the wings 50 may provide an area that a user can grab to assist in rotating and sliding the track accessory 16 relative to rail 12. In alternative embodiments, accessories (e.g. track accessories 16 or top accessories 116) may include a spring loaded locking mechanism which, when operated, may cause the mechanical or electrical features explained above to attach or detach from corresponding mounting features of the rail 12.

Referring to FIGS. 5-7 the track node 34 may be positioned in the track 18 such that the track accessory 16 may be electrically coupled to the track node 34 when the accessory connector 44 is received within the track 18. The track accessory 16 may be configured to be electrically connected to the track node 34 when the track accessory 16 is in a first position along the rail 12 and electrically disconnected from the track node 34 when the track accessory 16 is in a second position along the rail 12. The track accessory 16 may include accessory electrical contacts 46 (FIG. 7) on the accessory connector 44 such that the track accessory 16 may be electrically connected to the track node 34 by aligning the accessory electrical contacts 46 with the first electrical contact 36 and second electrical contact 38. The track accessory 16 may be electrically disconnected from the track node 34 by misaligning the accessory electrical contacts 46 from the first electrical contact 36 and second electrical contact 38. The track accessory 16 may be electrically disconnected from the track node 34 when a corresponding magnet 119 in track node 16 is not detected by sensor 56. In some embodiments, the track accessory 16 may be electrically connected and disconnected from the electrical connector 26 while the track accessory 16 remains coupled to the rail 12. In other embodiments, the track accessory 16 is moved to a desired location along the rail 12 while uncoupled to the rail 12 and then snap fit into engagement with the rail 12. It will be understood that any of the track accessories described above be coupled to any one of accessory mount 44 or accessory mount 45.

Figure 15A:
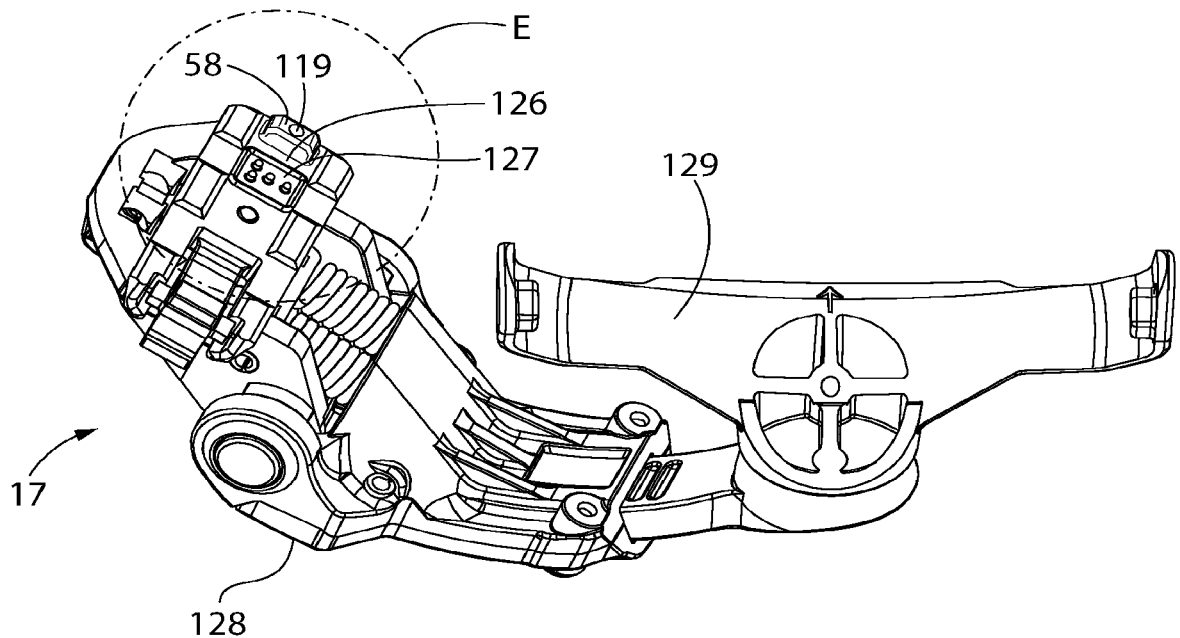
FIG. 15A is a bottom perspective view of the communication mount arm accessory of FIG. 1A shown with the ear cup removed.
Figure 15B:
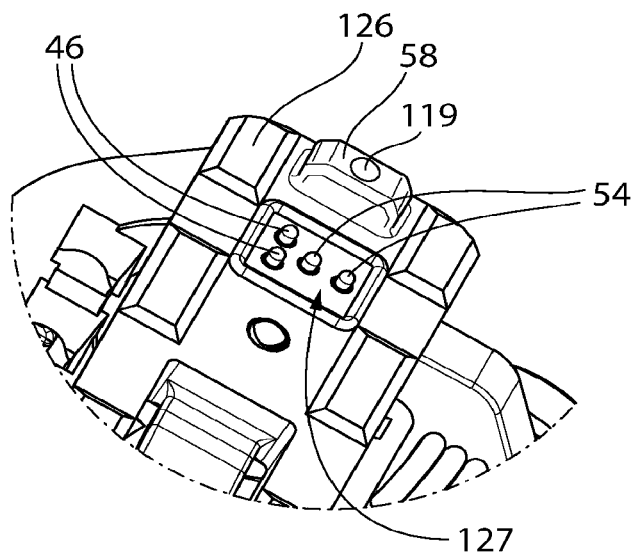
FIG. 15B is an enlarged rear perspective view of area E of FIG. 15A.

Referring to FIGS. 15A-B, an exemplary communication mount arm 17, or communication mount 17, is shown. The communication mount 17 may allow communication accessories (e.g. ear-cups, microphones, headsets) to be coupled to the accessory mounting system 10. The communication mount 17 may include a mounting surface 126 configured to be snap-fit to track 18 of rail 12 similar to the accessory mounts 44 and 45 described above. The mounting surface 126 may include contacts 127 configured to couple to a node 34 on rail 12 as described above with reference to FIG. 7. The contacts 127 may include electrical contacts 46, data contacts 54 (FIG. 15B). The communication mount 17 may include a tooth and embedded magnet 119 configured to be received within a corresponding rail depression 31, similar to a track accessory 16. The communication mount 17 may include an arm 128 configured to provide a distance between an accessory mounted on mount arm 17 and rail 12. The arm 128 may be adjustable in at least one direction. The arm 128 may be rotatable about an axis, such that when the mounting surface 126 is coupled to a rail, the arm 128 may be rotated without the mounting surface 126 being decoupled from the rail. The arm 128 may include a mount bracket 129 for receiving an accessory (e.g. a communication device, an ear-cup). The mount bracket 129 may be rotatable in at least one direction relative the mount arm 128. The mount bracket 129, mount arm 128, and mounting surface 126 may be configured to provide at least one of an electrical and data connection between a corresponding node 34 and an accessory attached to mounting bracket 129, when the contacts 127 are coupled to node 34.

Referring to FIGS. 5-6 and 9-10, the track node 34 and top node 110 may include a node contact pattern defined by the position of the first electrical contact 36, the second electrical contact 38, the first data contact 40, and the second data contact 42. The node contact pattern may have a layout complementary to the pattern of the accessory electrical contacts 46 and the accessory data contacts 54. The node contact pattern on the rail 12 on a first side of the helmet 14 (e.g., right side as shown in FIGS. 5-6) of the helmet 14 may have a first pattern (e.g., an inverted T). The track node 34 may be rotated about axis D-D (FIG. 1) such that the node contact pattern on the rail 12 on a second side of the helmet 14 (e.g., left side as shown in FIGS. 9-10) is inverted compared to the node contact pattern on the first side of the helmet 14. The inversion of the node contact pattern on the first and second side of the helmet may allow direction dependent accessories (e.g., a forward facing light) to be correctly oriented whether the track accessory 16 is coupled to the first side or second side of the helmet 14. In some embodiments, the node contact pattern of the top nodes 110 may be the same across all top nodes 110. In other embodiments, at least one top node 110 may have an inverted or mirrored node contact pattern compared to the node contact pattern of the remainder of the top nodes 110.

Another exemplary embodiment of a shroud (e.g. shroud 82') and shroud connector (e.g. shroud connector 84') is shown in FIGS. 23A-23C. The shroud 82' and shroud connector 84' may be similar to the shroud 82 and shroud connector 84 shown in FIGS. 1A-1C. The shroud 82' may include a hotshoe (not shown) configured to provide at least one of an electrical and/or data connection between shroud 82' and shroud connector 84'. The shroud 82' may include fewer openings configured to receive shroud fasteners 85 than shroud 82. The shroud connector 84' may provide at least one of an electrical and data connection between a shroud accessory 19 and power source 82' similar to shroud connector 84 and power source 28. In some embodiments, the shroud connector 84' and shroud 82' are separate elements that may be coupled to each other. In other embodiments, the shroud 82' and the shroud connector 84' are a unitary construct. The shroud connector 84' may extend along the front surface of helmet 14. The shroud 82' may be coupled to the front of the shroud connector 84'. The shroud connector 84' may be positioned between the shroud 82' and the helmet 14. The shroud connector 84' may be coupled to the rails 12' on the left and right side of helmet 14. The shroud connector 84' may include a track (not shown) configured to receive the fastener 81 at a front of the rail 12'. The track may be elongated to allow the shroud connector 84' to be coupled to different size helmets with different distances the distance between the rails 12'. The fastener 81 at the front of the rail 12' may be coupled to the helmet 14 using existing bolt holes 83 for the chinstrap (not shown). The shroud connector 84' may allow the shroud 82' to be coupled to the helmet 14 without any fasteners in the front of the helmet 14.

Still referring to FIGS. 23A-23C, the shroud connector 84' may include a channel (not shown). The channel may be configured to receive a portion of electrical connector 26 to supply power or data transfer from power source 28'. The channel may be behind a front face of the shroud connector 84'. A hot shoe connection may electrically and physically couple the shroud connector 84' to the rail 12'. The shroud connector 84' may include an aperture 188. The aperture 188 may extend through a top wall of the shroud connector 84'. A wire or electrical connector may extend through the aperture 188 to connect to the device. The shroud connector 84' may include a plurality of openings (not shown). The openings may be spaced along a length of the shroud connector 84'. The openings may be configured to receive a plug 192. The plug 192 may be coupled to the rail 12' by a fastener (not shown). The rail 12' may include a receiver 194 or rail fastener configured to couple to the fastener. The fastener may be a threaded fastener. The fastener may couple the plug 192 to the receiver 194. The fastener may fix the position of the plug 192 relative to the rail 12'. The plug 192 may be selectively positioned in any of the openings in the shroud connector 84' to adjust the effective length of the shroud connector 84'. A shroud connector 84' of adjustable length may allow a single shroud connector 84' design to be utilized with different size helmets. The shroud connector 84', rails 12', and power source mount 60' may form a continuous element that encircles the helmet 14.

Figure 25:
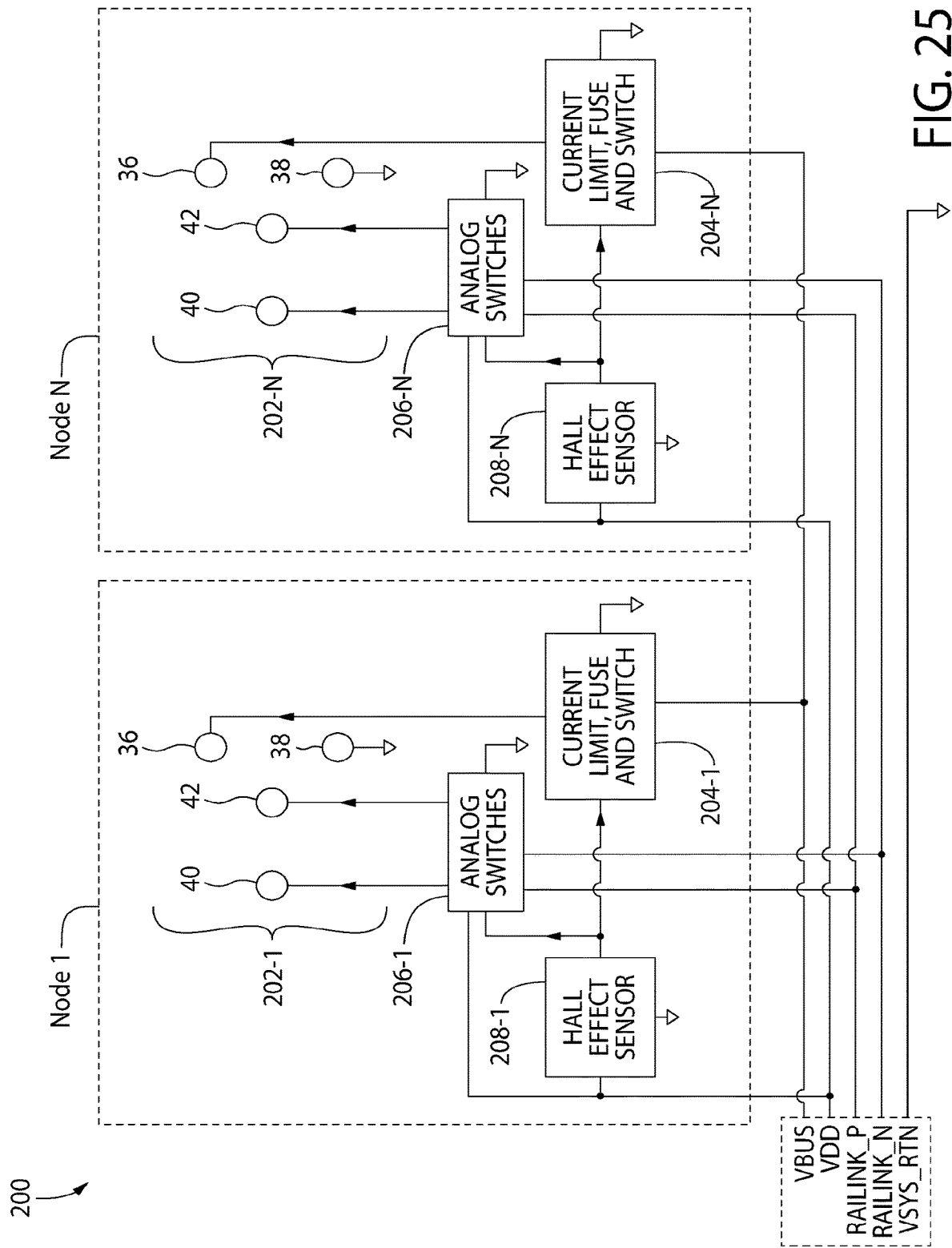
FIG. 25 is a schematic representation of the current limiting circuit in accordance with an exemplary embodiment of the present invention.

Referring to FIG. 25, a plurality of accessory interface circuits (Node 1 through Node N) and a smart battery power source (e.g., power source 28 as shown in FIG. 1A) are electronically coupled through data and power lines (also referred to as buses, contacts, conductors, and/or signals). For example, Node 1 may refer to circuitry configured to provide power and facilitate communications to and from a first accessory, and Node N may refer to circuitry configured to provide power and facilitate communications to and from an Nth accessory. Example accessories include track accessory 16 shown in FIG. 14A or top accessory 116 shown in FIG. 1A. Each node includes an array of electrical contacts for facilitating power deliver and data communications.

At each node, power contacts 36 and 38 (corresponding to contacts 46 shown in FIG. 7) provide power and ground signals to respective accessories. Power signals are provided by a voltage bus VBUS outputted by the power source 28. Availability of power signals at each node is subject to respective current limit, fuse, and/or switching operations that are implemented by power delivery circuit 204.

At each node, data contacts 40 and 42 (e.g., contacts 54 shown in FIG. 7) provide and receive data signals to and from respective accessories. Data signals are directly or indirectly coupled to data lines RAILINK_P and RAILINK_N, respectively. In some implementations, these data lines provide data communications implemented by a serial communication standard (e.g., RS485). Signals provided to and received by the data contacts 40 and 42 may control or be controlled by data communication circuit 206. Example data communication circuits include analog switches, which receive power from a power supply signal VDD outputted by the power source 28 and enable an accessory connected to a respective node to exchange data with the smart battery power source.

At each node, the power delivery circuit 204 and data communication circuit 206 are enabled by the output of an enable circuit 208. The input of the enable circuit 208 is coupled to a power supply signal VDD outputted by the power source 28. The enable circuit 208 is configured to sense the presence and/or absence of an accessory. In some implementations, the enable circuit includes a Hall Effect sensor, which senses the presence of a magnetic field produced by a component of an accessory. For example, when the accessory is installed at the node, the Hall Effect sensor senses the accessory's presence due to the proximity of the magnetic field outputted by a magnetic component of the accessory. Additional or alternative enable circuits 208 may be implemented without departing from the scope of the inventive concepts described herein. For example, an enable circuit 208 may sense physical contact with an accessory and output an enable signal based on the sensed physical contact. Regardless of the implementation for sensing whether an accessory has been installed or is otherwise present, the enable circuit 208 outputs an enable signal (e.g., a digital high signal, a digital low signal, or an analog signal) upon determining that an accessory has been installed or is otherwise present. The enable signal is communicated to the power delivery circuit 204 and data communication circuit 206, thereby causing each circuit to be enabled when an accessory is installed or otherwise present, and disabled when an accessory is removed.

Figure 26:
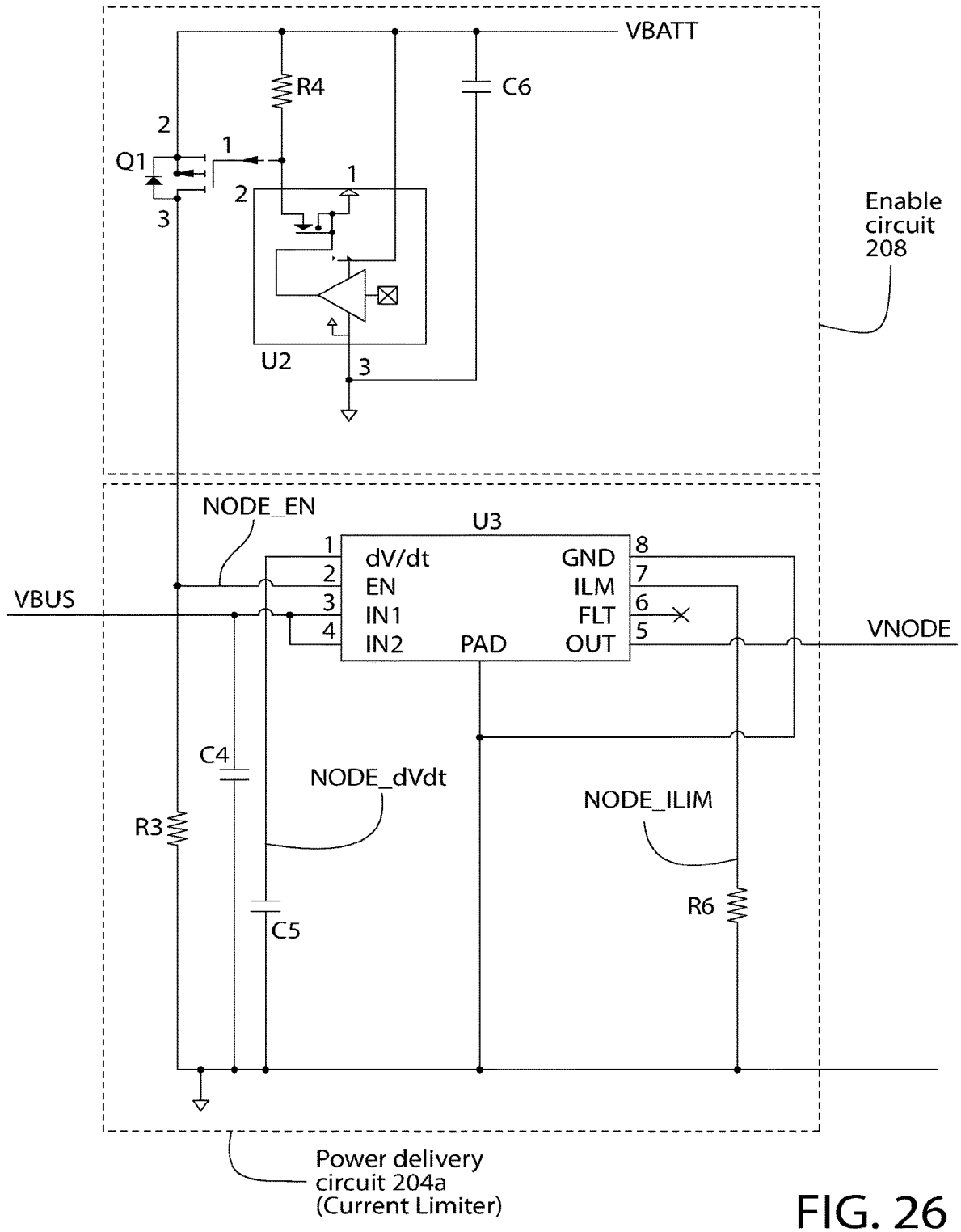
FIG. 26 is a schematic representation of the accessory detection circuit, in accordance with an exemplary embodiment of the present invention.

Referring to FIG. 26, an example power delivery circuit 204a (also referred to as a current limiting circuit 204a) and an example enable circuit 208 (including a Hall Effect sensor) are described in accordance with some embodiments.

The power delivery circuit 204a may be in electrical communication with an accessory attached to the helmet (e.g., helmet 14 shown in FIG. 1A) and the smart battery power source (e.g., power source 28 shown in FIG. 1A). As described in more detail below, the power delivery circuit 204 may be configured to limit current provided to the attached accessory (e.g., track accessory 16 shown in FIG. 14A or top accessory 116 shown in FIG. 1A) to mitigate or prevent damage to the attached accessory.

The power delivery circuit 204 may include a current limiter integrated circuit U3 and peripheral circuitry (R6 and/or C5) for controlling the current limiter U3. Current limiter U3 may be any suitable integrated circuit or combination of discrete circuit elements configured to sense an input current and limit an output current according to a specified limiting factor. While this disclosure describes an integrated circuit configured as a current limiter (U3), this configuration (including the pin layout and peripheral circuitry) is depicted for illustrative purposes and is in no way meant to limit the scope of the subject disclosure. Further, one of ordinary skill in the art would recognize that alternative current limiting configurations may be implemented in order to achieve the features described herein.

The current limiter U3 receives input voltage VBUS (also referred to herein as electrical power) from the power source 28 and delivers output voltage VNODE to an attached accessory (e.g., through power contacts 36 and 38 as depicted in FIG. 25). The current limiter U3 measures the current delivered to the attached accessory via the VNODE connection. If the attached accessory draws more than a particular predetermined threshold of current, the current limiter U3 may throttle the amount of current provided to the attached accessory. The particular threshold may be chosen based on one or more of: the application, power limits of the attached accessory, power source conditions (e.g., an amount of remaining battery capacity), user safety, and so forth. The current limiter U3 increases an internal resistance (e.g., using a field effect transistor (FET) in combination with one or more resistors) to an amount necessary to maintain the current at, or below, the fixed threshold. When the accessory's demand for current returns to levels below the fixed threshold, the current limiter U3 restores the internal resistance to its previous setting, thereby allowing normal operation of the accessory to resume.

In some embodiments, a power FET of the current limiter is driven fully on, or substantially on, when an enable signal at NODE_EN is driven to a logic high (i.e., when an accessory is present), and the power FET is driven off, or substantially off, when the enable signal at NODE_EN is driven to a logic low (i.e., when an accessory is absent).

In the on state, the power FET connects the helmet power supply (VBUS) and the power supply delivered to an individual accessory (VNODE) with a very low-resistance path, which allows current to flow to the individual accessory corresponding to the respective power delivery circuit 204a. VBUS may be distributed along the helmet rails 12 (e.g., helmet rail 12 shown in FIG. 1A). In the off state, the power FET separates VBUS and VNODE with an extremely high impedance, which removes the power supply delivered to the individual accessory corresponding to the respective power delivery circuit 204a. In some embodiments, this switching function may alternatively be performed by other integrated circuits or by discrete parts, such as a pass transistor and digital logic.

In some embodiments, the value of resistance R6 may be chosen to set a desired output current limit, also referred to as a current threshold of the current limiter. For example, resistance R6 may be increased to an amount necessary to maintain the current at, or below, a desired threshold. In some implementations, the current threshold is inversely proportional to resistance R6. In some embodiments, the value of capacitor C5 may be chosen to set a desired output turn on slew rate. Controlling this slew rate is useful in limiting the output current to a desired threshold.

The current-limiting functions described above may alternatively be performed by other integrated circuits or by discrete parts, such as a PNP transistor with emitter resistor feedback.

The current limiter U3 may include an additional feature that protects the current limiter from overheating. When the current limiter U3 is activated, the increased internal resistance may cause the environmental temperature of the current limiter to increase rapidly. The increasing temperature may damage the current limiter. To prevent such damage, current limiter U3 includes, in some implementations, a temperature detection circuit configured to detect the internal temperature of the current limiter and shut off or otherwise disable the current limiter, or a component of the current limiter, in response to the internal temperature reaching a threshold. This removes the accessory from the current limiting circuit, permitting the current limiter to cool. Once the current limiter has cooled to a safe level, additional circuitry in the current limiter re-enables any internal circuitry that may have been disabled. If the same over-current condition exists (e.g., the internal temperature reaches a threshold), the current limiter turns off again due to the over-temperature condition. However, if the over-current condition has been resolved, the accessory may be turned back on automatically via this mechanism.

FIG. 26 also illustrates an enable circuit 208. In some embodiments, the enable circuit includes a presence sensor U2 (e.g., a magnetic sensing circuit including a Hall Effect sensor). The presence sensor U2 activates and deactivates its output (e.g., asserts a digital high or a digital low voltage signal using an internal comparator) according to the presence and absence of an accessory (e.g., an accessory including a magnet) in its vicinity. For example, the presence sensor U2 outputs a particular voltage or current when a magnetic field above a certain magnitude is detected. As an alternative to a Hall Effect sensor, the presence sensor U2 may use a reed switch to detect presence or absence of an accessory.

The presence sensor U2 may be placed at a specific location relative to the accessory's connection pins on the helmet rails 12 (e.g., helmet rail 12 shown in FIG. 1A). A corresponding magnet may be placed in the accessory (e.g., track accessory 16 shown in FIG. 14A or top accessory 116 shown in FIG. 1A), with a position and orientation that ensures a proximity to the sensor when the accessory may be installed. As such, the presence of the accessory may be detected.

In some embodiments, when an accessory is not present, the presence sensor U2 outputs a logic high signal, which drives a p-channel FET Q1 into its off state. This drives the enable signal NODE_EN to a logic low, which turns off or otherwise disables the power delivery circuit 204 and data communication circuit 206, thereby powering down the accessory power supply as described above.

In some embodiments, when an accessory is present, the presence sensor U2 outputs a logic low signal, which drives the p-channel FET Q1 into its on state. This drives the enable signal NODE_EN to a logic high, which turns on or otherwise enables the power delivery circuit 204 and data communication circuit 206, thereby powering up the accessory power supply as described above.

Figure 27:
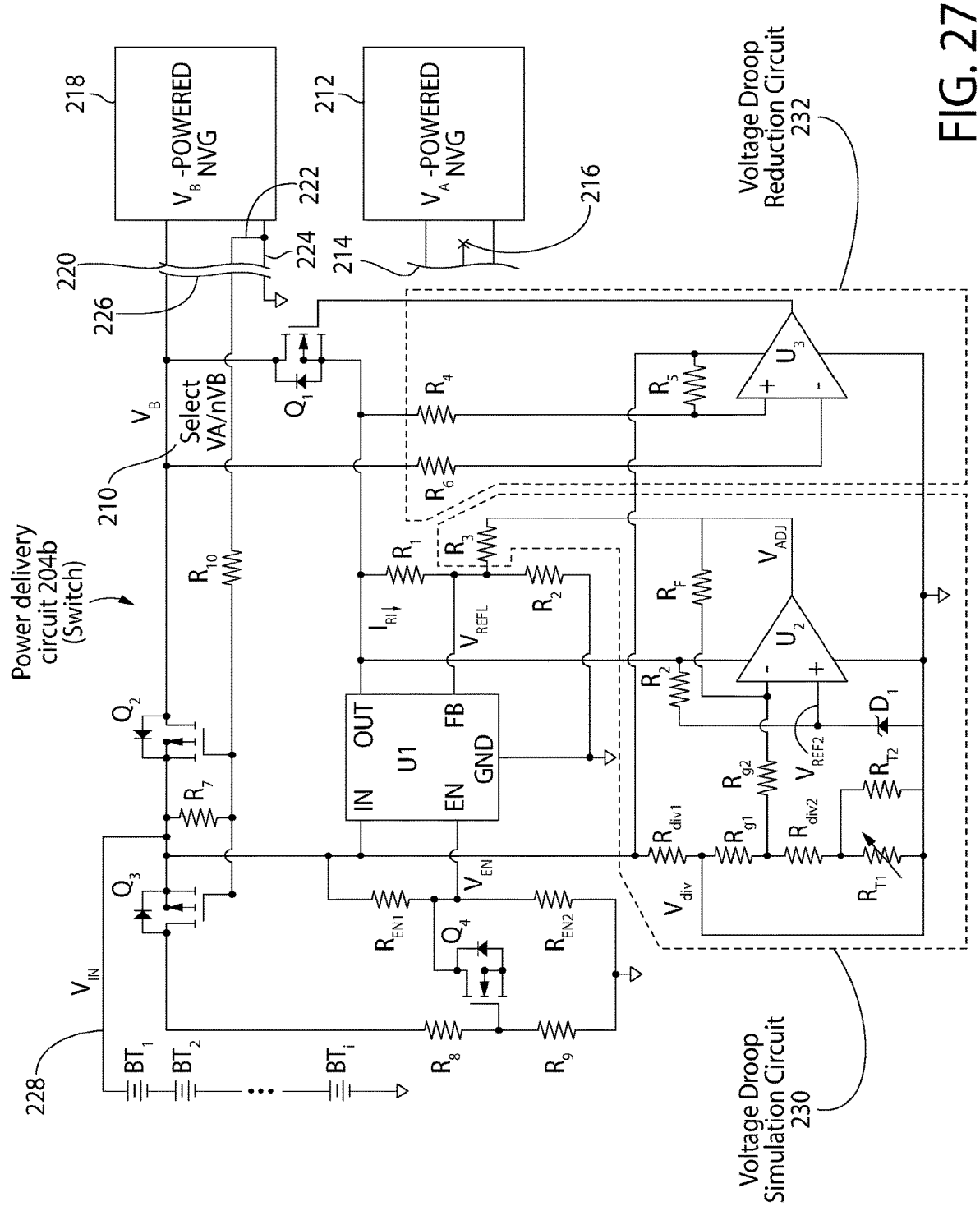
FIG. 27 is a schematic representation of the power switching circuit in accordance with an exemplary embodiment of the present invention.

Referring to FIG. 27, there is shown a power switching circuit (also referred to as a power switching circuit 204b), in accordance with an exemplary embodiment of the present invention. The power switching circuit 204b includes two voltage supplies $V_A$ and $V_B$, transistors Q1, Q2 and Q3, regulator U1 and amplifiers U2 and U3.

The power switching circuit 204b may be used to supply a device such as an NVG (e.g., NVG 19 shown in FIG. 1A) with one of two voltage supplies, $V_A$ or $V_B$ based on device requirements by selecting and transmitting a low voltage or a high voltage to the NVG. For example, the ability to switch between two DC voltages—for example, between $V_A$=3 V and $V_B$=9 V, may be useful because popular NVGs tend to require 3V or 9V for power. Restricting the circuit to produce just one supply voltage would limit the field of supported NVGs.

The power switching circuit 204b selects which voltage, $V_A$ or $V_B$, is used to power the NVG according to the state of the signal at SELECT VA/nVB line 210. The signal at SELECT VA/nVB line 210 is automatically set (i.e., without a user being required to manually set the signal) based on the configuration of the NVG cable and operating voltage signal received from the NVG indicating a voltage requirement of the NVG. NVGs requiring $V_A$=3V (e.g., NVG 212) are associated with cable connector 214 that includes a floating conductor 216 (i.e., the voltage potential of the conductor 216 is not pulled up to any specific voltage potentials and it is not pulled down to a ground voltage potential). NVGs requiring $V_B$=9V (e.g., NVG 218) are associated with connector 220 that includes a conductor 222 that is electronically coupled to a grounded conductor 224 of the connector 220 (i.e., the voltage potential of the grounded conductor 222 is equal to that of conductor 224).

As such, when cable connector 214 is attached to an interface 226 of the power switching circuit 204*b* (e.g., power contacts 36 and 38, as depicted in FIG. 25), the SELECTVA/nVB line 210 is floating due to its coupling with conductor 216 of the cable connector 214. When connector 220 is attached to the interface 226 of the power switching circuit 204*b*, the SELECTVA/nVB line 210 is pulled down due to its coupling with grounded conductor 222 of the connector 220.

When the connection to SELECTVA/nVB line 210 is left open-circuited, the lower $V_A$ power supply is outputted to the NVG 212. When the connection to SELECTVA/nVB line 210 is pulled down (shorted to ground), the higher $V_B$ power supply is outputted to the NVG 218. In this manner, the physical cable configuration determines the appropriate power supply voltage level for the NVG. The selection method may not be restricted to a cable configuration. The selection method may alternatively be implemented at the load (i.e., at the NVG), as a short circuit, or by some other means. Further, the specific configurations of conductors in the connectors 220 and 214 are illustrative in no way meant to limit the scope of the subject disclosure.

$V_{IN}$ 228 is a DC input voltage provided by a supply such as a stack of battery cells connected in series, represented in the figure as $BT_1$ through $BT_i$. This energy source is delivered to an NVG through a connector 220 or 214 for purposes of powering the NVG. As described above, the voltage that powers the NVG may be selected to be either $V_A$ (a low voltage, e.g. 3V) if the cable has a floating conductor 216, or $V_B$ (a higher voltage, e.g. 9V) if the cable has a grounded conductor 222. Both of these cases (floating conductor and grounded conductor) are described below.

First Case: Floating Conductor

When the SELECTVA/nVB line 210 is floating (i.e., open circuited), no current flows through R7 and R10, which holds the p-channel FET Q2 off. Thus, current does not flow through Q2 to supply the $V_B$ node. Meanwhile, the $V_{IN}$ 228 power source is applied to a linear or switching regulator U1. This regulator may be of any type that uses feedback (i.e., at the FB pin) to set the output voltage (i.e., the OUT pin), such that the output is equal to $V_A$ according to the following relationship:

$$V_A = V_{REF1} + I_{R1}R_1$$

In some embodiments, the output voltage of the regulator U1 must be greater than 0 V (i.e., above ground) and less than the $V_{IN}$ 228 input voltage. The reason for the $V_B>V_A$ constraint is that the means of supplying the $V_A$ voltage to the $V_B$ node is via the body diode of the n-channel transistor Q1 When $V_B$ is supplied by transistor Q2 instead of by regulator U1, it is necessary for the body diode of transistor Q1 to be reverse biased, which only happens if $V_A$ does not exceed $V_B$.

In some embodiments, the EN pin of the regulator U1 requires some threshold, $V_{EN(on)}$, between the input supply voltage at the IN pin and the GND pin (i.e., 0 V). The $R_{EN1}$ and $R_{EN2}$ resistor values may be chosen such that when the $V_{IN}$ supply is at least as high as its minimum operating voltage, $V_{IN(min)}$, the $V_{EN}$ voltage exceeds the enable threshold, which signals regulator U1 to operate.

$$V_{IN(min)}\left(\frac{R_{EN2}}{R_{EN1}+R_{EN2}}\right) > V_{EN(on)}$$

Second Case: Grounded Conductor

When the signal at SELECTVA/nVB line 210 is grounded, the gate of transistor Q2 is pulled lower than its source, thereby turning it on. Simultaneously, and for the same reason, transistor Q3 is turned on, which drives transistor Q4 on and the regulator U1 EN pin low, which in turn disables the regulator U1. Under this condition, the transistor Q1 body diode is reverse biased (because $V_B>V_A$). As such, the NVG is powered by $V_B$ alone (with no or substantially no contribution from $V_A$).

The resistors R7 and R10 are chosen to guarantee that gate-source voltage is sufficiently large (in the negative direction) to turn the transistor Q2 and transistor Q3 on, yet not large enough to exceed gate-source voltage ratings of the devices. These constraints are described in the inequalities below.

$$V_{IN(min)}\left(\frac{R_7}{R_7+R_{10}}\right) > |V_{GS(thresh)}|$$

$$V_{IN(max)}\left(\frac{R_7}{R_7+R_{10}}\right) < |V_{GS(max)}|$$

The resistors R8 and R9 are similarly constrained to operate the transistor Q4 transistor properly.

$$V_{IN(min)}\left(\frac{R_9}{R_8+R_9}\right) > |V_{GS(thresh)}|$$

$$V_{IN(max)}\left(\frac{R_9}{R_8+R_9}\right) < |V_{GS(max)}|$$

Voltage Decay Simulation

In some embodiments, NVGs (e.g., 218 and 212) incorporate battery status indicators on their displays, which inform the user when the batteries are nearly depleted. One way in which some NVGs determine the remaining battery capacity is by measuring the supply voltage (here, $V_A$ or $V_B$). As the voltage decreases, the NVG infers a corresponding loss of capacity. Accordingly, it would be desirable for the supply voltage to decay or sag in order to preserve the NVG's ability to inform the user when a battery change is imminent.

In the case of the SELECTVA/nVB line 210 being pulled down, the supply voltage $V_B$ decays naturally, assuming that $V_{IN}$ is powered by a series stack of batteries, $BT_1$, $BT_2$, . . . , $BT_i$, as shown. This occurs because transistor Q2 is turned on, and thus the $V_{IN}$ battery voltage is directly connected to the NVG supply $V_B$ through connector 220. As the battery cells lose capacity, their voltages sag, which may be detected directly by the NVG's battery status indicator.

In the case of the SELECTVA/nVB line 210 being left open, the supply voltage $V_A$ does not decay naturally. The regulator U1 produces the supply voltage, $V_A$, which is outputted to NVG 212. In this case, the voltage drop at $V_{IN}$ that occurs as the cells are depleted are not reflected on the NVG supply $V_A$. The regulator U1 (also referred to herein as a regulator circuit) provides a constant voltage at its output to supply a low voltage at a constant voltage to a connected accessory even when its input supply varies. Thus, with only conventional regulator operation, a low-voltage (e.g. 3 V) NVG 212 would have no means of indicating battery depletion to the user, because the NVG would not experience the decaying supply voltage.

In some embodiments, the power switching circuit 204b includes a voltage decay simulation circuit 230. This circuit is configured to create a voltage decay as the battery cells wear. The circuit operates as follows. First, without the presence of resistor R3, the regulator U1 output would be a fixed voltage, $V_A$, proportional to the internal reference voltage, $V_{REF1}$.

$$V_A = V_{REF1}\left(\frac{R_1 + R_2}{R_2}\right), \text{ or}$$

$$V_{REF1} = V_A\left(\frac{R_2}{R_1 + R_2}\right)$$

Amplifier U2 creates or generates an adjustment voltage, $V_{ADJ}$, proportional to the input voltage $V_{IN}$, but inverted in sign (in other words, the adjustment voltage, $V_{ADJ}$, is inversely proportional to the input voltage $V_{IN}$). This $V_{ADJ}$ voltage sources current through R3 into the $V_{REF1}$ node. As the $V_{IN}$ supply falls, $V_{ADJ}$ rises in proportion. As can be seen in the expression below, the regulator output voltage becomes a function of the adjustment voltage.

$$V_{REF1} = V_A\left(\frac{R_2\|R_3}{R_1 + R_2\|R_3}\right) + V_{ADJ}\left(\frac{R_1\|R_2}{R_3 + R_1\|R_2}\right), \text{ or}$$

$$V_A = V_{REF1}\left(\frac{R_1R_2 + R_1R_3 + R_2R_3}{R_2R_3}\right) - V_{ADJ}\left(\frac{R_1}{R_3}\right)$$

According to the above equation, in response to a positive-going perturbation at its FB pin (due to a dropping $V_{IN}$, hence a rising adjustment voltage $V_{ADJ}$), regulator U1 drives its output lower in essence subtracting the adjustment voltage $V_{ADJ}$ from the originally constant low voltage from regulator U1 to create an adjusted low voltage that is transmitted to the connected accessory. In this manner, the decaying voltage at the battery source is reflected in the NVG supply at circuit branch $V_B$.

The details of the amplifier U2 that produces the $V_{ADJ}$ signal may be described as follows. First, a reference voltage, $V_{REF2}$, is applied to the non-inverting input of amplifier U2. The value of this voltage is be critical; the value may be selected to be about midway between the amplifier supply, $V_A$, and 0V. This ensures that the amplifier operates in its linear range.

The gain of the amplifier is set by the ratio of the feedback resistor $R_f$ and the gain resistance $R_g$.

$$A_V = -\frac{R_f}{R_g}$$

The value of $R_g$ is set by the network of resistors $R_{div1}$, $R_{div2}$, $R_{T1}$, $R_{T2}$, $R_{g1}$, and $R_{g2}$. This resistor network allows the following to occur. First, the $V_{IN}$ supply itself is generally too high to be applied directly to the inputs of amplifiers U2 and U3. For this reason, the resistors $R_{div1}$ and $R_{div2}$ are used to divide the input voltage down to a practical level.

In some implementations, a negative-temperature-coefficient thermistor $R_{T1}$ is placed in series with resistor $R_{div2}$ which allows a certain amount of temperature compensation in the system, depending upon the type of battery cells used.

Lithium cells have a strong positive temperature coefficient, allowing their voltage to drop at cold temperatures and rise at high temperatures. In one embodiment, the purpose of the power switching circuit 204b is to force the $V_B$ voltage to sag when the battery nears depletion. However, it is not desirable for the $V_B$ voltage to sag due to cold temperatures. The thermistor $R_{T1}$ facilitates some reduction in this undesirable voltage drop. As the temperature drops, $V_{IN}$ tends to drop also (assuming lithium batteries), but the value of thermistor $R_{T1}$ increases. This has the effect of reducing the variation of $V_{ADJ}$ as a function of temperature, while retaining its main function of being proportional to battery depletion.

Regarding the resistor $R_{T2}$, since thermistors have sharp and non-linear characteristics over temperature, the fixed resistor $R_{T2}$ in parallel with the thermistor $R_{T1}$ helps to subdue this non-linear behavior.

The resistance $R_{g1}$ may be determined by computing the Thevenin equivalent resistance looking back from the $R_{g2}$ resistor toward the $V_{IN}$ source.

$$R_{g1} = R_{div1} \| (R_{div2} + (R_{T1} \| R_{T2}))$$

Noting finally that $R_g = R_{g1} + R_{g2}$, the expression for the VA supply is as follows:

$$V_A = V_{REF1}\left(\frac{R_1R_2 + R_1R_3 + R_2R_3}{R_2R_3}\right) - $$

$$V_{REF2}\left(\frac{R_1}{R_3}\right)\left(\frac{R_f + R_{g1} + R_{g2}}{R_{g1} + R_{g2}}\right) + V_{IN}\left(\frac{R_1}{R_3}\right)\left(\frac{R_f}{R_{g1} + R_{g2}}\right)\left(\frac{R_{div2} + R_T}{R_{div1} + R_{div2} + R_T}\right)$$

where $$R_{g1} = \frac{R_{div1}(R_{div2} + R_T)}{R_{div1} + R_{div2} + R_T} \quad R_T = \frac{R_{T1}R_{T2}}{R_{T1} + R_{T2}}$$

Voltage Drop Reduction

In the description above, it was noted that the output, $V_A$ of regulator U1 is connected to the NVG supply via the body diode of transistor Q1. When the higher supply voltage $V_B$ is selected (i.e., by tying SELECTVA/nVB to 0V), the body diode of transistor Q1 is reverse biased, thereby isolating the regulator U1. When the lower supply voltage $V_A$ is selected, transistor Q2 is off, so current flows from $V_A$ through the body diode of transistor Q1 to supply the NVG.

With only the diode of transistor Q1 operating (and not the FET itself), an undesirable forward voltage drop through the diode of transistor Q1 is produced. The voltage powering the NVG would be less than the VA supply output—from a few tenths of a volt at low currents up to a volt or more at high currents. The VA supply could be raised to compensate for this, but the efficiency would still suffer and the NVG voltage would fluctuate depending upon the current it was drawing.

In some embodiments, a voltage drop reduction circuit 232 is implemented to mitigate the aforementioned voltage drop (or in other words, mitigate a difference in voltage between the power signal at $V_{IN}$ and the high voltage transmitted to the accessory). The voltage drop reduction circuit includes a comparator U3, which drives transistor Q1 on when $V_A$ exceeds $V_B$. When the regulator U1 is on and transistor Q2 is off, the voltage drop across transistor Q1 causes comparator U3 to drive its output high, turning on the transistor Q1. The fully enhanced transistor Q1 effectively shorts the body diode of transistor Q1, reducing the voltage drop to near zero. The positive feedback via resistor R5 provides a small amount of hysteresis so that the output of comparator U3 does not "chatter" or switch states because of small offset voltages.

When the regulator U1 is off and transistor Q2 is on, the output of the comparator U3 is forced low, turning off Q1 so that its reverse-biased body diode inhibits current flow back to the regulator.

Figure 28:
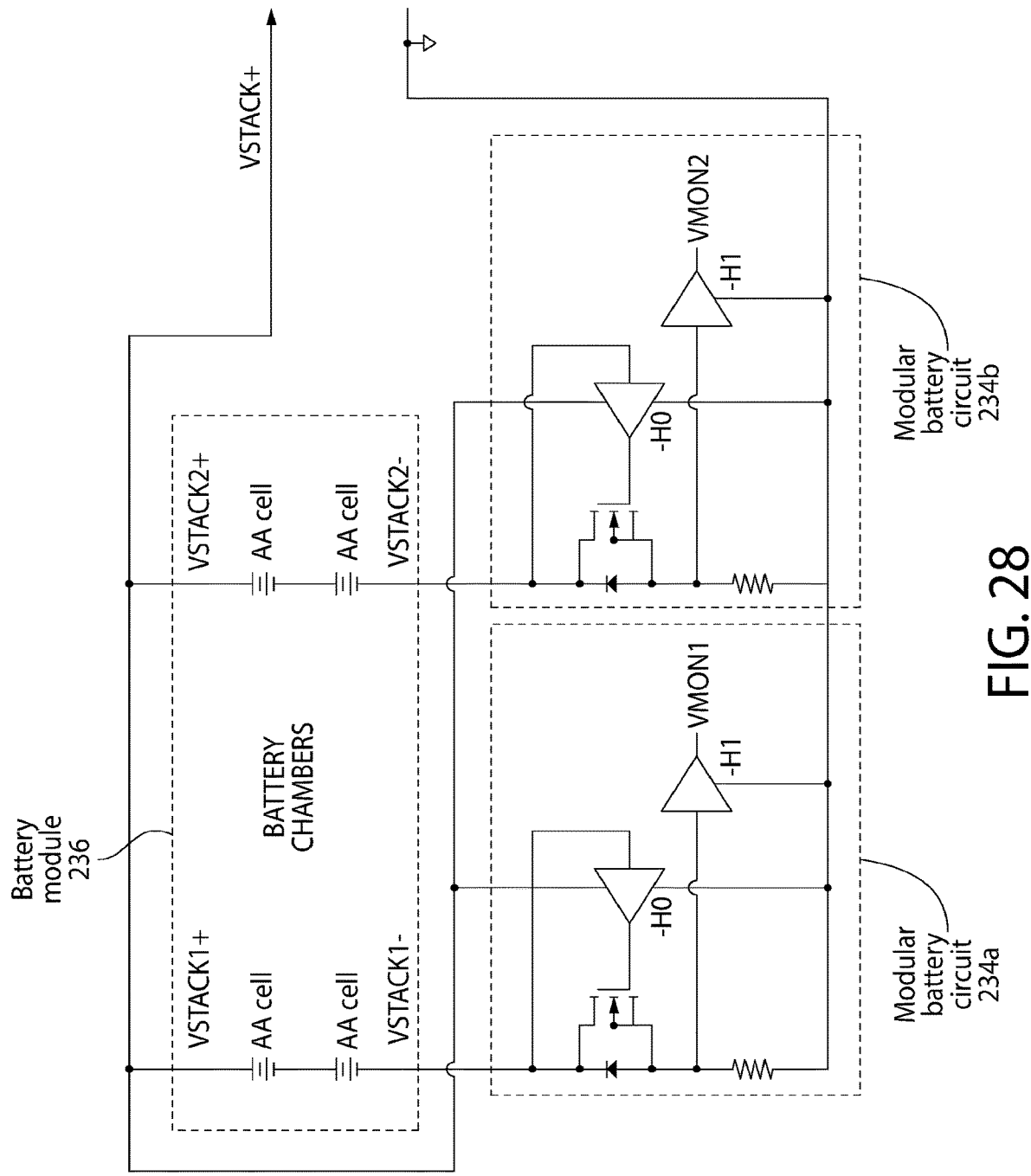
FIG. 28 is a schematic representation of a modular battery circuit in accordance with an exemplary embodiment of the present invention.

Turning now to FIG. 28, due to the varying number of accessories connected to the power source 28, along with the varying power requirements of each accessory, there is a need for flexibility in the size and capabilities of the power source 28. In some embodiments, the power source 28 of FIG. 1A may include modular battery circuitry 234 that permits groups or sets of one or more series-connected battery cells (wherein the individual battery cells are connectable in series electrical communication to form the group) in battery module 236 of the power source 28 to be connected in parallel. By connecting pairs of battery cells in a series "stack," and connecting these stacks in parallel electrical communication, the power source 28 may increase the total amount of current available to the load (connected at VSTACK+). The modular battery circuitry 234 may also prevent one stack of battery cells from charging another stack of battery cells (e.g., current may not be allowed to flow backwards through the battery cells) and minimize energy losses.

In FIG. 28, two sets of series-connected stacked batteries in battery module 236 are illustrated as stacked battery set VSTACK1 and stacked battery set VSTACK2. Each stacked battery set VSTACK1, VSTACK2 may include modular battery circuit 234a and modular battery circuitry 234b, respectively. In some embodiments, additional sets of series-connected batteries may be added in parallel to the stacked battery sets of battery module 236 by also including corresponding modular battery circuitry similar to modular battery circuitry 234. In effect, the modular battery circuitry 234 provides for any number of series-connected battery cells to be added in parallel in a modular fashion. Because of this modularity, the number of series-connected stacked batteries in power source 28 is extendable to any number of battery cells.

Figure 29:
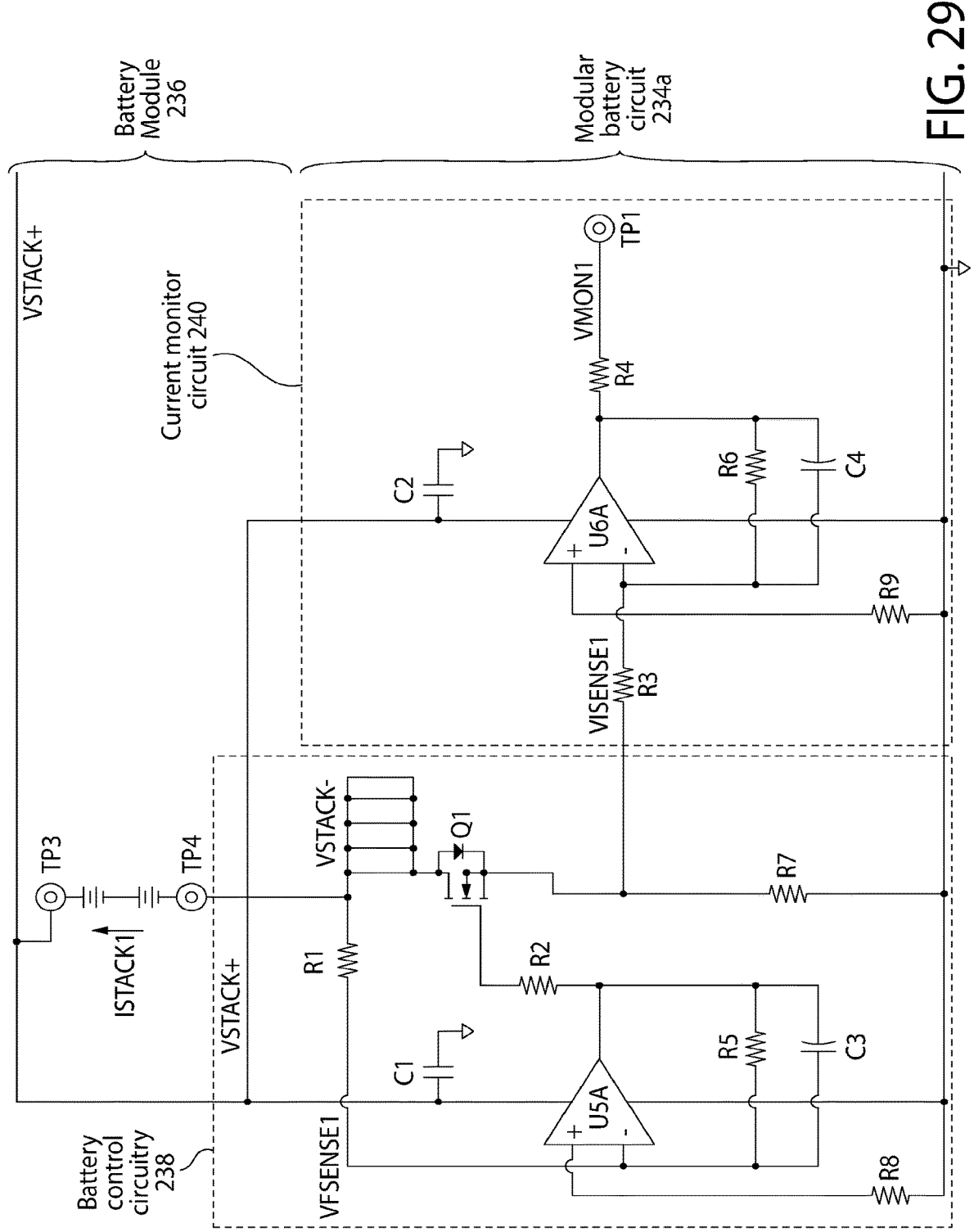
FIG. 29 is a schematic representation of a modular battery circuit in accordance with an alternative exemplary embodiment of the present invention.
Figure 30:
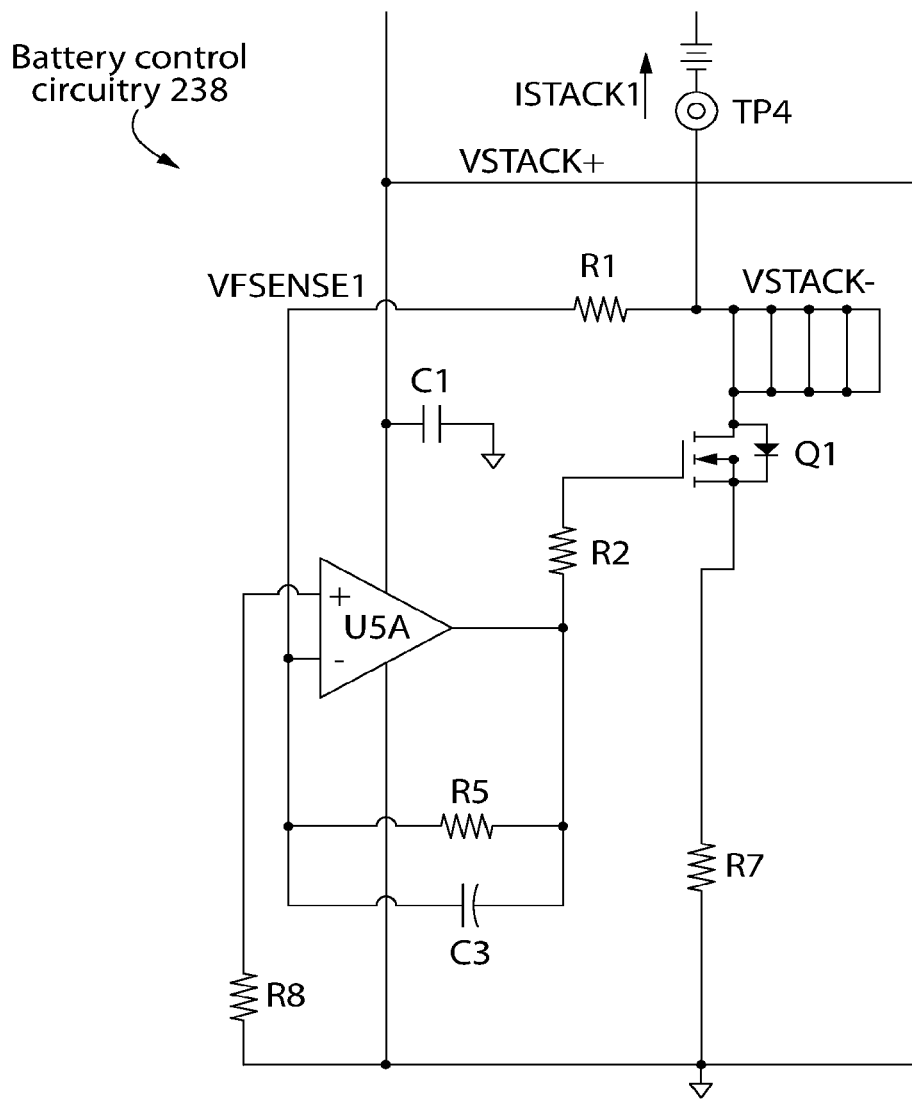
FIG. 30 is an enlarged view of the battery control circuitry shown in FIG. 29.

Referring to FIGS. 29-30, there is shown an exemplary modular battery circuit 234a in electrical communication with a stacked battery set of battery module 236 at a battery interconnection node and in electrical communication with group at a ground interconnection node. The battery stack current, $I_{stack}$, in the circuit may flow from ground, through resistor R7, metal-oxide-semiconductor field-effect transistor (MOSFET) Q1, and the pair of AA batteries that represent the stacked battery set of battery module 236, and out to the load on the VSTACK+ node. The U6A amplifier and surrounding components, including R7, may be used for current measurement, as explained in greater detail below.

Modular battery circuit 234a may include battery control circuitry (e.g., battery control circuitry 238 shown in FIG. 30). The battery control circuitry may prevent current from flowing through the batteries in the wrong direction. Current may flow in the wrong direction, for instance, if the batteries were arranged directly in parallel pairs without protection circuitry. A strong set of batteries could conceivably attempt to charge a weak set of batteries, a condition that would at the least waste energy and possibly be hazardous.

The battery control circuitry may include a resistor R7 and a power MOSFET Q1 positioned in series with the stacked battery set of battery module 236. The resistor R7 may be a small valued resistor. In some embodiments, the resistor R7 is negligible. The MOSFET Q1 may act as a diode and a transistor based on a voltage detected at the gate terminal of MOSFET Q1. The MOSFET Q1 and resistor R7 may form a current flow controller circuit that may prevent current from flowing through the batteries in the wrong direction (i.e., from a positive terminal to a negative terminal of the batteries down through MOSFET Q1). For example, the body diode of MOSFET Q1 may oppose current flowing in the wrong direction. The MOSFET Q1 transistor may be forced off if current flows in the wrong direction. Current flowing from drain to source of MOSFET Q1 may cause a voltage drop from the MOSFET Q1 drain to ground. An amplifier U5A and corresponding resistor R5 and capacitor C3 may form a voltage drop detector circuit in electrical communication with the gate terminal of MOSFET Q1. The voltage drop detector circuit may respond to the voltage drop across MOSFET Q1 by driving the output of the voltage drop detector circuit to ground, thereby turning off the MOSFET Q1.

Still referring to FIGS. 29-30, if the battery stack of battery module 236 forces current in its proper direction (i.e. $I_{stack1}$>0), a positive voltage drop may be formed from ground to the MOSFET Q1 drain meaning that the MOSFET Q1 drain voltage will be negative with respect to ground. The MOSFET Q1 drain voltage may be negative with respect to ground. The amplifier U5A may prevent this voltage drop from being dominated by the forward voltage of the MOSFET Q1 body diode that could constitute a significant energy loss and cause a heating problem at high currents. However, the feedback received by amplifier U5A may cause the amplifier U5A to drive the MOSFET Q1 gate high if any appreciable negative voltage appears on the MOSFET Q1 drain. The amplifier U5A driving the MOSFET Q1 gate high may turn the MOSFET Q1 on, thereby shunting the diode of MOSFET Q1 with a very low resistance (e.g., 0.3 Ohms).

It must be noted that the strength of the turn-on signal for the MOSFET Q1 is dependent on the gain of the amplifier U5A and the source-to-drain voltage drop across MOSFET Q1. As MOSFET Q1 is activated, the channel resistance at MOSFET Q1 drops, as does the source-to-drain voltage for MOSFET Q1 that drives the amplifier U5A. Driving the amplifier U5A may make the voltage drop across the MOSFET Q1 relatively constant as $I_{stack1}$ is varied. Thus, the battery control circuitry tends to improve its efficiency as current is increased. The strength of the turn-on signal may be adjusted by selecting the resistors R1 and R5, which control the inverting gain ($A_v$) of the amplifier U5A.

$$A_V = -\frac{R_5}{R_1}\text{(gain of amplifier driving gate)}$$

In essence, the MOSFET Q1 and the amplifier USA circuitry may create a "super diode" in series with the batteries, which may prevent current from flowing the wrong way without incurring the voltage drop and energy losses of an ordinary diode. As a result, when two or more battery stacks are wired in parallel and connected to a load, the battery stacks tend to share the load according to the strengths of their cells. Stronger batteries provide more current than weaker ones, and thus, over time, the stacks tend to become balanced.

Figure 31:
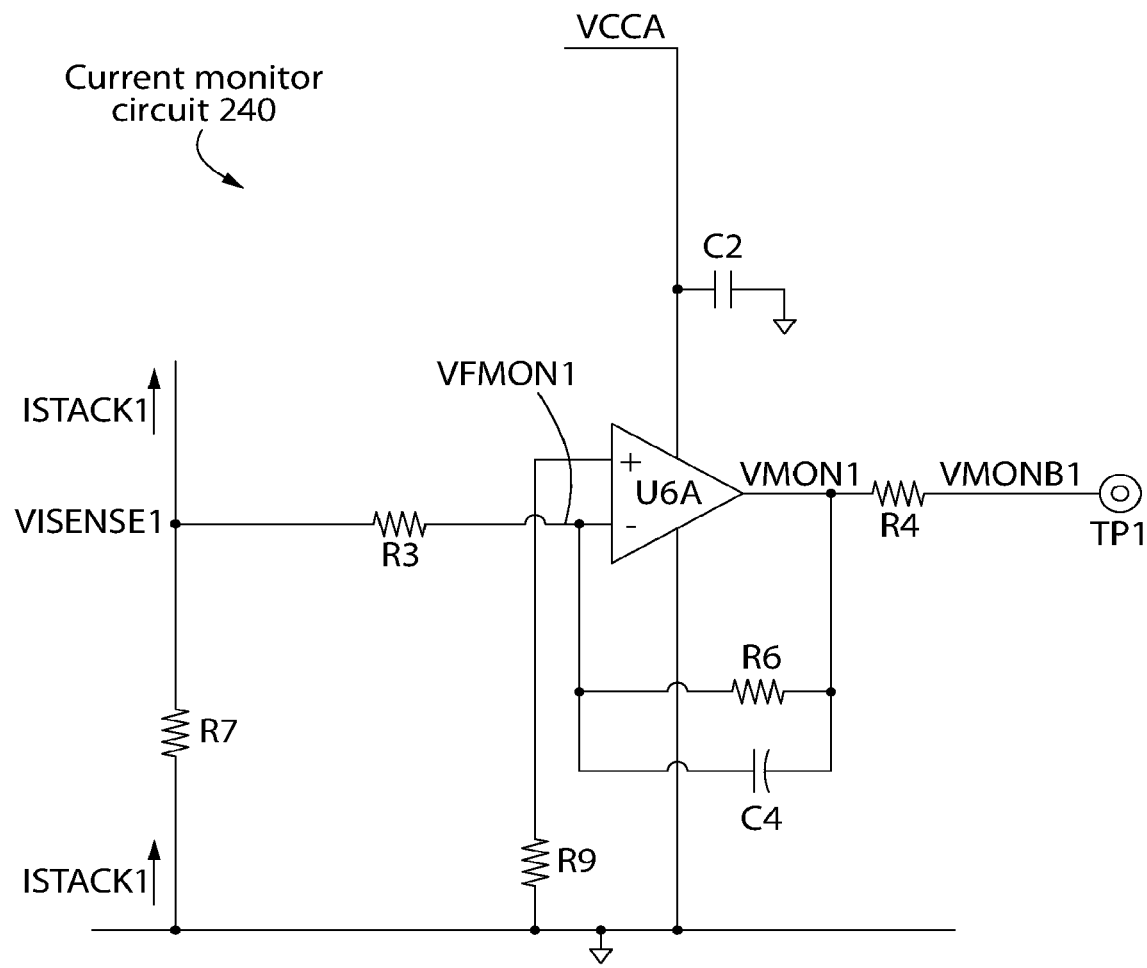
FIG. 31 is an enlarged view of the current monitor circuit shown in FIG. 29.

Referring to FIGS. 29 and 31, modular battery circuit 234a may include a current monitor circuit (e.g., current monitor circuit 240 shown in FIG. 31). The current monitor circuit may include an inverted amplifier U6A that produces a voltage proportional to the $I_{stack1}$ current. The voltage may be measured with a meter, oscilloscope, or microcontroller. The common mode input range of the operational amplifier in the circuit may accommodate signals at, or even slightly below, the negative supply. The VISENSE1 node drops below ground in the circuit when $I_{stack1}$ current is positive. The $I_{stack1}$ current may remain positive or may be zero. When the VISENSE1 node drops below ground, the output of amplifier U6A may rise. The rising output of amplifier U6A may drive the R6-R3 feedback network until the voltage at the inverting input matches that of the non-inverting input (i.e. ground). The millivolts-to-milliamps scale factor of this circuit may be set by the component values as follows.

$$V_{MON} = \left(\frac{-R_6}{R_3}\right)(-R_7)I_{stack1}$$
$$= \left(\frac{-249\ k\Omega}{10.0\ k\Omega}\right)(-0.020\ \Omega)I_{stack1}$$
$$= (0.50\ \Omega)I_{stack1}$$

Hotshoe Electrical Interface

Figure 32C:
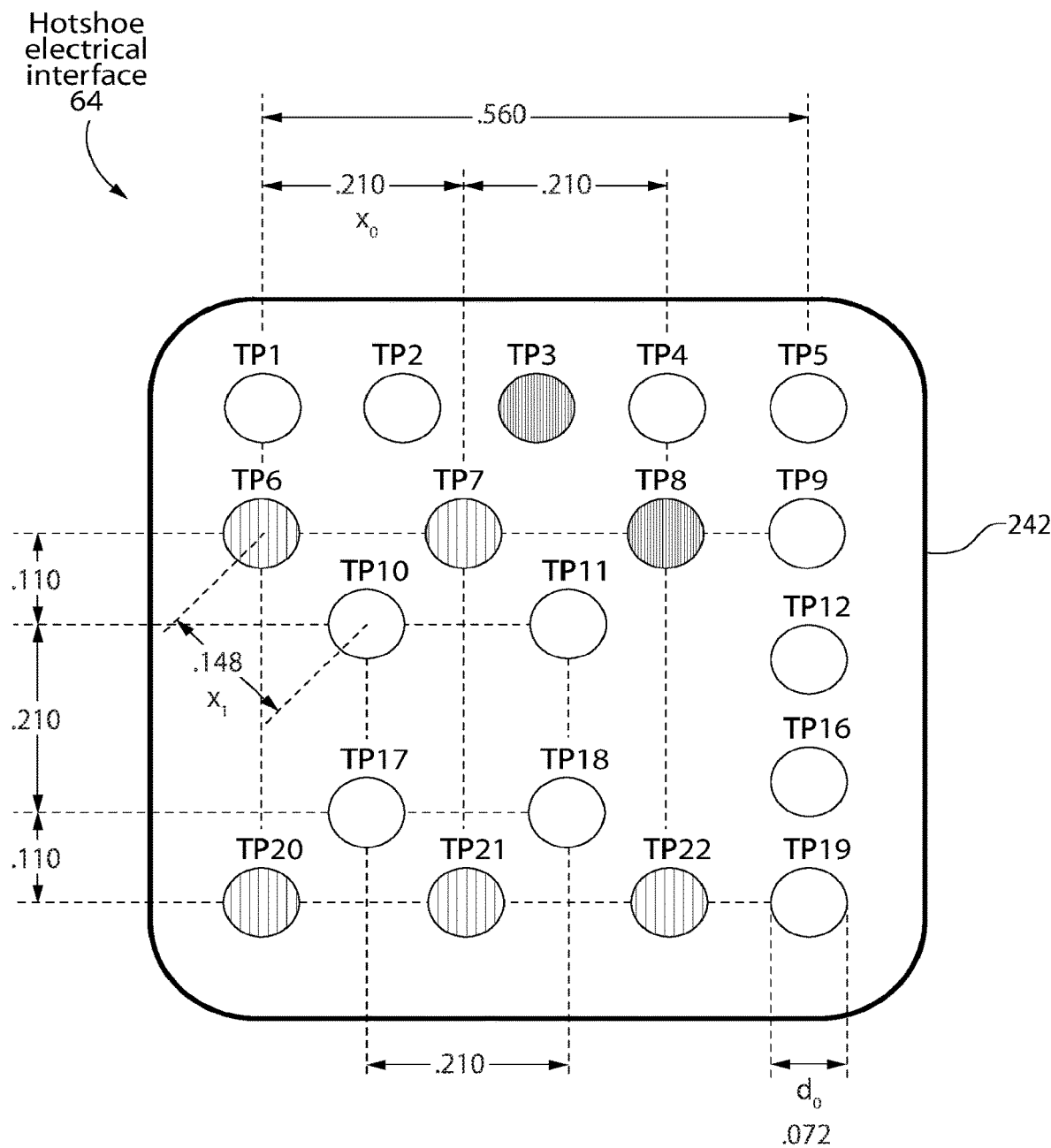

FIGS. 32A and 32C depict an example electrical interface 64 of hotshoe 62 shown in FIG. 18 (also referred to as a hotshoe interface) in accordance with some embodiments, and FIG. 32B depicts an example pinout table of an electrical interface 64 in accordance with some embodiments. The electrical interface 64 houses multiple contacts that allow power to transfer from the power source 28 to the accessory mounting system 10, data for device communication, and high-speed data to interface with coupled accessories (e.g., NVG devices).

The electrical interface 64 may include a plurality of pins such as the pins indicated in FIGS. 32A and 32C as pins TP1-TP12 and pins TP16-TP22. The pins may be fixed pins and/or spring pins. The pins may be a mix of fixed pins and spring pins. The pins are arranged to provide separation of the high-speed data signals (TP10, TP11, TP17, TP18) from the power lines (TP1, TP2, TP16, TP19) and low rate data lines (TP4, TP5, TP9, TP12). An example pinout of electrical interface 64 viewed from the perspective of looking at the hotshoe 62 of power source mount 60 (e.g., looking at the back of the hotshoe 62) is depicted in FIG. 32A.

In some embodiments, power (TP1, TP2, TP16, TP19) and low speed data (TP4, TP5, TP9, TP12) are distributed via flexible printed circuit board assemblies (PCBAs) that connect the rail nodes (e.g. track nodes 34, top nodes 110). Flexible PCBAs allow the rail assemblies (e.g. rails 12) to be replaceable with the addition of connector blocks at a hotshoe interface printed circuit board (PCB). This would allow a user to disconnect a single rail assembly (e.g. rail 12 on either side of power source mount 60) from the hotshoe 62 and not require the entire system to be replaced.

The electrical interface 64 may include balanced differential pairs that are subject to transmission line effects because of the high-speed nature of the signals they are intended to carry. For this reason, the pins for these differential pairs are carefully arranged to establish a controlled impedance in the medium. Among the specific details in this arrangement are the diameters of the fixed pins and spring pins ($d_0$), the distance between these pins ($x_0$), the dielectric constant (relative permittivity, $\varepsilon_r$) of the encapsulating material, and the distance from these pins to other conductors ($x_1$), which includes 0V reference conductors and other power or signal nodes.

In some embodiments, the diameters $d_0$ of one or more of the fixed pins and/or spring pins is 0.072 inches. Six exterior pins (TP6, TP7, TP8, TP20, TP21, TP22) are ground returns. As described above with reference to FIG. 27, TP8 is grounded when interfaced with connector 220 corresponding with high powered NVGs 218, and TP8 is floating when interfaced with cable connector 214 corresponding with low-voltage NVGs 212.

In some embodiments, pins TP13-TP15 are removed and high speed data pins (TP10, TP11, TP17, TP18) are spaced to support wires formed as twisted pairs. For example, a high speed data receiver for a power source 28 may interface with pins TP10 and TP17, and a high speed data transmitter for a power source 28 may interface with pins TP11 and TP18. As shown in FIG. 32C, pins TP10 and TP17 may be positioned at a distance of about 0.210 in from pins TP11 and TP18. Pins TP10 and TP11 may be positioned at a distance of about 0.210 in from pins TP17 and TP18. Pins TP6, TP7, TP8, TP20, TP21 and TP22, surrounding pins TP10, TP11, TP17 and TP18 may be spaced from one another at a distance ($x_0$) of about 0.210 in. Pins TP6, TP7, TP8, TP20, TP21 and TP22, surrounding pins TP10, TP11, TP17 and TP18, may be spaced from pins TP10, TP11, TP17 and TP18 at a minimum distance ($x_1$) of about 0.148 in such that a minimum distance between any of the high-speed data contacts and any other contacts is at least 0.148 in. Pins TP6, TP7, TP8, TP20, TP21 and TP22, surrounding pins TP10, TP11, TP17 and TP18 may be spaced from pins TP10, TP11, TP17 and TP18 in a vertical direction at a distance of about 0.110 in. A total length or width for the pins from center point of one pin to center point of another pin may be about 0.560 in. A diameter ($d_0$) of each of the pins may be about 0.072 inches. A total number of the plurality of contacts may be at least 19 contacts positioned within a maximum area of about 0.35 inches$^2$.

In some embodiments, the electrical interface 64 may be comprised of a material 242 including an impedance matching component configured to support a level of impedance matching. The material 242 may have a controlled dielectric constant to support a desired level of impedance matching (e.g., 100 ohm impedance matching). For example, material 242 may comprise Xenoy or one or more materials having similar properties. In some implementations, material 242 has a relative permittivity $\varepsilon_r$=4.0.

The exact pin numbers and functions in FIGS. 32A-32C are depicted as an example arrangement of power and data signals and are not meant to limit the scope of the subject disclosure. A person of ordinary skill in the art would realize that, based on the application, other combinations of data and power pins and functions may be implemented without departing from the scope of the inventive concepts described here. In addition, the offset measurements and pin geometry in FIGS. 32A and 32C are depicted for illustrative purposes and are not meant to limit the scope of the subject disclosure. Other offsets and geometries may be implemented without departing from the scope of the inventive concepts described herein.

Multi-Channel Mixed Communication

In some embodiments, the Data link (e.g., Data link N, Data link P, and bus VBUS in FIG. 25) is configured to provide a multi-channel mixed communication architecture that enables multi-channel communication either between a controller (e.g. also referred to herein as a smart battery pack (SBP) controller 134) at the power source 28 (also referred to herein as a smart battery pack) and accessory devices (e.g. track accessories 16, top accessories 116, mount 17, or shroud accessories 19) or between the accessory devices themselves. The SBP controller 134 may also be referred to as a helmet controller 134. For example, the Data link may include low data rate serial communication (e.g., bit rate of 1 Bit/s to 100 MB/s). The low data rate serial communication (also referred to herein as a low-bandwidth communication protocol) may be implemented using a TIA/EIA-485 physical layer in a Master-Slave configuration for low-speed commands in some embodiments. In addition, the Data link may also incorporate a high-speed controller area network (CAN) for high-bandwidth data transfer (e.g., bit rate of 1 Bit/s-10 GB/s) (also referred to herein as a high-bandwidth communication protocol) over a helmet bus for high bit-rate communication such as, for example, audio or video data feeds. In some embodiments, the Data link may incorporate a high-speed uni-directional data connection from the SBP controller 134 to the shroud accessories 19 (e.g., the VAS). In some embodiments, the Data link may incorporate a high-speed uni-directional data connection from the shroud accessories 19 to the SBP controller 134. In some embodiments, the Data link may incorporate a low speed universal asynchronous receiver/transmitter bi-directional data connection between the SBP controller 134 and shroud accessories 19.

Unlike the low data rate serial communication interface, a high-bandwidth based channel enables a flexible data rate and is capable of handling arbitration that the device level without the need for a master device. Thus, a 100% bandwidth utilization is theoretically possible. Additionally, the high-bandwidth based channel enables direct distributed communication between various accessories without involving the SBP controller 134.

Advantageously, the use of the mixed communication architecture reduces unnecessary battery drain by avoiding the use of high data rate communication interface for data and control commands that can be transmitted over a low data rate serial communication interface because the high clock speed required for the high bit rate communication requires more energy from the battery. Also advantageously, the Data link may also provide a bridging methodology using the SBP to connect low bandwidth serial interfaces with high bandwidth serial interfaces. This approach enables "low power" command and control with accessories while also providing suitable accessories with a high bandwidth transport layer for data transmissions such as audio, uncompressed video, or compressed video.

Figure 33:
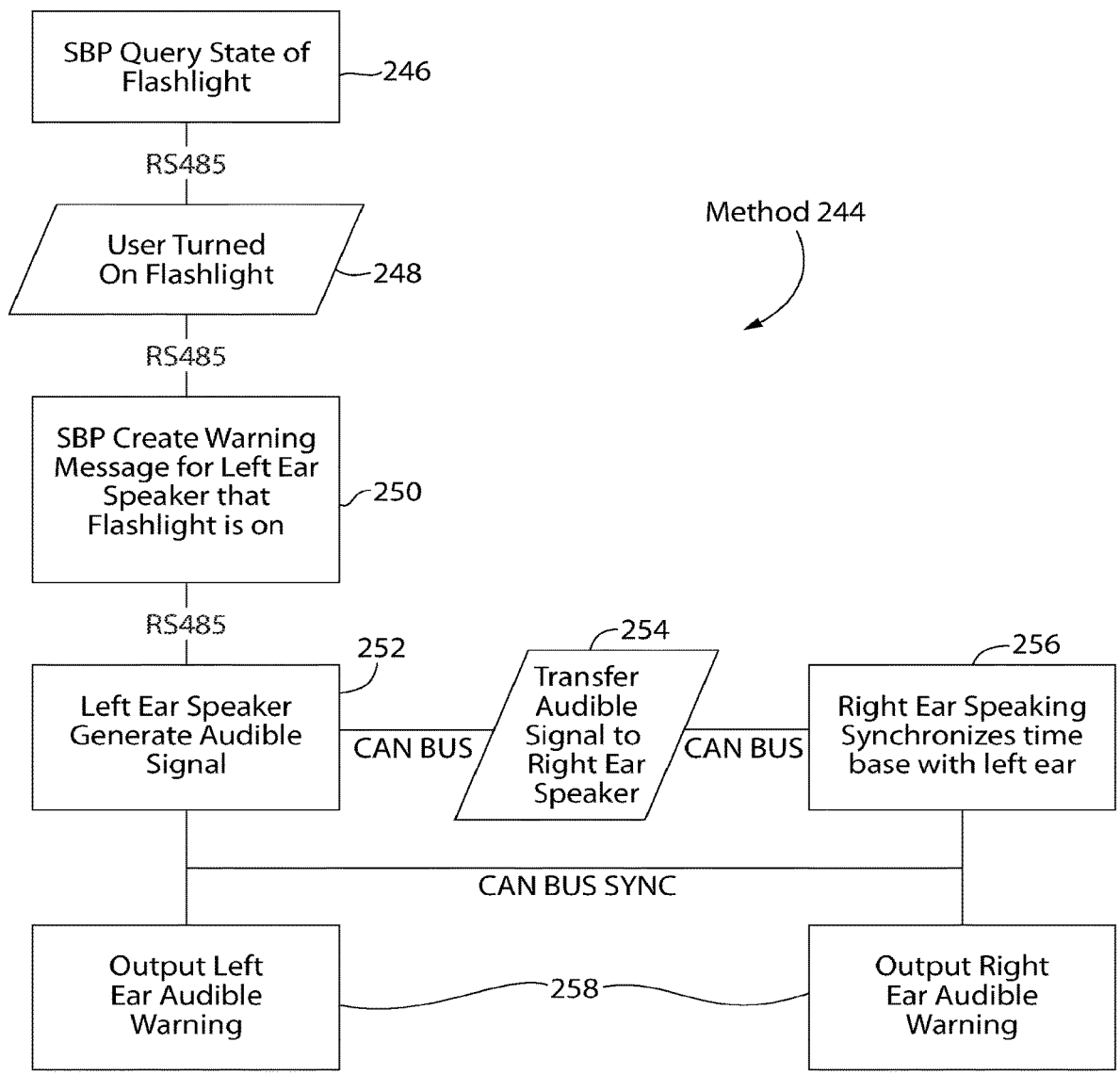
FIG. 33 is a flow diagram of a method of communication between accessories and the power source using different communication channels in accordance with an exemplary embodiment of the present invention.

FIG. 33 illustrates a flow diagram of a method 244 of communication between accessories (e.g. track accessories 16, top accessories 116, mount 17, or shroud accessories 19) and the power source 28 using different communication channels. In some embodiments, some operations in method 244 may be combined and/or the order of some operations may be changed. In this example, accessories including a flashlight (or other light source) and headphones are connected to the Data link. These accessories may be attached to track nodes 34 or top nodes 110, on either of the rails 12 connected to the helmet accessory mounting system 10. At least one of the accessories may also be attached to shroud 82 and connected to the helmet accessory mounting system 10 by shroud connector 84. The accessories may be connected in any combination of the above. For example, the flashlight may be coupled to a top node 110 of a rail 12 on the left side of the helmet 14 while the headphones are individually connected to track nodes 34 on rails 12 on the left and right side of helmet 14.

At step 246, the SBP controller 134 at the power source 28 (also referred to herein as SBP 28) queries for state information of the flashlight accessory over the low bandwidth communication channel. The SBP controller 134 may query for state information at periodic time intervals.

At step 248, a user turns ON the flashlight by providing a user command to the flashlight either manually or digitally or by another method. In response to the user turning the flashlight ON, the flashlight may provide state information to the SBP controller 134 independently or in response to the query by the SBP controller 134. Examples of state information may include information regarding an operating state of an accessory, such as whether a flashlight is ON or OFF.

At step 250, upon receiving the state information from the flashlight, the SBP controller 134 creates a warning message for one of the headphones such as, for example, the headphones for the left ear of the user, indicating that the flashlight is ON and instructing the headphone to generate an audible sound to alert the user. The SBP controller 134 selects a low bandwidth communication protocol for transmitting the warning message because communications relating to the state of an accessory or warning/alert/status/command messages for an accessory do not require high-bandwidth data. Stated another way, the bandwidth capabilities and bandwidth requirements of the flashlight and data provided by the flashlight are satisfied using a low bandwidth communication protocol. Thus, communications are more efficiently performed over the low data rate serial communication channel.

At step 252, in response to receiving the warning message, the left headphone, generates an audible signal.

At step 254, the left headphone transfers the generated audible signal to the right headphone over a high bandwidth channel (e.g., the CAN interface). In this example, because the data is audio data, the high-bandwidth channel is needed to ensure that the left and right ear both have the same audible signal to output at the ears of the user.

At step 256, the left headphone and right headphone synchronize the base time between the right headphones and the left headphone.

At step 258, after the base time between the right headphone and the left headphone is synchronized, the generated audible signals are output from the right and left headphones in synchronous fashion.

In another embodiment, for example, a high-bandwidth accessory such as a heads-up display accessory may communication with the SBP controller 134 using multiple channels selected by the heads-up display (or any accessory in other embodiments) depending on the bandwidth requirements for the type of data being transmitted and the accessory's bandwidth capabilities. For example, a heads-up display accessory may be turned ON by the user (or the heads-up display accessory may receive an accessory control command (controller data) to turn on from the SBP controller 134), and in response, the heads-up display accessory may transmit updated state information to the SBP controller 134 over the low bandwidth channel. Alternatively, when the SBP controller 134 receives a video feed from another accessory (e.g., a camera) the SBP controller 134 may determine that the bandwidth capabilities of the heads-up display support high bandwidth data and transmit the video feed for display on the heads-up display using a selected high bandwidth channel. In either case, the communication relating to the on or off state of the heads-up display accessory is performed over the low data rate serial communication interface. However, the video feed received by the SBP controller 134 is communicated to the heads-up display accessory over the high bandwidth interface because utilizing the low data rate serial communication interface is not suitable for data with a high bandwidth requirements such as video feeds. Stated another way, the SBP 28 may communicate with certain devices using certain interfaces based on the bandwidth requirements for certain types of data being transmitted (e.g., command/control messages vs. audio/video data) as well as the bandwidth capabilities of the accessory (e.g., a device that only requires command/control communication such as a flashlight vs. a device capable of exchanging audio and video data in real-time).

In some embodiments, the Data link may use a CAN over DC power implementation. Such embodiments enables the data transfer over the interface using a CAN protocol as an AC modulated communication. Advantageously, such embodiments also reduces the number of conductors on the Data link node while providing both the high data rate interface and the low data rate serial communication interface.

Also, many of the accessories that can be coupled to the Data link, such as the flashlight, strobe light, headphones, microphones, chemical sensors or biosensors, among others, typically have low power microcontrollers that have a limited capability for handling other peripheral devices. Thus, most of the accessory devices are incapable of implementing high bandwidth communication protocols over a CAN interface and instead rely on low bandwidth communication protocols. Advantageously, the mixed communication implementation allows these accessories to also coexist with other accessories that use high bandwidth data, such as cameras and displays without interference.

Another advantage is that the mixed communication architecture disclosed herein provides high bandwidth peer-to-peer communication for features such as, for example, the ear-to-ear audio described herein, over the Data link while permitting the SBP 28 to serve as a network bridge between the high data rate interface and the low data rate serial communication interface.

Yet another advantage of the mixed communication architecture disclosed herein is that the accessories mounted on the Data link are enabled to transfer meta-data on either operational conditions or sensors data for an accessory as either audible or visual stimuli if a display (e.g., a head-up display) or headphones coupled to the Data link and are using the CAN interface.

Enumeration

The Data link provides accessory adaptability, where different accessories can be attached and detached at the discretion of the user/operator, while also providing mixed communication functionality between the SBP controller 134 and the accessories. To provide accessory adaptability, in some embodiments, the Data link may use network enumeration as described below to gather information about accessories connected to the network in real time. In some embodiments, the Data link may use a master-slave architecture, and the application message and protocol may provide client/server communications between devices connected on the helmet rail 12. In such embodiments, the SBP controller 134 operates as the master device and the accessories connected to various nodes operate as slave devices. Thus, the SBP controller 134 may act as the central processing unit or supervisor controller for the network.

In some embodiments, smart contact nodes, having a low power general-purpose input-output (GPIO) expander and a Hall Effect switch, may be used for connecting the accessories (slaves) onto the network bus. The GPIO expander enables the SBP to read the state of each node to determine if a device is connected and also allows the SBP to control the power state of the corresponding node. In some embodiments, the SBP may identify the accessory connected to a node, authenticates the accessory, reads the state of the accessory and controls or cycles the node's power state. An example protocol by which the SBP identifies and authenticates an accessory connected to a node is described below.

Figure 34:
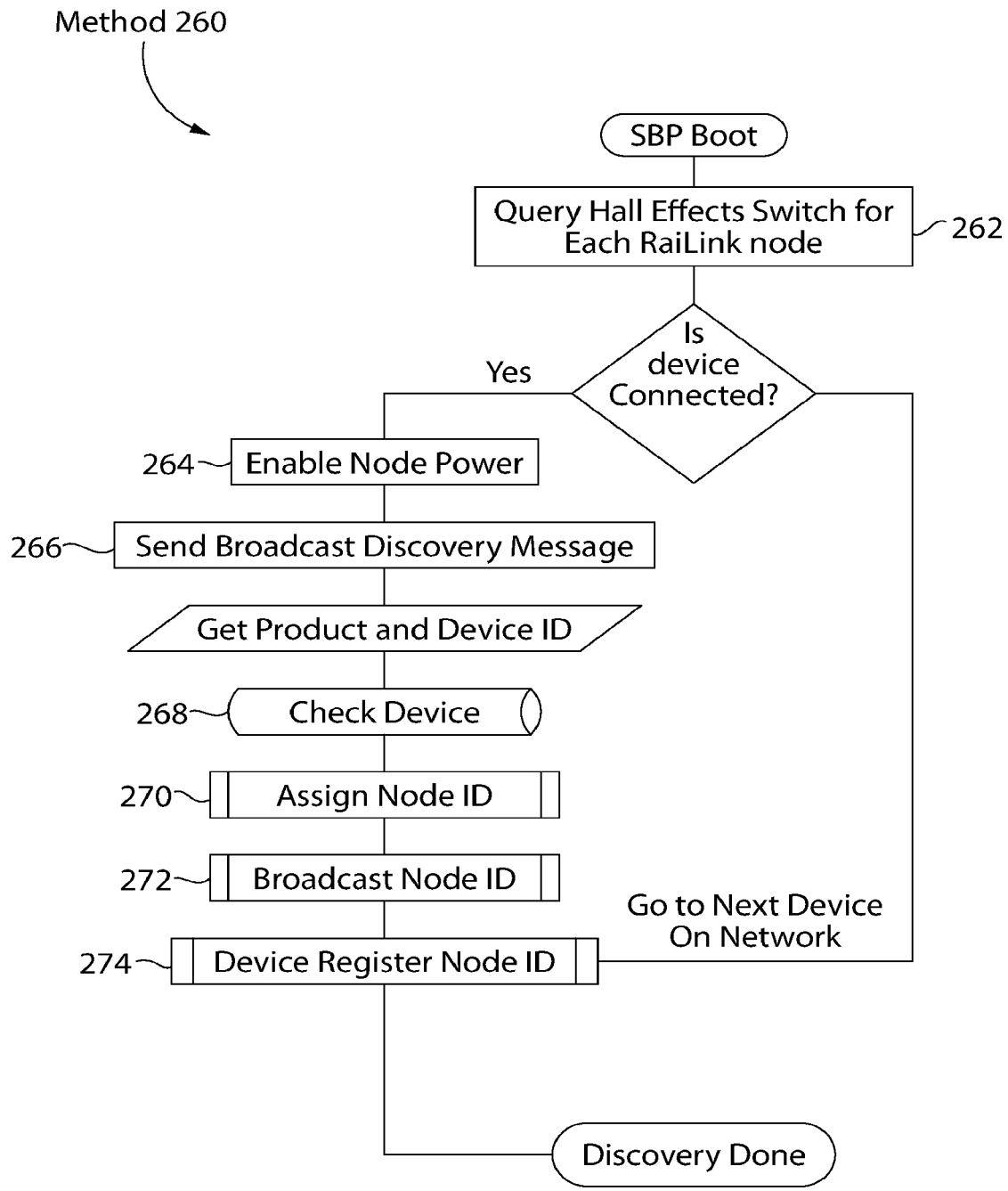
FIG. 34 is a flow chart illustrating a method for identifying a node on the helmet accessory mounting system in accordance with an exemplary embodiment of the present invention.

FIG. 34 shows a flow chart illustrating an exemplary method 260 for identifying a node on the helmet accessory mounting system. In some embodiments, some operations in method 260 may be combined and/or the order of some operations may be changed.

At step 262, the SBP controller 134 queries at each node on the Data link to determine the logical state of the node, e.g., using the node's Hall Effect sensor seen by the GPIO expander.

If the state of the switch indicates that an accessory is connected to a particular node (262—yes), the SBP controller 134 moves to 264. Otherwise, the SBP controller 134 determines that the node is unused and queries the next node.

Continuing at step 264, the SBP controller 134 transmits a signal to the node GPIO expander to enable power to that specific node. Once the accessory receives power, the accessory activates such that the accessory can communicate with the SBP over the network.

At step 266, the SBP controller 134 sends a broadcast message to the accessory at the particular node requesting device identification information from the nodes. The device identification information may include vendor identification information such as a vendor identification number and/or product identification information such as a product identification number, in some embodiments.

At step 268, after the device identification information is received from the accessory, the SBP controller 134 determines if the information is valid. To determine if the device information is valid, the SBP controller 134 may match the received device information to device information from a pre-compiled listing of approved devices. If a match exists, the accessory is approved for communicating on the Data link.

At step 270, after the SBP controller 134 determines that a device is valid, the SBP controller 134 assigns a node identification number (or in some embodiments a node identifier) to the accessory such that the SBP controller 134 can send and receive data to and from that specific accessory as well as cycle and control power to the accessory using the node identification number.

At step 272, the SBP controller 134 broadcasts or transmits the node identification number to all the nodes within the network. Once the other nodes receive the node identification number for the new accessory, the accessory is registered so that the SBP controller 134 and other devices may also communicate with the accessory (including exchanging controller/accessory data with the respective accessory) using the node identification number.

At step 274, the SBP controller 134 performs similar identification and authentication tasks on all the other nodes with devices connected on the network.

In some embodiments, the SBP controller 134 periodically queries the state of the Hall Effect sensor of each node on the network. Such periodic query enables the determination of whether an accessory has been added or removed from the network. Such an implementation enables the SBP controller 134 to apply power to each node independently and send a new device general broadcast over the RS485 serial communication interface for any newly powered accessory. In other words, whenever a new accessory is added to the network, the SBP controller 134 may power the accessory independently and notify the other nodes that a new accessory has been added to the network. Such notification enables individual accessory devices to communicate with each other directly, e.g., over the CAN bus. Advantageously, in some embodiments, the SBP controller 134 may identify any devices that are either not responding to protocol messages or are breaking down the network, for example, because of higher than expected power to draw. In such instances, the SBP controller 134 may decide to disable a specific node on the network based on its operating characteristics to optimize the effective lifespan of the battery pack and maximize the usable time for the other accessories.

Accessory Communication

In addition to Data link communication between a SBP controller 134 and an accessory, the Data link also provides for communication between accessories over the network. Accessory communication enhances the overall Data link system by allowing accessories to share state information or data information with other accessories. These other accessories are then able to adjust their operating states accordingly to provide a more coordinated accessory network for the operator.

Figure 35:
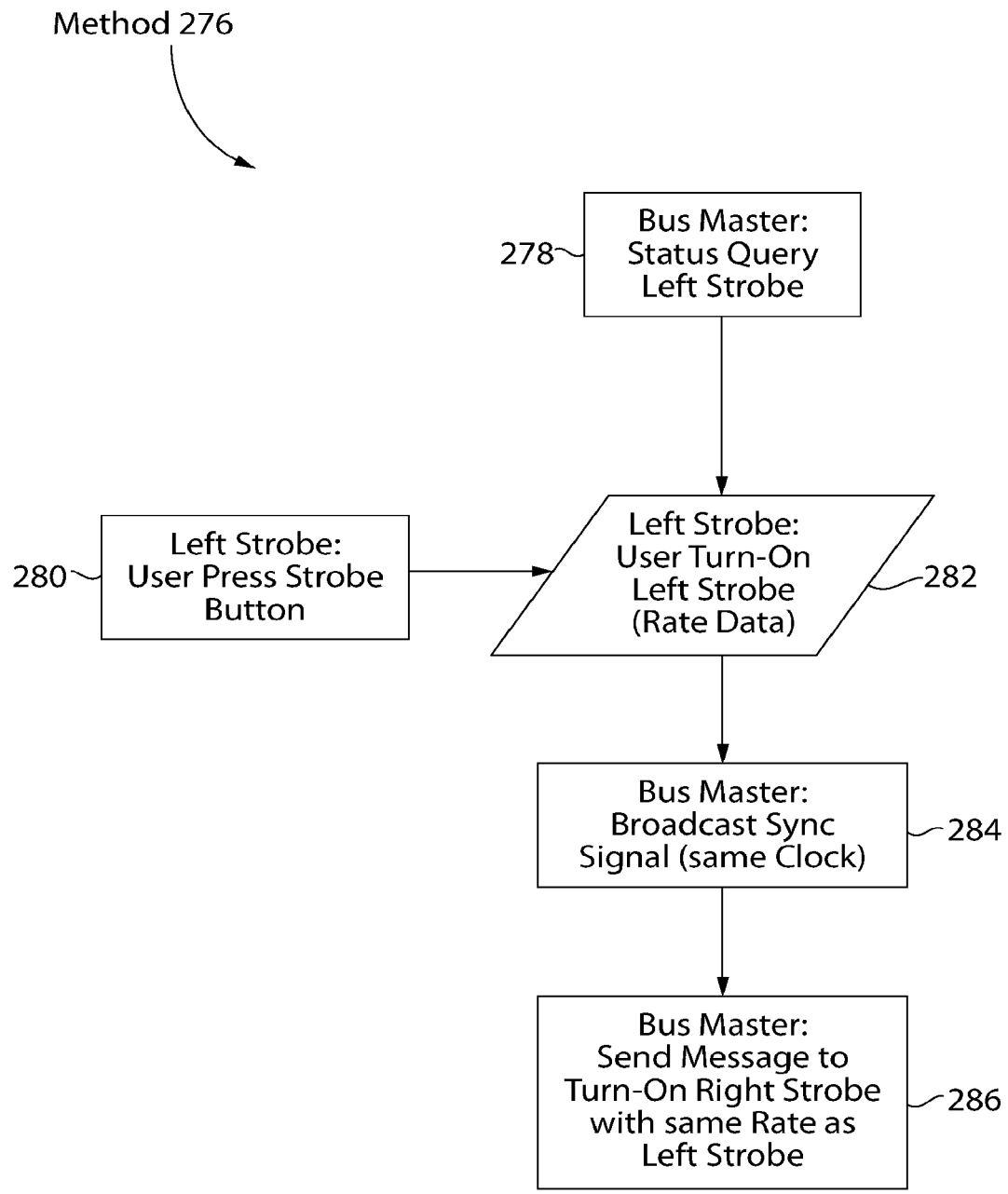
FIG. 35 is a flow chart illustrating a method for accessory communication according to at least one embodiment of the present invention.

FIG. 35 shows a flow chart illustrating an exemplary method 276 for accessory communication according to at least one embodiment. In this example, accessories such as strobe lights connected on either side of the helmet may be synchronized through the SBP controller 134, thereby allowing the strobe lights to function as a single coordinated unit. In some embodiments, operations performed by an SBP controller 134 may be performed by an accessory controller.

At step 278, the SBP controller 134 (also referred to herein as "Bus Master") periodically queries the status of a strobe light mounted on the left side of the helmet (also referred to herein as the left strobe). While the strobe light is OFF, the SBP controller 134 takes no further action while continuing to periodically query the status of the strobe light.

At step 280, the user initiates a command to turn the left strobe ON. The command may be initiated at the left strobe via manipulation of a button or switch on the left strobe. Alternatively, the command may be initiated by receiving the command at a controller of the left strobe via a wireless data transmission from an external device such as a remote control.

At step 282, while the SBP controller 134 is querying the strobe light, the SBP controller 134 receives status information from the strobe light indicating that the strobe light has changed from OFF to ON. The status information may also include pulsing frequency (i.e., strobe rate) at which the left strobe is operating.

At step 284, in response to the SBP controller 134 receiving status information indicating that the status of the strobe light has changed, the SBP controller 134 broadcasts a synchronization signal to all nodes to synchronize the clocks of all the nodes with that of the left strobe.

At step 286, the SBP controller 134 sends a command to the node at which the strobe light mounted on the right side of the helmet (also referred to herein as the right strobe) to turn on the right strobe at the same pulsing frequency or strobe rate as the left strobe. The command may include the status information of the left strobe, including the pulsing frequency. The strobe light mounted on the right side of the helmet turns ON and strobes at the pulsing frequency synchronized with the left strobe.

In some embodiments, other accessories besides strobe lights may be used. The accessories coupled to the Data link communicate using the RS485 Master-Slave interface of the Data link where the SBP controller 134 initiates and manages all communication between the accessories. Although, in alternative embodiments, the accessories may communicate directly using a distributed network communication protocol. In some embodiments, where two accessories are mounted to the helmet (e.g., on the left and the right side of the helmet), once the device is enumerated on the Data link, the SBP controller 134 queries the status. The accessories provide a status message, e.g., with mnemonic codes, to offer configuration information and their current state when queried by the SBP controller 134. With this information, the SBP controller 134 can determine if an accessory was activated and the state/configuration information of the accessory. Upon receiving state/configuration information, the SBP controller 134 can then broadcast an accessory control command to activate any related accessories to cause such accessories to change from operating in a first state to operating in a second state. For instance, in an example of a first accessory such as a camera and a second accessory such as a heads-up display connected to the Data link, the camera may change from an OFF operating state to an ON operating state where the camera records video. The SBP controller 134 may detect the state change indicated by the accessory state data transmitted from the camera. In response, the SBP controller 134 may then transmit a command to the heads-up display to change the operating state of the heads-up display from an OFF operating state to an ON operating state to display the video from the camera on the heads-up display.

The method of communicating and controlling accessories using a SBP controller 134 disclosed herein can be used with various accessories that can be coupled to the helmet. Examples of the accessories include, but are not limited to, multimedia accessories such as headphones or low bandwidth display devices; human interface devices such as heads-up displays and radios; illumination devices such as lasers, strobes, or flashlights; single point controllers or gateway devices such as a Bluetooth mesh; and sensors such as cameras, infrared sensors, chemical sensors, biosensors, atmospheric sensors, or light sensors.

When a plurality of different accessories are coupled to the helmet, the specific functions of each of the accessory device classes is known to the SBP controller 134 based on the device ID obtained by the SBP controller 134 during enumeration of the Data link described herein. Based on the type of accessory, these functions may include, for example, turning strobe lights ON or OFF, reading a user interface to determine a state of a button, commanding a heads-up display to display status information regarding an accessory, or causing headphones to synchronously output an audible alert message.

In some embodiments, the helmet accessory mounting system 10 described herein also enables control of all accessories coupled to the helmet 14 through a single user interface device or end user device 137 (EUD) such as, for example, a smart phone that is operatively coupled to the SBP controller 134. In some embodiments, the communication needed for the command and control of accessories through the EUD 137 is performed over the low data rate serial communication interface described herein. The EUD 137 could be located on the user's person or the user's weapon, thereby enabling the user to control the accessories coupled to the helmet without having to non-visually locate the various controls of the various accessories. In some embodiments, the EUD 137 may communicate with the SBP controller 134 over WiFi, Bluetooth or other wireless communication protocols. In some embodiments, the EUD 137 may control the accessories through another dedicated master accessory controller other than the SBP controller 134. In some embodiments, the dedicated master accessory controller may be provided as a single control point on the helmet or the helmet rail as a wired or node connection.

In at least one embodiment, there is included one or more computers having one or more processors/controllers and memory (e.g., one or more nonvolatile storage devices). In some embodiments, memory or computer readable storage medium of memory stores programs, modules and data structures, or a subset thereof for a processor/controller to control and run the various systems and methods disclosed herein. In one embodiment, a non-transitory computer readable storage medium having stored thereon computer-executable instructions which, when executed by a processor/controller, perform one or more of the methods disclosed herein.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A helmet accessory mounting system comprising:
   a mounting device configured to couple to an outer surface of a side of a helmet, the mounting device including a plurality of mounting locations configured to releasably couple to at least one accessory, a plurality of the plurality of mounting locations each including an electrical node;
   a power supply coupled to the mounting device;
   an electrical supply line electrically coupling the power supply to each of the electrical nodes, the electrical supply line contained at least partially within the mounting device;
   a sensor configured to sense a condition associated with the at least one accessory being coupled to the mounting device; and
   a data line contained at least partially within the mounting device and communicatively coupling each of the electrical nodes to one another;
   wherein the sensor is further configured to detect whether the at least one accessory is connected to the electrical nodes and at which electrical node the at least one accessory is electrically connected to.

2. The helmet accessory mounting system of claim 1, wherein the sensor includes a Hall Effect sensor.

3. The helmet accessory mounting system of claim 1 further comprising:
   a switch in the electrical supply line, wherein the switch is closed when the sensor senses the condition associated with the accessory being coupled to the mounting device.

4. The helmet accessory mounting system of claim 1, wherein the sensor includes an accessory presence sensor configured to sense a magnetic field associated with the at least one accessory.

5. The helmet accessory mounting system of claim 1 further comprising:
   for each electrical node:
      an enable circuit in electrical communication with the respective electrical node, the enable circuit configured to:
         sense an attachment of an accessory at an electrical node, and
         output an enable signal in response to determining that an accessory is connected to an respective electrical node; and
      a current limiting circuit in electrical communication with the enable circuit and the power supply, the current limiting circuit configured to:
         receive the enable signal from the enable circuit to enable the current limiting circuit,
         receive electrical power from the power supply, and
         in response to receiving the enable signal, limit an amount of electrical current in the electrical power provided by the power supply to the respective accessory to mitigate or prevent damage to the respective accessory, the power supply or the mounting device.

6. The helmet accessory mounting system of claim 5, wherein the amount of electrical current is limited to less than a predetermined threshold.

7. The helmet accessory mounting system of claim 5, wherein the current limiting circuit including a temperature detection circuit configured to:
   while the current limiting circuit is enabled:
      detect an internal temperature of components of the current limiting circuit, and
      in response to detecting that the internal temperature of the components of the current limiting circuit exceeds a threshold, disabling the current limiting circuit to prevent the respective accessory from receiving electrical power from the power supply, and
      in response to detecting that the internal temperature of the components of the current limiting circuit falls below a threshold, re-enabling the current limiting circuit to allow the respective accessory to receive electrical power from the power supply.

8. The helmet accessory mounting system of claim 1, wherein the at least one accessory has one of at least two separate voltage requirements, the helmet accessory mounting system further comprising:
  a power switching circuit configured to:
    receive a power signal from the power supply, and
    select and transmit a low voltage or a high voltage to the at least one accessory based on an operating voltage signal received from the at least one accessory indicating a voltage requirement of the at least one accessory.

9. The helmet accessory mounting system of claim 8, wherein the power switching circuit includes:
  a regulator circuit configured to supply the low voltage at a constant voltage to the at least one accessory and
  a voltage decay simulation circuit configured to:
    while the regulator circuit is transmitting the low voltage at a constant voltage, generate an adjustment voltage inversely proportional to the power signal from the power supply such that the adjustment voltage increases as a voltage of the power signal decreases, and subtract the adjustment voltage from the low voltage to create an adjusted low voltage that is transmitted to the at least one accessory.

10. The helmet accessory mounting system of claim 9, wherein the adjusted low voltage varies as a function of an environmental temperature at the helmet.

11. The helmet accessory mounting system of claim 8, wherein the power switching circuit includes:
  a voltage drop reduction circuit configured to mitigate a difference in voltage between the power signal and the high voltage transmitted to the at least one accessory caused by one or more semiconductor components in an electrical communication path between the power signal and the high voltage transmitted to the at least one accessory.

12. The helmet accessory mounting system of claim 1, wherein each electrical node includes a plurality of electrical contacts arranged symmetrically with respect to one direction and arranged asymmetrically with respect to another direction.

13. The helmet accessory mounting system of claim 1, wherein each electrical node includes a plurality of electrical contacts arranged in a T-shape.

14. The helmet accessory mounting system of claim 13, wherein the electrical contacts of at least one of the electrical nodes are arranged in a mirrored orientation with respect to the electrical contacts of at least one other electrical node.

15. The helmet accessory mounting system of claim 13, wherein the plurality of electrical contacts includes two power supply contacts electrically connected to the electrical supply line and two data contacts connected to the data supply line.

16. The helmet accessory mounting system of claim 1, wherein the electrical nodes includes a first electrical node and a second electrical node positioned within a recessed groove of the mounting device, and
  wherein the mounting device is configured to enable the at least one accessory to be slid along the recessed groove from being electrically connected to the first electrical node to being electrically connected to the second electrical node and vice versa.

17. The helmet accessory mounting system of claim 1, wherein the electrical nodes includes a first electrical node configured to be positioned on a first side of the helmet and a second electrical node configured to be positioned on a second side of the helmet opposite the first side, and
  wherein each of the first and second electrical nodes include corresponding first and second sensors each positioned in front of or behind the corresponding first and second electrical nodes.

18. The helmet accessory mounting system of claim 1, wherein the mounting device includes a plurality of depressions configured to engage with and at least partially fix the position of the at least one accessory relative to the mounting device, the sensor being positioned within at least one depression of the plurality of depressions.

19. The helmet accessory mounting system of claim 1, wherein the mounting device includes two depressions for each electrical node, the depressions being positioned on opposite sides of the corresponding electrical node, and
  wherein the sensor is positioned in one of the two depressions.

20. The helmet accessory mounting system of claim 1, wherein a hotshoe electrically connected to the power supply line couples the power supply to the mounting device, and the hotshoe is separate from the electrical nodes of the mounting device.

21. A helmet accessory mounting system comprising:
  a mounting device configured to couple to an outer surface of a side of a helmet, the mounting device including a plurality of mounting locations configured to releasably couple to at least one accessory, a plurality of the plurality of mounting locations each including an electrical node:
  a power supply coupled to the mounting device;
  an electrical supply line electrically coupling the power supply to each of the electrical nodes, the electrical supply line contained at least partially within the mounting device;
  a sensor configured to sense a condition associated with the at least one accessory being coupled to the mounting device; and
  a helmet controller in electrical communication with each of the electrical nodes,
  wherein the helmet controller is configured to:
    periodically probe each of the electrical nodes to determine if a respective accessory is connected to the respective electrical node; and
    in response to determining that a respective accessory is connected to the respective electrical node:
      enable power at the electrical node,
      transmit a broadcast discover message to the respective accessory at the electrical node,
      receive product identification and device identification information
      validate the respective accessory using the product identification and device identification,
      assign a node identifier to the respective electrical node,
      transmit the node identifier to the respective accessory at the electrical node for the respective accessory to register the node identifier, and
      exchange accessory data with the respective accessory.

22. A helmet accessory mounting system comprising:
  a mounting device configured to couple to an outer surface of a side of a helmet, the mounting device including a plurality of mounting locations configured to releasably couple to a first accessory and a second accessory, a plurality of the plurality of mounting locations each including an electrical node;

a power supply coupled to the mounting device;

a sensor configured to detect whether the at least one accessory is connected to the electrical nodes and at which electrical node the at least one accessory is electrically connected to;

an electrical supply line electrically coupling the power supply to each of the electrical nodes, the electrical supply line contained at least partially within the mounting device; and a data line communicatively coupling each of the electrical nodes, wherein the data line is configured to transmit first accessory data from the first accessory connected at one of the electrical nodes to the second accessory connected at another of the electrical nodes, wherein the first accessory data includes first accessory state data representative of the state of the first accessory, and wherein the second accessory changes from operating in a first state to operating in a second state in response to receiving the first accessory state data from the first accessory.

23. The helmet accessory mounting system of claim 22, further comprising:

a helmet controller in electrical communication with the data line, the helmet controller configured to:

receive the first accessory data from the first accessory, the first accessory data including first accessory state data; and in response to receiving the first accessory data, transmit an accessory control command to the second accessory to cause the second accessory to change from operating in the first state to operating in a second state.

24. The helmet accessory mounting system of claim 22, wherein the first accessory generates the first accessory state data in response to a state change of the first accessory.

25. The helmet accessory mounting system of claim 24, wherein the state change of the first accessory is in response to a user command received at the first accessory.

26. The helmet accessory mounting system of claim 22, wherein:

the first accessory is a first strobe;
the second accessory is a second strobe;
the first accessory state data represents a strobe pulse rate, brightness and strobe duration rate of the first accessory; and
the second accessory changing from operating in a first state to operating in a second state includes strobing the second accessory at the strobe pulse rate, brightness and strobe duration rate of the first accessory.

27. The helmet accessory mounting system of claim 22, wherein:

the first accessory is a strobe light;
the second accessory is a flashlight;
the first accessory state data represents one of: the strobe light operating in a visible light mode and the strobe light operating in an infrared mode; and
the second accessory operating in a second state includes one of: the flashlight operating in a visible light mode and the flashlight operating in an infrared mode.

28. The helmet accessory mounting system of claim 22, wherein:

the first accessory is a battery pack;
the second accessory is a night vision goggles;
the first accessory state data represents a low battery state; and
the second accessory changing from operating in the first state to operating in the second state includes changing from enabling a thermal camera and augmented reality at the night vision goggles to disabling the thermal camera and augmented reality at the night vision goggles.

29. The helmet accessory mounting system of claim 22, wherein:

the first accessory is battery pack;
the second accessory is flashlight;
the first accessory state data represents low battery; and
the second accessory changing from operating in the first state to operating in the second state includes operating in a high brightness setting to a dim setting.

30. The helmet accessory mounting system of claim 22, wherein:

the first accessory is a battery pack;
the second accessory is a communications headset;
the first accessory state data represents low battery; and
the second accessory changing from operating in the first state to operating in the second state includes periodically outputting a low battery warning with a time remaining indication at the communications headset.

31. The helmet accessory mounting system of claim 22, wherein:

the first accessory is an end user device;
the second accessory is a strobe light;
the first accessory state data represents a strobe pulse rate, strobe duration rate, brightness, and color of the strobe light selected by an operator at the end user device; and
the second accessory changing from operating in the first state to operating in the second state includes changing strobe pulse rate, strobe duration rate, brightness, and color settings of the strobe light.

* * * * *